US012752693B2

(12) United States Patent
Yeom et al.

(10) Patent No.: US 12,752,693 B2
(45) Date of Patent: *Oct. 6, 2026

(54) DELIVERY ROBOT

(71) Applicant: BEAR ROBOTICS KOREA, INC., Seoul (KR)

(72) Inventors: Hoyeon Yeom, Seoul (KR); Changyong Jang, Seoul (KR); Bawoo Cha, Seoul (KR); Yongkwon Kim, Seoul (KR)

(73) Assignee: BEAR ROBOTICS KOREA, INC., Seoul (KR)

( * ) Notice: Subject to any disclaimer, the term of this patent is extended or adjusted under 35 U.S.C. 154(b) by 30 days.

This patent is subject to a terminal disclaimer.

(21) Appl. No.: 18/647,779

(22) Filed: Apr. 26, 2024

(65) Prior Publication Data

US 2025/0091501 A1 Mar. 20, 2025

(30) Foreign Application Priority Data

Sep. 15, 2023 (KR) ........................ 10-2023-0123440

(51) Int. Cl.
*B60P 3/00* (2006.01)
*E05F 15/70* (2015.01)

(52) U.S. Cl.
CPC .............. *B60P 3/007* (2013.01); *E05F 15/70* (2015.01); *E05Y 2900/531* (2013.01)

(58) Field of Classification Search
CPC ..... B60P 3/007; E05F 15/70; E05Y 2900/531
USPC ............................................................ 701/49
See application file for complete search history.

(56) References Cited

U.S. PATENT DOCUMENTS

2016/0312516 A1* 10/2016 Heydel ................. E05F 15/614
2020/0223632 A1 7/2020 Melanson et al.
2021/0188550 A1* 6/2021 Kim ..................... B65G 1/0464
2021/0212455 A1* 7/2021 Jung ........................ B25J 5/007
2022/0305679 A1* 9/2022 Li ....................... A47L 11/4002
2023/0039357 A1* 2/2023 Jo ........................... G01S 15/08
2024/0217593 A1* 7/2024 Lõssov ................... B60P 3/007
2024/0353858 A1* 10/2024 Itozawa ................. G05D 1/243
2025/0033884 A1* 1/2025 Menz ....................... B65G 1/10

FOREIGN PATENT DOCUMENTS

CN 204731880 U 10/2015
CN 216658003 U 6/2022
CN 219258110 U 6/2023

* cited by examiner

*Primary Examiner* — Hitesh Patel
*Assistant Examiner* — John D Holman
(74) *Attorney, Agent, or Firm* — Birch, Stewart, Kolasch & Birch, LLP

(57) ABSTRACT

A delivery robot includes a body housing including a storage defined therein and a body opening defined in a front surface thereof, a door that operates in a closed state to cover the body opening or an open state to open the body opening, a sliding shelf located at a bottom of the storage and slidable in a front and rear direction, and a controller that operates the door and the sliding shelf. The controller operates the sliding shelf when the door is opened.

18 Claims, 36 Drawing Sheets

(a) (b)

(a)

(b)

(a)

| Situation | Theoretical value | Actual measurement |
|---|---|---|
| End-point reached | 0 | 0 |
| Operating with no load | 4.33 | 4.98 |
| Forced motor stop during movement with max load | 18.86 | 18.84 |

(b)

(a)

(b)

(a)

(b)

(a)

(b)

DELIVERY ROBOT

CROSS-REFERENCE TO RELATED APPLICATIONS

This application claims the benefit of Korean Patent Application No. 10-2023-0123440, filed on Sep. 15, 2023, which is hereby incorporated by reference as if fully set forth herein.

BACKGROUND

Field

The present disclosure relates to a delivery robot including a shelf sliding to facilitate retrieval of an item stored therein.

Discussion of the Related Art

To take charge of a portion of factory automation, robots have been developed for industrial use. Recently, fields of application of the robots have been further expanding, and not only a medical robot and an aerospace robot, but also a robot that may be used in a daily life are being developed.

Such robot for the daily life is being developed to provide a specific service (e.g., shopping, serving, conversation, cleaning, and the like) in response to a user command. Unlike the industrial robot that performs repetitive tasks by being fixed at a specific location or a robot that performs a specific specialized function at a high cost, such as the medical or aerospace robots, travel and communication functions are important for the robot for the daily life and the robot for the daily life is difficult to be distributed when a manufacturing cost thereof is too high.

In particular, because the robot does not walk on two feet like humans but moves using wheels, the robot must be able to move over a bump on the floor or avoid an obstacle, must be able to minimize impact without falling when moving over the bump on the floor, and must be able to make quick decisions using multiple sensors to avoid the obstacle.

One that has been actively developed recently as an example of such a robot is a delivery robot that may transport food or a small item. A dish or a delivery item may be placed on a shelf disposed in the robot, and the robot may transport the dish or the delivery item to a customer or a service provider.

The robot may be used in a limited space such as a restaurant, but the delivery robot that is used in a hotel or that has to move a predetermined distance may move to a location where a manager is not nearby. The delivery robot with a long travel distance must move such that the item does not fall from the shelf, so that there is a need for the delivery robot that takes safety into account, such as detecting a surrounding obstacle when operating unmanned.

Additionally, as types of delivery items become more diverse, there is a need for the delivery robot that increases utilization of an internal space.

SUMMARY

The present disclosure is to provide a delivery robot including a shelf sliding to facilitate retrieval of an item stored therein.

Provided is a delivery robot including a body housing including a storage defined therein and a body opening defined in a front surface thereof, a door that operates in a closed state to cover the body opening or an open state to open the body opening, a sliding shelf located at a bottom of the storage and slidable in a front and rear direction, and a controller that operates the door and the sliding shelf, wherein the controller operates the sliding shelf when the door is opened.

The delivery robot may further include a middle shelf partitioning the storage into an upper storage section and a lower storage section and detachable from the body housing, and when the middle shelf is mounted, the controller may operate the sliding shelf when the door is opened.

The delivery robot may further include shelf rails respectively formed at a left side and a right side of the middle shelf, and a first elastic sensor protruding from a side surface of the storage, wherein the first elastic sensor detects the mounting of the middle shelf by being retracted when the middle shelf is mounted, the door may include an upper door that opens and closes the upper storage section based on the middle shelf, and a lower door that opens and closes the lower storage section based on the middle shelf, and the controller may operate the upper door and the lower door individually when the first elastic sensor detects the middle shelf, and extend the sliding shelf when only the lower door is opened.

The delivery robot may further include a shelf driver that is disposed under the sliding shelf and operates the sliding shelf in the sliding manner, and a sliding rail that is disposed under the sliding shelf and guides the sliding operation, and the shelf driver may be disposed to be further downwardly spaced apart from the sliding shelf than the sliding rail.

The shelf driver may include one of a linear actuator and a rack and pinion gear.

The delivery robot may further include a storage base located under the sliding shelf, the shelf driver may be fastened to the sliding shelf via a driving hole defined in the storage base, and the sliding rail may be located on the storage base.

The delivery robot may further include a waterproof wall protruding around the driving hole of the storage base.

The sliding shelf may include a spill preventing protrusion formed at edges thereof.

The sliding shelf may include a fall preventing wall protruding from a rear surface thereof.

The delivery robot may further include a shelf link having one end connected to the door and the other end connected to the sliding shelf, and the shelf link may pull the sliding shelf to extend the sliding shelf from the storage when the door is opened, and push the sliding shelf to retract the sliding shelf into the storage when the door is closed.

The delivery robot may further include a partition inserted into a horizontal center of a lower storage section to partition the storage in a left and right direction, and the sliding shelf may include a pair of sliding shelves disposed on a left side and a right side of the partition, respectively.

The delivery robot may further include an internal camera disposed inside the storage overlapping the partition and facing rearwards, and the controller that controls the sliding shelf based on an image collected from the internal camera, and the controller may determine whether there is an obstacle within an extension range of the sliding shelf based on the image of the outside of the door captured by the internal camera when opening the door, and extend the sliding shelf when there is no obstacle.

The delivery robot in the present disclosure may have the door that may open and close the storage, and may prevent the door from opening via the locking device when moving, thereby safely delivering the item.

In addition, the delivery robot in the present disclosure may safely open and close the door in the limited space by moving the pivoting range thereof along the outer surface of the body when the door is opened.

In addition, the link that operates the door of the delivery robot in the present disclosure has an excellent aesthetic appearance by minimizing exposure to the outside and does not interfere with other members.

In addition, injury does not occur even when a hand gets caught in the door of the delivery robot in the present disclosure, and overvoltage of the motor caused by the counter electromotive force does not occur, so that safety is secured.

In addition, the delivery robot in the present disclosure may partition the inside of the storage as needed and increase the utilization of the internal space via the plurality of doors that may be opened and closed selectively.

In addition, the delivery robot in the present disclosure may detect whether the shelf and the partition have been attached or detached to selectively operate the plurality of doors depending on a storage partitioning state of the doors.

In addition, the delivery robot in the present disclosure may store the partition inside the storage of the delivery robot when not using the partition.

In addition, the delivery robot in the present disclosure may be equipped with the sliding shelf to improve convenience in putting in and taking out the item.

In addition, the delivery robot in the present disclosure may reduce a failure rate of the delivery robot by preventing the liquid from flowing into the electronic component located under the sliding shelf.

In addition, the sliding shelf of the delivery robot in the present disclosure may be easily removable and thus may be easily maintained.

In addition, the delivery robot in the present disclosure may be equipped with the internal camera and thus determine whether the item is stored inside to open and close the door.

In addition, the delivery robot in the present disclosure may detect whether there is the person outside the delivery robot, thereby checking whether it is safe in advance when extending the sliding shelf.

It is to be understood that both the foregoing general description and the following detailed description of the present disclosure are exemplary and explanatory and are intended to provide further explanation of the invention as claimed.

DESCRIPTION OF SPECIFIC EMBODIMENTS

Figure 1:
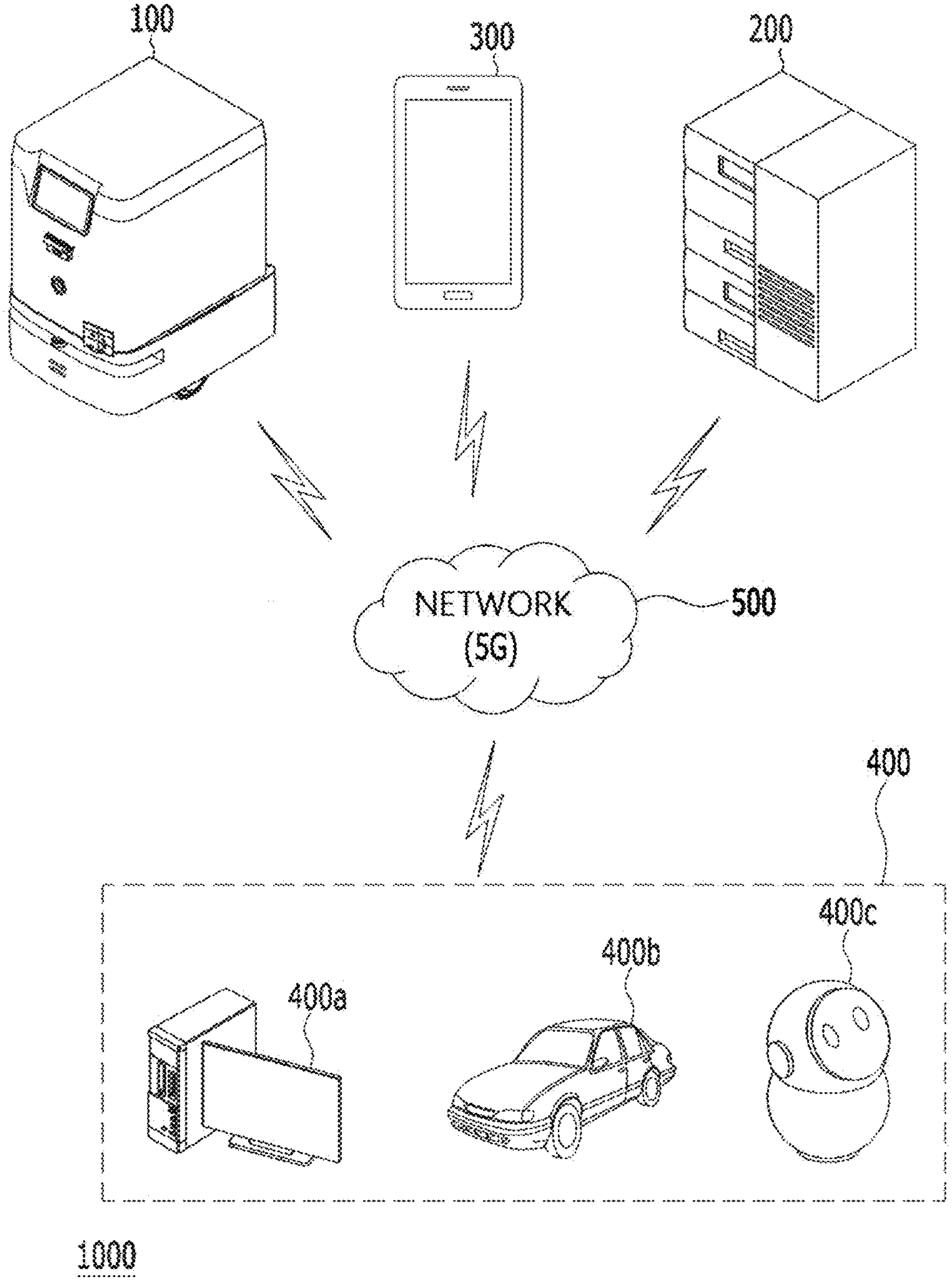
FIG. 1 shows a 5G network-based cloud system according to an embodiment of the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A robot is a machine device capable of automatically performing a certain task or operation. The robot may be controlled by an external control device or may be embedded in the control device. The robot can perform tasks that are difficult for humans to perform, such as repeatedly processing only a preset operation, lifting a heavy object, performing precise tasks or a hard task in extreme environments.

In order to perform such tasks, the robot includes a driver such as an actuator or a motor, so that the robot can perform various physical operations, such as moving a robot joint.

Industrial robots or medical robots having a specialized appearance for specific tasks due to problems such as high manufacturing costs and dexterity of robot manipulation were the first to be developed. Whereas industrial and medical robots are configured to repeatedly perform the same operation in a designated place, mobile robots have recently been developed and introduced to the market. Robots for use in the aerospace industry can perform exploration tasks or the like on distant planets that are difficult for humans to directly go to, and such robots have a driving function.

In order to perform the driving function, the robot has a driver, wheel(s), a frame, a brake, a caster, a motor, etc. In order for the robot to recognize the presence or absence of surrounding obstacles and move while avoiding the surrounding obstacles, an evolved robot equipped with artificial intelligence has recently been developed.

Artificial intelligence (AI) technology is applied to the robot, so that the robot can be implemented as a guide robot, a transportation robot, a cleaning robot, a wearable robot, an entertainment robot, a pet robot, and an unmanned aerial robot, etc.

The robot may include a robot control module for controlling operation thereof, and the robot control module may refer to a software module or a chip implemented in hardware.

By means of sensor information obtained from various types of sensors, the robot may acquire state information of the robot, may detect (recognize) the surrounding environment and the object, may generate map data, may determine a travel route and a travel plan, may determine a response to user interaction, or may determine a necessary operation.

The robot may perform the above-described operations using a learning model composed of at least one artificial neural network (ANN). For example, the robot may recognize the surrounding environment and object using a learning model, and may determine a necessary operation using the recognized surrounding environment information or object information. Here, the learning model may be directly learned from the robot or learned from an external device such as an AI server.

In this case, whereas the robot can perform a necessary operation by directly generating a result using the learning model, the robot may also perform an operation by transmitting sensor information to an external device such as an AI server and receiving the resultant information generated thereby.

The robot can perform autonomous driving through artificial intelligence. Autonomous driving refers to a technique in which a movable object such as a robot can autonomously determine an optimal path by itself and can move while avoiding collision with an obstacle. The autonomous driving technique currently being applied may include a technique in which the movable object (e.g., a robot) can travel while maintaining a current driving lane, a technique in which the movable object can travel while automatically adjusting a driving speed such as adaptive cruise control, a technique in which the movable object can automatically travel along a predetermined route, and a driving technique in which, after a destination is decided, a route to the destination is automatically set.

In order to perform autonomous driving, the movable object such as the robot may include a large number of sensors to recognize data of the surrounding situation. For example, the sensors may include a proximity sensor, an illumination sensor, an acceleration sensor, a magnetic sensor, a gyro sensor, an inertial sensor, an RGB sensor, an infrared (IR) sensor, a fingerprint recognition sensor, an ultrasonic sensor, an optical sensor, a microphone, a lidar, a radar, and the like.

The robot can perform autonomous driving not only based on information collected by sensors, but also based on image information collected by an RGBC camera and an infrared (IR) camera and sound information collected through a microphone. In addition, the robot can travel based on information received through a user input unit. Map data, location information, and information about peripheral situations can be collected through a wireless communication unit. The collected information is requisite for autonomous driving.

Map data may include object identification information for various objects disposed in a space where the robot moves. For example, the map data may include object identification information for fixed objects such as a wall and a door, and other object identification information for movable objects such as a flowerpot and a desk. In addition, the object identification information may include a name, a type, a distance, a location, etc.

Therefore, the robot may essentially include sensors, various input units, a wireless communication unit, and the like to collect data that can be learned by artificial intelligence, and can perform optimal operations by synthesizing various types of information. The learning processor for performing artificial intelligence can perform learning by being mounted in a controller embedded in the robot, can transmit the collected information to a server, can perform learning through the server, and can retransmit the learned result to the robot, so that the robot can perform autonomous driving based on the learned result.

A robot equipped with artificial intelligence can collect the surrounding information even in a new place to implement the entire map, and a large amount of information about a place of the major activity zone can be accumulated, so that the robot can perform more accurate autonomous driving.

The robot may include a touchscreen or a button to receive a user input, and may receive a command by recognizing a user's voice. In order to convert a voice input signal into a character string, the processor may obtain information about the intention corresponding to the user input using at least one of a speech to text (STT) engine for converting a voice input into a character string and a natural language processing (NLP) engine for obtaining information about the intention of natural language.

In this case, at least one of the STT engine and the NLP engine may include an artificial neural network (ANN) trained by a machine learning algorithm. In addition, at least one of the STT engine and the NLP engine may be trained by the learning processor, may be trained by the learning processor of the AI server, or may be trained by distributed processing of the trained results.

FIG. 1 shows a 5G network-based cloud system 1000 according to an embodiment of the present disclosure.

Referring to FIG. 1, a cloud system 1000 may include a delivery robot 100, a mobile terminal 300, a robot control system 200, various devices 400, and a 5G network 500. The delivery robot 100 is a robot that transports an item from a departure point to a destination.

In addition, the delivery robot 100 may move the item to the destination not only outdoors but also indoors. The delivery robot 100 may be implemented as an automated guided vehicle (AGV), and the AGV may be a transport device that moves by a sensor on the floor, a magnetic field, a vision system, and the like.

The delivery robot 100 may include a storage area for storing the item, the storage area may be divided to load various items, and various types of items may be disposed in the plurality of divided partial storage areas. Accordingly, mixing of the items may be prevented.

The mobile terminal 300 may be in communication with the delivery robot 100 via the 5G network 500. The mobile terminal 300 may be a device owned by a user who installs a partition in the storage area to load the item or a device owned by a recipient of the loaded item. The mobile terminal 300 may provide information based on an image, and the mobile terminal 300 may include mobile devices such as a mobile phone, a smart phone, a wearable device (e.g., a smartwatch), a glass-type terminal (a smart glass), and a head mounted display (HMD).

The robot control system 200 may remotely control the delivery robot 100 and respond to various requests from the delivery robot 100. For example, the robot control system 200 may perform calculation using artificial intelligence in response to the request from the delivery robot 100.

Additionally, the robot control system 200 may set a movement path of the delivery robot 100. When there are a plurality of destinations, the robot control system 200 may set a movement order for the destinations.

The various devices 400 may include a personal computer (PC) 400*a*, an autonomous vehicle 400*b*, a home robot 400*c*, and the like. When the delivery robot 100 arrives at the transport destination of the item, the item may be directly delivered to the home robot 400*c* via communication with the home robot 400*c*.

The various devices 400 may be connected in a wired or wireless manner with the delivery robot 100, the mobile terminal 300, the robot control system 200, and the like via the 5G network 500.

The delivery robot 100, the mobile terminal 300, the robot control system 200, and the various devices 400 are all equipped with a 5G module and thus are able to transmit and receive data at a speed in a range of 100 Mbps to 20 Gbps (or higher), so that large video files may be transmitted to the various devices and power consumption may be minimized with low power driving. However, the transmission speed may vary depending on the embodiment.

The 5G network 500 may include a 5G mobile communication network, a local area network, Internet, and the like, and may provide a communication environment of the devices in the wired and wireless manner.

Figure 2:
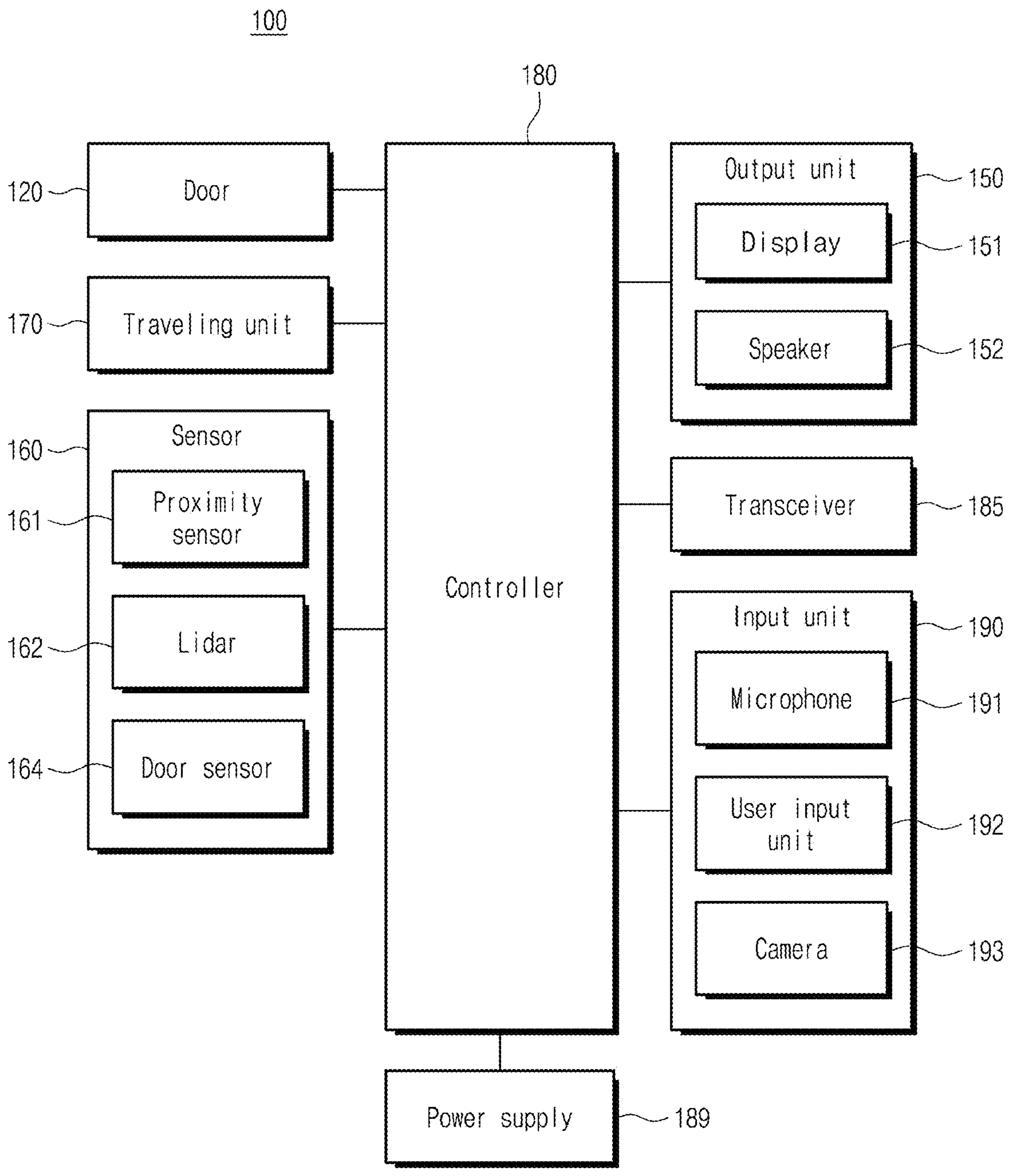
FIG. 2 is a block diagram for illustrating a configuration of a delivery robot according to an embodiment of the present disclosure.
Figure 3:
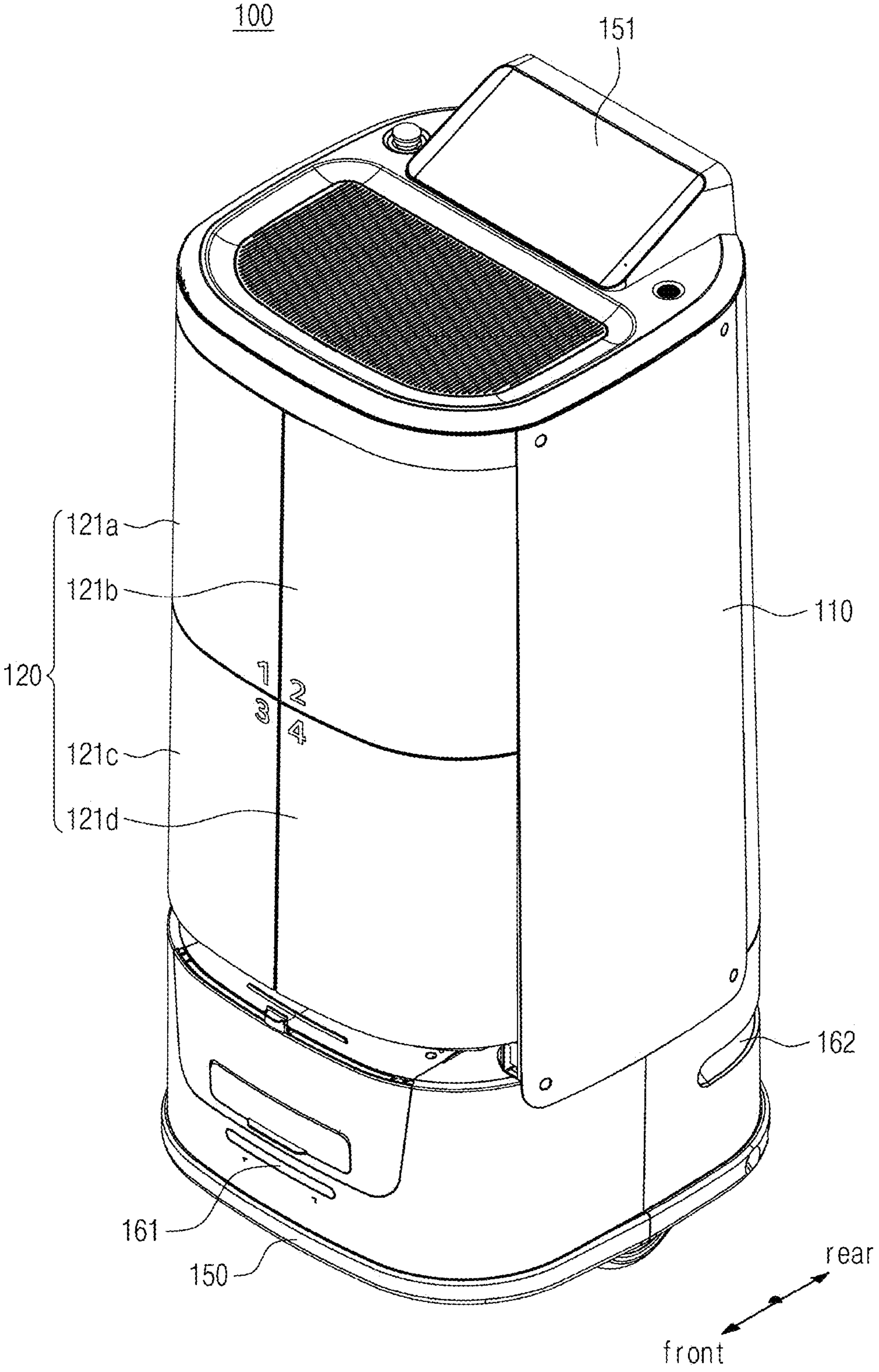
FIG. 3 is a front perspective view of a delivery robot according to an embodiment of the present disclosure.

FIG. 2 is a block diagram for illustrating a configuration of the delivery robot 100 according to an embodiment of the present disclosure, and FIG. 3 is a front perspective view of the delivery robot 100 according to an embodiment of the present disclosure. The components shown in FIG. 2 are not essential for implementing the delivery robot 100, so that the number of components of the delivery robot 100 described herein may be greater or smaller than the number of components listed above.

Referring to FIG. 3, a body 110 of the delivery robot 100 has various parts mounted therein and includes a storage for storing an item. The body 110 may move via a traveling unit 170 located at a bottom. The body may include a body housing 111 constituting an outer appearance of the body, and a storage 115 (see FIG. 4) including a shelf for storing the item within the body housing 111.

Referring to FIG. 2, the delivery robot 100 in the present disclosure may include a door 120, the traveling unit 170, a sensor 160, an output unit 150, an input unit 190, a controller 180, a transceiver 185, and a power supply 189.

The door 120 may selectively open the inside of the storage by opening and closing an opening of the body 110 defined in one side of the body 110. To detect a travel direction when traveling, the body housing 111 may be positioned such that a camera 193, a LIDAR 162, a proximity sensor 161, and the like that are exposed may be positioned to face the travel direction. The opening of the body 110 for inserting and withdrawing the item may be positioned to face a direction opposite to the travel direction.

The present disclosure is characterized by opening and closing the storage 115 inside the body 110 to store and withdraw the item, so that a direction the door 120 faces will be described as a forward direction, and a direction opposite thereto, that is, the travel direction, will be described as a rearward direction.

When the door 120 operates in a hinged form, a sufficient space must be secured in front of the delivery robot 100, so that the door 120 may operate in a slide type so as to be opened and closed in a limited space. However, the delivery robot 100 has the cylindrical body 110, as shown in FIG. 3, and most of a front area is devoted to the opening of the body 110 covered with the door 120 for smooth insertion and withdrawal of the item.

The opening of the body 110 exposing the storage occupies an entire front surface of the body 110. When the door 120 slides in a direction parallel to the front surface of the body, a space must be secured in a left and right direction of the body 110.

Therefore, a door driver may be constructed such that the door 120 of the delivery robot 100 in the present disclosure is opened by turning in an orbit that is not spaced as much as possible from an outer surface of the body 110.

The door 120 includes a door panel 121 that constitutes a portion of the outer surface of the body 110. The door 120 may include a motor 122, links 128 and 129, and the like to operate the door panel 121.

As shown in FIG. 3, there may be a plurality of door panels 121*a*, 121*b*, 121*c*, and 121*d*, and the plurality of door panels 121*a*, 121*b*, 121*c*, and 121*d* may operate independently. The plurality of door panels 121*a*, 121*b*, 121*c*, and 121*d* may operate simultaneously or individually depending on a configuration of the storage inside the body housing 111.

The output unit 150 may generate output related to vision, hearing, tactile sensation, or the like. The output unit 150 may include an optical output unit, the display 151, and the like that outputs visual information, a speaker 152 that outputs auditory information, an ultrasonic output unit or the like that outputs an ultrasonic signal within an inaudible frequency, and a haptic module that outputs tactile information.

The sensor 160 may use various sensors to obtain at least one of information on an inner side of the delivery robot 100, information on a surrounding environment of the delivery robot 100, or user information.

In this regard, the sensor 160 may include various types of sensors to recognize the surroundings for autonomous driving. Representative examples may include a distance sensor or proximity sensor 161 and a LIDAR 162.

The proximity sensor 161 may include an ultrasonic sensor that recognizes a nearby object and determines a distance to the object based on a return time of an emitted ultrasonic wave. The proximity sensor 161 may include a plurality of proximity sensors along a perimeter, and the proximity sensor may also be disposed in an upper portion to sense an obstacle above.

The LIDAR 162 is a device that emits a laser pulse and receives light reflected from a surrounding target object to accurately depict the surroundings. A principle thereof is similar to that of a radar, but an electromagnetic wave used is different, so that a technology used and a scope of use are different.

Laser may damage human vision because light with a wavelength in a range from 600 to 1000 nm is used. The LIDAR 162 uses a wavelength greater than the above range, and is used in measurement of not only the distance to the target object, but also a speed and a direction of movement, and a temperature, and surrounding atmospheric substance analysis and concentration measurement.

In addition, the sensor 160 may include an illumination sensor, an acceleration sensor, a magnetic sensor, a gyro sensor, an inertial sensor, an RGB sensor, an infrared sensor, a fingerprint recognition sensor, an ultrasonic sensor, an optical sensor, a hall sensor, and the like.

The traveling unit 170, as a means for moving the delivery robot 100, may include wheels or legs, and may include a wheel driver and a leg driver that control them.

The wheels may include a main wheel 171 (see FIG. 14) for fast travel, a caster 173 for changing a direction, an auxiliary caster for stable travel to prevent a loaded item L from falling while traveling, and the like.

The transceiver 185 may include a wired or wireless communication module that may be in communication with the robot control system 200.

In an optional embodiment, the transceiver 185 may have modules related to global system for mobile communication (GSM), code division multi access (CDMA), long term evolution (LTE), 5G, wireless LAN (WLAN), wireless-fidelity (Wi-Fi), Bluetooth, radio frequency identification (RFID), infrared data association (IrDA), ZigBee, and near field communication (NFC) communication.

The input unit 190 may include a user input unit for receiving information from the user. In an optional embodiment, the input unit 190 may include a camera 193 for inputting an image signal and a microphone 191 for receiving an audio signal. In this regard, the camera 193 or the microphone 191 may be treated as a sensor, and the signal obtained from the camera 193 or the microphone 191 may be referred to as sensing data or sensor information.

The camera 121 is located in a front portion to sense an obstacle in front, and as shown in FIG. 3, the plurality of cameras 121 may be arranged at different angles. The plurality of cameras 121 with different capturing directions, such as a camera that widely recognizes an area ahead and a camera that captures the floor, may be arranged.

The storage 115 may further include an internal camera 195 (see FIG. 17) to detect presence or absence of the item inside. When the storage 115 is partitioned, the internal camera 195 may include a plurality of internal cameras to detect all partitioned storage sections 115*a*, 115*b*, 115*c*, and 115*d*, respectively.

Alternatively, cameras with different functions may be disposed. For example, a wide-angle camera, an infrared camera, and the like may be disposed. As the sensor 160, the camera may play a role in sensing a surrounding object.

The user input unit 192 may include a button or a touch panel overlapping a display 151. Alternatively, a user command may be input remotely via the transceiver 185. In this case, the user input unit 192 may include the personal computer 400 or a remote control device disposed separately from the delivery robot 100.

Because the user input unit 192 includes all methods for receiving the user command, the user input unit 192 may recognize the user command via voice recognition. That is, a voice recognition device that extracts the user command by analyzing voice collected by the microphone 191 may also serve as the user input unit 192.

The input unit 190 may include an item information input unit. The item information input unit may receive size information, weight information, destination information, information on a transport requester, and the like of the item. In this regard, the item information input unit may include a code reader.

In addition, the memory may store information necessary to perform the calculation using the artificial intelligence, machine learning, and an artificial neural network. The memory may store a deep neural network model. The deep neural network model may be used to infer a result value for new input data other than training data, and the inferred value may be used as basis for determination to perform a certain operation.

The power supply 189 receives external power and internal power under control of the processor 180 and supplies the power to each component of the delivery robot 100. Such power supply 189 may include a battery, and the battery may be a built-in battery or a replaceable battery. The battery may be charged using a wired or wireless charging scheme, and the wireless charging scheme may include a magnetic induction scheme or a magnetic resonance scheme.

The controller 180 is a module that controls the components of the delivery robot 100. The controller 180 may refer to a data processing device built into hardware that has a physically structured circuit to perform a function expressed as codes or instructions included in a program. Examples of the data processing device built into the hardware may include a microprocessor, a central processing unit (CPU), a processor core, a multiprocessor, an application-specific integrated circuit (ASIC), and a field programmable gate array (FPGA), but the scope of the present disclosure may not be limited thereto.

The controller 180 may collect at least one of quantity information, weight information, size information, delivery order information, and security level information of an item L to be disposed in the storage 115. For example, the controller 180 may collect the above-described information via the input/output unit 170. An input of the input/output unit 170 may also include a touch input on a display.

Based on the collected information, the controller 180 may transmit information of the item L loaded in the storage 115 to the mobile terminal (300 in FIG. 1) via the transceiver 185.

The present disclosure may include a plurality of doors 120*a*, 120*b*, 120*c*, and 120*d*, and the doors may be divided from each other in a left and right direction so as to be opened and closed symmetrically in the left and right direction such that a turning radius does not increase when being opened and closed.

There may be two doors including one door on the left and one door on the right, or there may be four doors 120*a*, 120*b*, 120*c*, and 120*d* as shown in FIG. 3. Alternatively, there may be six doors divided vertically into three layers.

Figure 4:
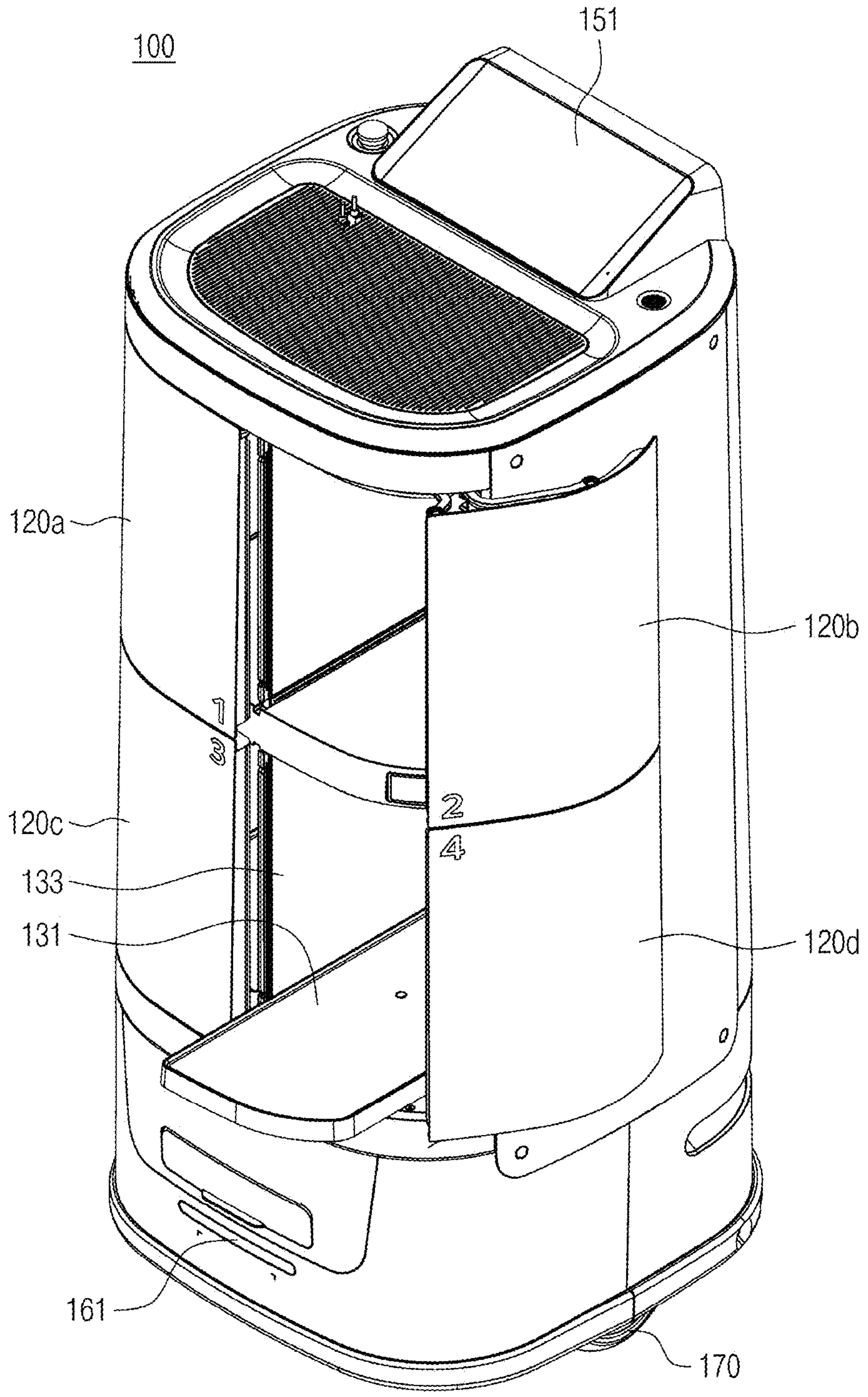
FIGS. 4 and 5 are diagrams illustrating a state in which a door of a delivery robot according to an embodiment of the present disclosure is opened.
Figure 5:
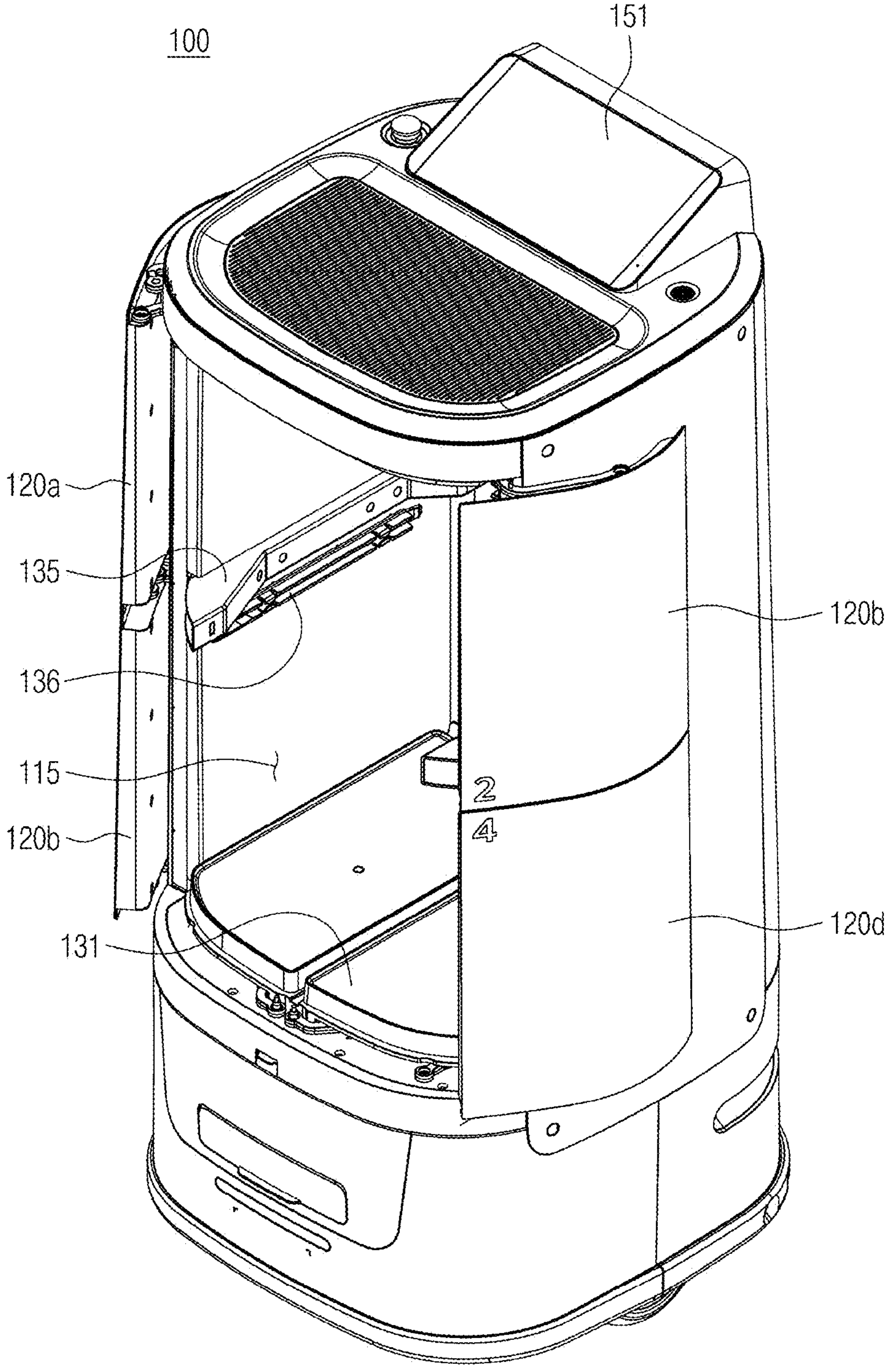

For convenience of description, a description will be made based on an embodiment in which there are four doors 120*a*, 120*b*, 120*c*, and 120*d* vertically divided into two layers. The four doors 120*a*, 120*b*, 120*c*, and 120*d* may operate simultaneously or individually. FIGS. 4 and 5 are diagrams illustrating a state in which the door 120 of the delivery robot 100 according to an embodiment of the present disclosure is opened.

The delivery robot 100 of the present disclosure may open only some doors 120*b* and 120*d* as shown in FIG. 4, or all doors 120*a*, 120*b*, 120*c*, and 120*d* may be opened as shown in FIG. 5. The operation of the door 120 may vary depending on a shape of the partition of the internal storage 115.

When the storage 115 is partitioned into four storage sections via a partition 133 and a middle shelf 132, the respective doors 120*a*, 120*b*, 120*c*, and 120*d* may operate individually, and when the partition 133 is omitted, left and right doors may be opened simultaneously and open one storage section. The embodiment in FIG. 5 is a case in which the storage 115 is not partitioned but is constructed as one large space. In the corresponding embodiment, all doors 120*a*, 120*b*, 120*c*, and 120*d* may be opened simultaneously.

Figure 6:
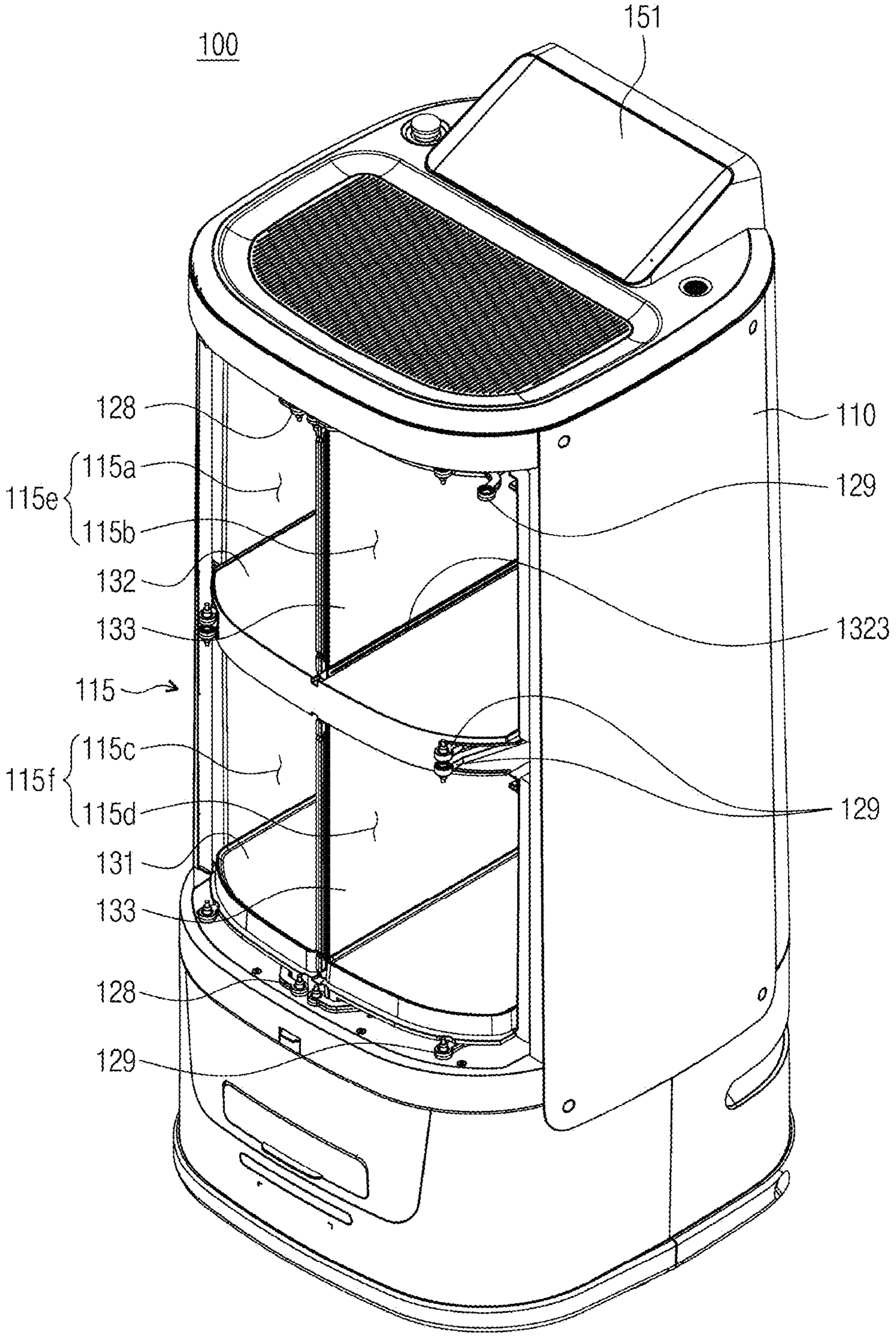
FIG. 6 is a view showing the inside of a delivery robot according to an embodiment of the present disclosure.

FIG. 6 is a view showing the inside of the storage 115 of the delivery robot 100 according to an embodiment of the present disclosure, and shows a state in which the door panel 121 is removed.

The delivery robot 100 may include the middle shelf 132 that divides the storage 115 in the vertical direction and the partition 133 that divides the storage 115 in the left and right direction. The delivery robot 100 of the present embodiment may include one middle shelf 132 and two partitions 133, and the storage 115 may be divided into up to four storage sections 115*a*, 115*b*, 115*c*, and 115*d* as shown in FIG. 6 using one middle shelf 132 and two partitions 133.

The middle shelf 132 and the partition 133 are detachable from the body housing 111 in a slide scheme. The middle shelf 132 may be inserted into the storage 115 at a vertical center thereof, and the middle shelf 132 may divide the storage 115 into an upper storage section 115*e* and a lower storage section 115*f*.

In this regard, the vertical center does not necessarily mean that a height of the upper storage section 115*e* and a height of the lower storage section 115*f* are numerically equal to each other. However, for the partition, which will be described later, to be commonly used in the upper storage section 115*e* and the lower storage section 115*f*, the upper storage section 115*e* and the lower storage section 115*f* may have the same height.

The middle shelf 132 must have sufficient rigidity to support the loaded item and may have a predetermined thickness. To support the middle shelf 132, shelf supports 135 (see FIG. 12) respectively protruding at left and right sides of the storage 115 may be included.

The partitions 133 that divide the upper storage section 115*e* and the lower storage section 115*f* in the left and right direction may be inserted along guide grooves 1323 defined in the middle shelf 132. Unlike the middle shelf 132, the partition 133 does not support a weight of the item, so that a thickness thereof may be relatively smaller than that of the middle shelf 132.

To be coupled with all of the pair of partitions 133, the guide grooves 1323 may be defined in both top and bottom surfaces of the middle shelf 132. Guide grooves 1125 (see FIG. 24) into which the partitions 133 are respectively inserted may be defined in top and bottom surfaces of the storage 115.

The partition 133 may be inserted into the storage, that is, rearwards, or withdrawn forwards along the guide groove 1323. The pair of partitions 133 may be inserted into the upper storage section 115*e* and the lower storage section 115*f*, respectively, and the pair of partitions 133 may be independently detachable.

Figure 7:
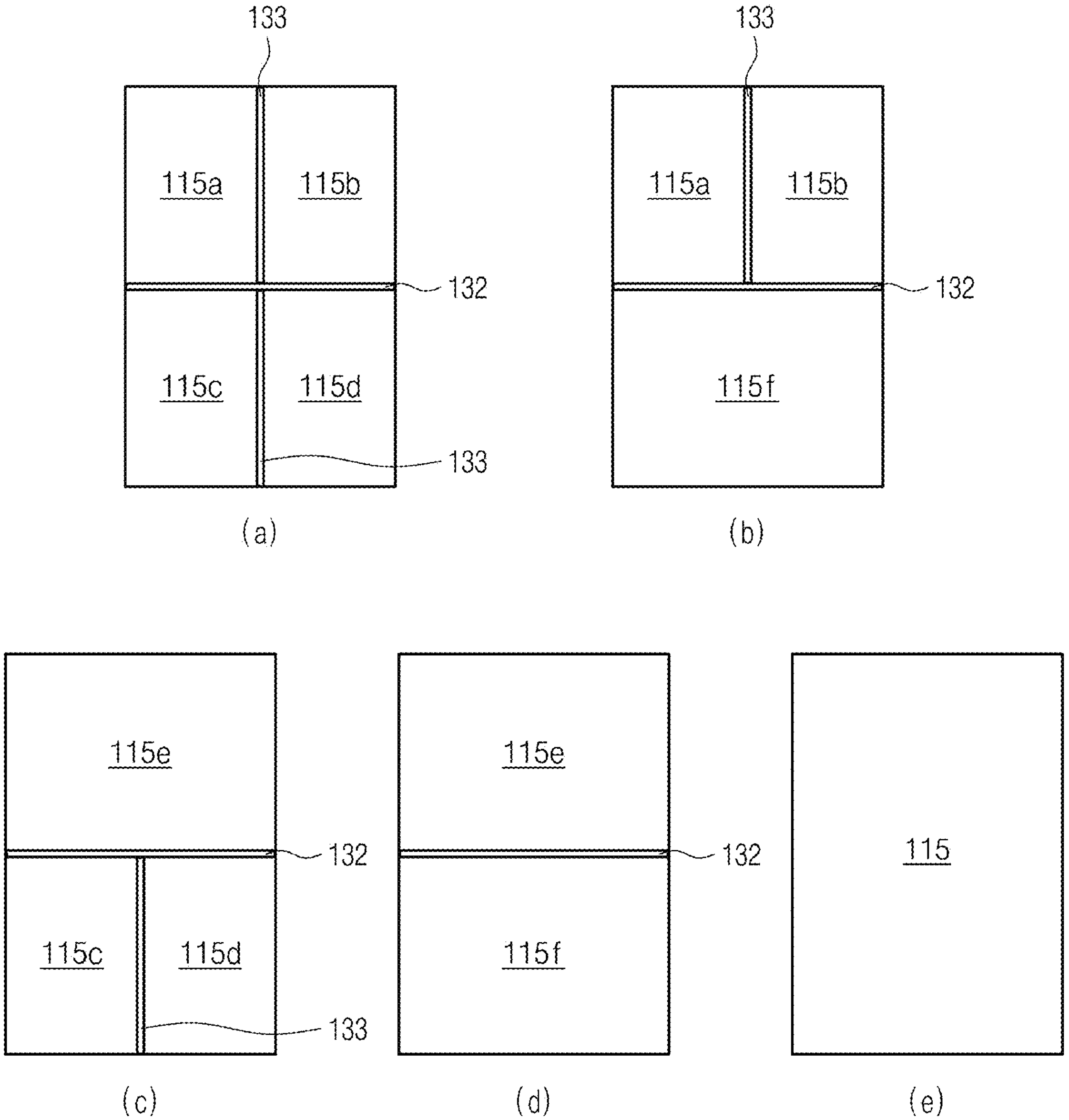
FIG. 7 is a conceptual diagram illustrating a method for partitioning a storage of a delivery robot according to an embodiment of the present disclosure.

FIG. 7 is a conceptual diagram illustrating a method for partitioning the storage of the delivery robot 100 according to an embodiment of the present disclosure. As shown in (a) in FIG. 7, the storage may be partitioned into four storage sections 115*a*, 115*b*, 115*c*, and 115*d* using the one middle shelf 132 and the two partitions 133.

As shown in (b) and (c) in FIG. 7, one middle shelf 132 and one partition 133 may be used to use one of the upper storage section 115*e* and the lower storage section 115*f* as a connected space and the other as a partitioned space.

Alternatively, as shown in (d) in FIG. 7, the storage may be divided into only two spaces, the upper storage section 115*e* and the lower storage section 115*f*, and as shown in (e) in FIG. 7, both the middle shelf 132 and the partition 133 may be removed to deliver a bulky item such as a blanket using the large storage 115.

By partitioning the storage 115, the number of items that may be stored may increase, and when delivering a small item, a plurality of items may be delivered to multiple destinations at once.

When the middle shelf 132 is inserted and the upper storage section 115*e* and the lower storage section 115*f* are partitioned from each other, the inside of the lower storage section 115*f* is not visible because of being obstructed by the middle shelf 132, so that a user has to bend over to load or unload the item. To solve such inconvenience, as shown in FIG. 4, a sliding shelf 131 at the bottom may protrude forward, so that the item loaded on the lower shelf may be easily received.

When the storage 115 is not partitioned as shown in (e) in FIG. 7, the controller 180 may open the four doors 120 simultaneously as shown in FIG. 5, and when the storage 115 is partitioned as shown in (a) to (d) in FIG. 7, the controller 180 may control the doors 120 to open only selected storage sections 115 without opening other storage sections 115.

Figure 8:
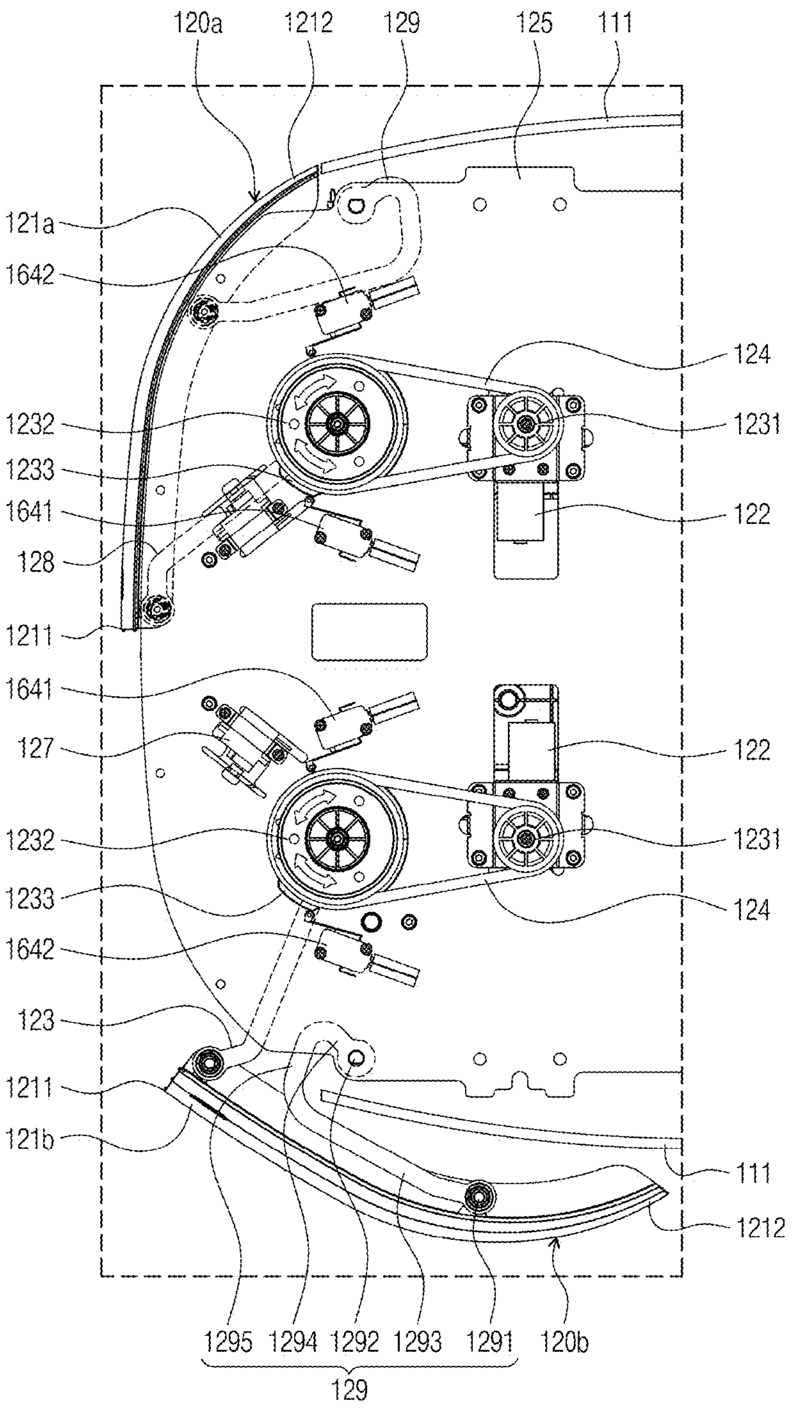
FIG. 8 is a plan view showing a door driver of a delivery robot according to an embodiment of the present disclosure.

FIG. 8 is a plan view showing a door driver 122, 1231, 1232, 124, 125, 128, and 129 of the delivery robot 100 according to an embodiment of the present disclosure. A state in which a left side is opened and a right side is closed is shown. Each door driver may be disposed to drive each of a pair of door panels 121*a* and 121*b* arranged in the left and right direction.

In addition, because the doors 120 are divided into the vertical direction, door drivers of upper doors 120*a* and 120*b* that cover the upper storage section 115*e* may be located at upper sides of the door panels 121*a* and 121*b*, that is, at an upper portion of the storage 115. Door drivers of the lower doors 120*c* and 120*d* that cover the lower storage section 115*f* may be located at lower sides of the door panels 121*c* and 121*d*, that is, at a lower portion of the storage 115.

The door 120 of the present disclosure includes the door panel 121 that covers the body storage 115 in the closed state and constitutes at least a portion of one side of the body housing 111, a first door link 128 whose first end 1281 is pivotably coupled to the door panel 121 and whose second end is pivotably coupled to the body housing 111, and the motor 122 that provides a pivoting force to the first door link 128.

The door driver may be disposed on a driver plate 125, and some components thereof may be disposed on one surface of the driver plate 125 and the remaining components thereof may be disposed on the other surface, or a thick member such as the motor 122 may be disposed on the door driver plate 125 by defining a hole in the door driver plate 125.

In the present embodiment, as shown in FIG. 8, pulleys 1231 and 1232, a flat belt 124, and door sensors 1641 and 1642 may be located on one surface of the door driver plate 125, and the door links 128 and 129 may be located on the other surface of the door driver plate 125. The motor 122 may be disposed by defining the hole in the door driver plate 125 considering the thickness of the motor 122. The other surface of the door driver plate 125 on which the door links 128 and 129 are located is disposed to face the storage 115.

The storage 115 may include a storage housing 112 (see FIG. 24) to cover the door links 128 and 129 and a driver of the sliding shelf 131, which will be described later. The storage housing 112 may include a storage base 1123 (see FIG. 24) constituting a bottom surface, and a storage seal 1122 (see FIG. 18) constituting a top surface. The door link may be located below the storage base 1123 and above the storage seal 1122.

The door panel 121, as a member that covers the body storage 115, may form a continuous surface with the body housing 111 in a closed state to constitute an outer appearance of the body 110. The door panel 121 may be formed slightly wider in the left and right direction on a front surface of the body housing 111 to facilitate the storage and reception of the item.

The door panel 121 may extend beyond the front surface of the body housing 111 and may be bent in a lateral direction. Hereinafter, for convenience of description, an edge in a closing direction of the door panel 121 is referred to as a first door edge 1211 and an edge in an opening direction of the door panel 121 is referred to as a second door edge 1212.

Figure 9:
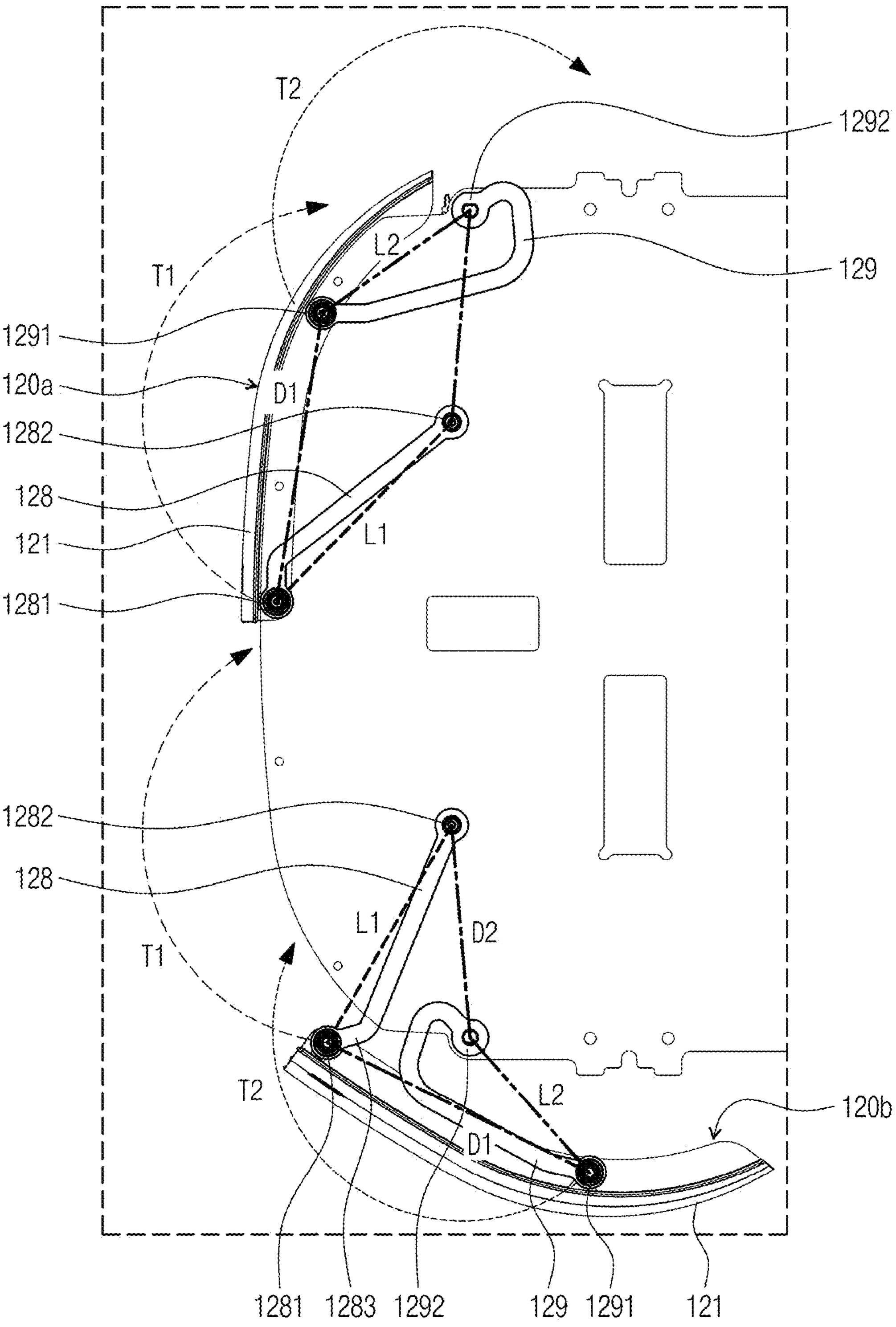
FIG. 9 is a perspective view showing a door driver of a delivery robot according to an embodiment of the present disclosure.

The motor 122 may be directly connected to the link, but may include the pair of pulleys 1231 and 1232 and the flat belt 124 surrounding the pair of pulleys 1231 and 1232, as shown in FIG. 9. The flat belt 124 synchronizes the pair of pulleys 1231 and 1232. The first pulley 1231 connected to the motor 122 rotates, and the flat belt 124 moves along an outer circumferential surface of the first pulley 1231.

A rotational force is transmitted via the flat belt 124 to rotate the second pulley 1232, and the second pulley 1232 is coupled to a second end 1282 of the first door link 128. The first door link 128 may pivot around a rotation axis of the second pulley 1232 based on the rotation of the second pulley 1232, and the first end 1281 of the first door link 128 may pivot while drawing an arc that is centered around the rotation axis of the second pulley 1232.

Hereinafter, for convenience of description, a direction in which the first door link 128 pivots in the direction in which the door panel 121 opens is referred to as a first pivot direction, and a direction in which the first door link 128 pivots in the direction in which the door panel 121 closes is referred to as a second pivot direction.

Depending on the left and right direction of the door 120, the first pivot direction may be clockwise or counterclockwise. The first pivot direction of the first door link 128 shown on a left side in FIG. 8 is counterclockwise and the second pivot direction thereof is clockwise.

The flat belt 124 has a tape shape with no protrusion formed on the belt, and no teeth are also formed on outer surfaces of the first pulley 1231 and the second pulley 1232. The flat belt 124 may move using a friction force between the flat belt 124 and the first pulley 1231 and the second pulley 1232, and when an external force greater than the friction force is applied, the flat belt 124 may slip with the second pulley 1232.

When an object or a hand is caught in the door 120, the door panel 121 is not able to move and the second pulley 1232 is not able to rotate. When the rotation of the second pulley 1232 is limited, the slip occurs with the flat belt 124. That is, even when the motor 122 rotates the first pulley 1231, the second pulley 1232 may not rotate.

When using a belt with the protrusion, there is a problem that when the object gets caught and the door panel 121 stops, the motor 122 is not able to rotate and a counter electromotive force is applied. The slip may occur between the flat belt 124 and the second pulley 1232, thereby preventing a failure of the motor 122 caused by the counter electromotive force.

By forming the first pulley 1231 to have a diameter smaller than that of the second pulley 1232, an rpm of the motor and a movement amount of the second pulley may be matched. The first pulley 1231 may only rotate about 120° to change the state of the door 120 from the closed state to the open state, and the first pulley 1231 may rotate a plurality of times because the first pulley 1231 is smaller than the second pulley 1232.

The second pulley 1232 may include a sensing protrusion 1233 protruding from an outer circumferential surface thereof. A location of the sensing protrusion 1233 may vary depending on the rotation of the second pulley 1232. A closing detection sensor 1641 in contact with the sensing protrusion 1233 in the closed state and an opening detection sensor 1642 in contact with the sensing protrusion 1233 in the open state may be included.

The door panel 121 on the right side in FIG. 8 is in the closed state, and the sensing protrusion 1233 of the second pulley 1232 on the right side is in contact with the closing detection sensor. When the closing detection sensor 1641 is turned on, the controller 180 may determine that the door panel 121 completely covers the body opening and may allow the delivery robot 100 to travel.

In one example, the door panel 121 on the left is in the open state, and the sensing protrusion 1233 on the left side is in contact with the opening detection sensor 1642. The controller 180 may detect that the opening detection sensor 1642 is turned on, determine that the door panel 121 is completely open, and extend the sliding shelf 131.

The first end 1281 of the first door link 128 may be pivotably coupled to the door panel 121. Because the door drivers of the upper doors 120*a* and 120*b* are located at the upper side of the storage 115, the first end 1281 of the first door link 128 may be coupled to an upper end of the door panel 121. The door drivers of the lower doors 120*c* and 120*d* are located at the lower side of the storage 115, so that the first end 1281 of the first door link 128 may be coupled to a lower end of the door panel 121.

In the present disclosure, the door panel 121 is constructed to slide with an angle thereof changing in the lateral direction along the outer surface of the body housing 111 while being opened, thereby preventing the door panel 121 from interfering with the body housing 111.

A second door link 129 may be further included such that, when the first door link 128 opens the door panel 121, the door panel 121 slides and is open while changing a direction. The second door link 129 converts a force pushing the door panel 121 in the lateral direction by the first door link 128 into a pivoting force and guides the second edge of the door panel 121 in a rearward direction of the body 110.

The first door edge 1211 of the door panel 121 may be located at a center of the body opening in the closed state and located at a side of the body opening in the open state. The first end 1281 of the first door link 128 may be coupled to the first door edge 1211 of the door panel 121 to move along the body opening without interfering with the body housing 111 when switching from the closed state to the open state.

A first end 1291 of the second door link 129 is coupled to the door panel 121 and a second end thereof is coupled to the body housing 111. The first end 1291 and the second end of the second door link 129 are connected to the door panel 121 and the body housing 111 at locations spaced apart from the first end 1281 and the second end 1282 of the first door link 128, respectively.

As shown in FIG. 8, the first end 1291 of the second door link 129 may be fastened at a bent portion of the door panel 121, that is, a location between a front portion of the door located on the front surface and a side portion of the door located on a side surface.

When the door panel 121 moves laterally by the first door link 128, the second door link 129 may pivot to change the angle of the door panel 121. The second door link 129 may pivot in the same direction as the first door link 128, and the door panel 121 may be switched between the closed and open states via linkage of the pair of door links 128 and 129.

FIG. 9 is a conceptual diagram for illustrating an operation of the links of the delivery robot 100 according to an embodiment of the present disclosure. It is shown that the left side is in the open state and the right side is in the closed state.

The first door link 128 and the second door link 129 have a bent shape, but spacings L1 and L2 between the ends 1281, 1282, 1291, and 1292 of the respective links are constant. In addition, the first end 1281 of the first door link 128 and the first end 1291 of the second door link 129 are coupled with the door 120, so that a first distance D1 is constant. Further, the second end 1282 of the first door link 128 and a second end 1292 of the second door link 129 are coupled to the body housing 111, so that a second distance D2 is constant.

Because the first distance D1 and the second distance D2 are fixed and the first spacing L1 and the second spacing L2 are constant, the first door link 128 and the second door link 129 pivot in a form in which a quadrangle with four sides of the first distance D1, the second distance D2, the first spacing L1, and the second spacing L2 is formed and a shape of the quadrangle changes as an inner angle of the quadrangle changes.

When switching from the closed state to the open state, the first door link 128 receives the pivoting force of the motor 122 and the first end 1281 pivots along a first trajectory T1. The first door link 128 pushes the door panel 121 outwards (the opening direction), and the first end 1291 of the second door link 129 coupled to the door panel 121 pivots along a second trajectory T2 while maintaining the first distance D1 from the first end 1281 of the first door link 128.

Figure 10:
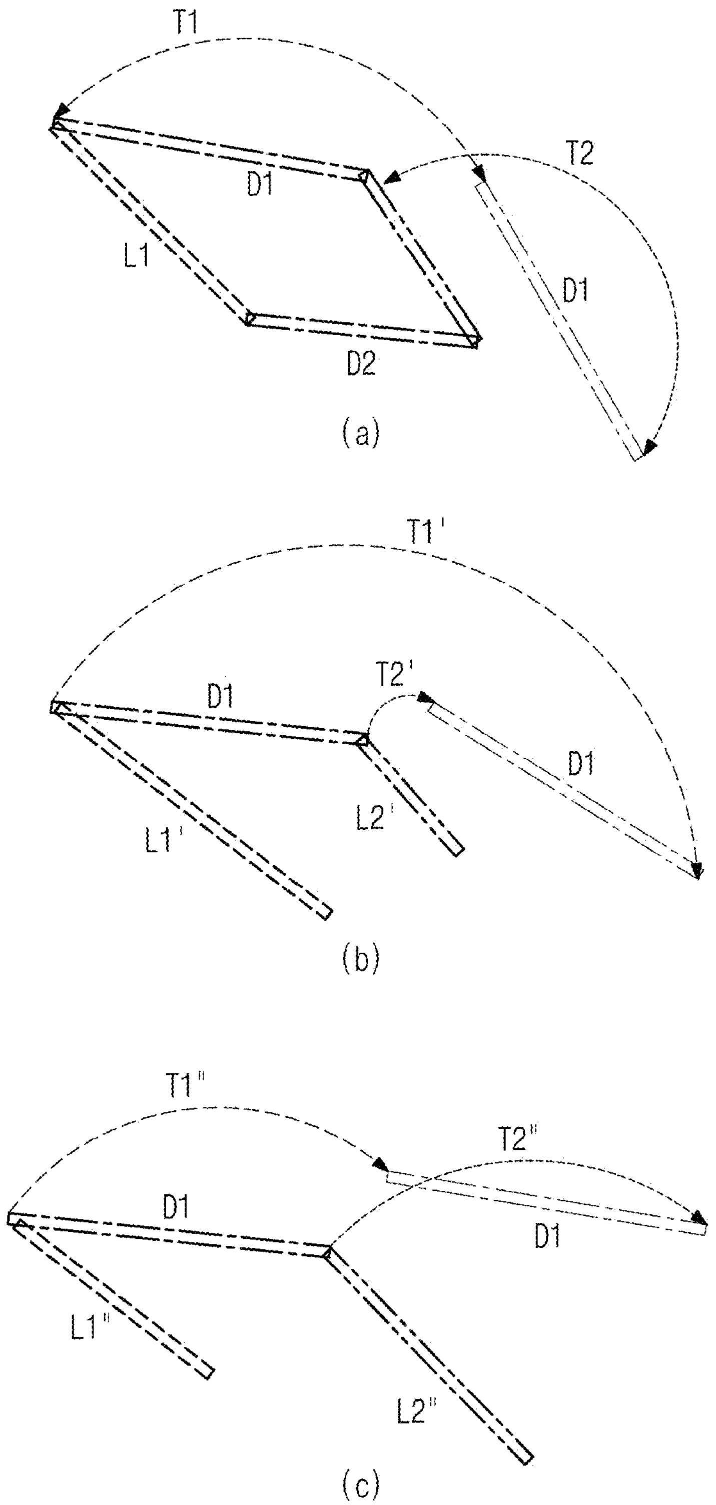
FIG. 10 is a conceptual diagram for showing an operation of a link of a delivery robot according to an embodiment of the present disclosure.

FIG. 10 is a diagram showing trajectories of the door 120 based on the first spacing L1 of the first door link 128 and the second spacing L2 of the second door link 129. (a) is a diagram showing that both ends of the first door link 128 according to the embodiment in FIG. 9. are disposed to have the first spacing L1 therebetween, and both ends of the second door link 129 are disposed to have the second spacing L2 therebetween. (b) shows a case in which a first spacing L1' is greater than the first spacing L1 in the embodiment in (a), and (c) shows a case in which a second spacing L2" is greater than the second spacing L2 in the embodiment in (a).

As in (b), when the first spacing L1' of the first door link 128 is greater and a second spacing L2' of the second door link 129 is smaller than the first spacing L1 and the second spacing L2 in the embodiment in (a), a turning radius of the first door edge 1211 of the door 120 increases, so that the door 120 may pivot and open like a hinged door without sliding.

As in (c), when the second spacing L2" of the second door link 129 is greater than the second spacing L2 in the embodiment in (a), the door 120 may be opened laterally while maintaining a horizontal state of the door panel 121.

When the length of the first spacing L1' is too great as shown in (b) in FIG. 10, the door 120 becomes the hinged door, and when the first spacing L1" is smaller than the second spacing L2" as shown in (c) in FIG. 10, the door panel 121 may pivot while maintaining the horizontal direction or the second door edge 1212 may rather protrude forward.

For the second door edge 1212 to be pushed rearwards and move closer to the side surface of the body housing 111 when the door panel 121 slides, it is appropriate that the first spacing L1 of the first door link 128 is slightly greater than the second spacing L2 of the second door link 129 as shown in (a).

Figure 11:
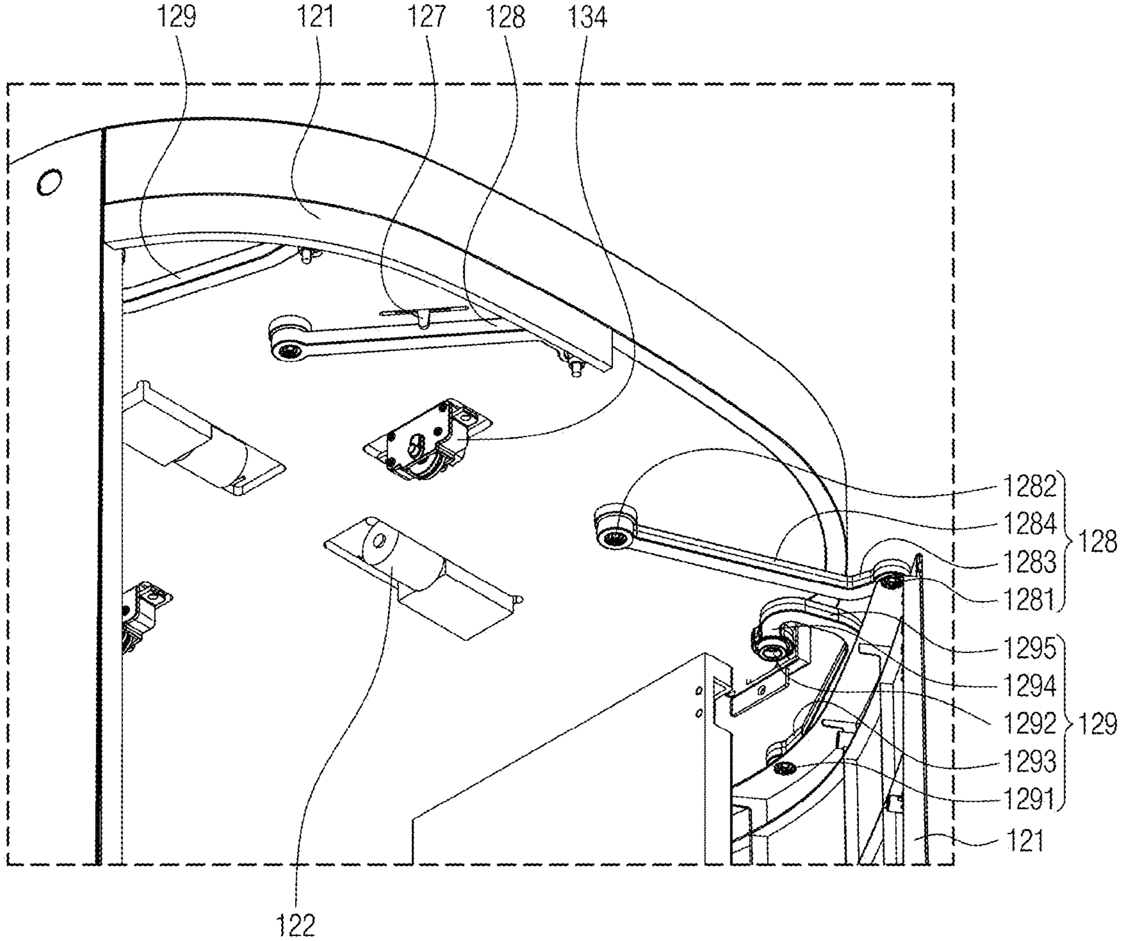
FIG. 11 is a bottom view of a door driver of a delivery robot according to an embodiment of the present disclosure.

FIG. 11 is a bottom view of the door driver of the delivery robot 100 according to an embodiment of the present disclosure. Referring to FIG. 11, the first door link 128 may have a shape in which a first portion 1283 located at the first end 1281 and a second portion 1284 located in a direction of the second end 1282 are bent at a predetermined angle. The first portion 1283 is located adjacent to the first end 1281 and has a relatively smaller length than the second portion 1284.

Because the first end 1281 of the first door link 128 is coupled to the first door edge 1211 of the door panel 121, the first portion 1283 of the first door link 128 is exposed to the outside when the door 120 is open. It is desirable to place the first portion 1283 close to an inner surface of the door panel 121 such that the first portion 1283 exposed to the outside is visible as little as possible.

As shown in FIG. 8, the first portion 1283 of the first door link 128 may be bent toward the first door edge 1211 of the door panel 121. The first end 1281 may be disposed parallel to the inner surface of the door panel 121 in the closed state and may pivot in the open state, so that the first end 1281 may be spaced apart from the inner surface of the door panel 121, but may be closer to the door panel 121 than when the first portion and the second portion 1284 are straight to reduce a degree of exposure to the outside.

The second door link 129 may be bent in a U shape, so that the first end 1291 and the second end 1292 may face the same direction. The second end 1292 of the second door link 129 may be located at the side of the body housing 111 in the open state as shown in FIG. 8 and move the second edge 1212 of the door rearwards.

For the second door link 129 to be disposed without interference with the body housing 111, the second door link 129 may include a U-shaped bent portion 1295 (FIG. 11), and the first end 1291 and the second end 1292 may face the same direction.

A first portion 1293 including the first end 1291 is a portion that leads the pivoting movement of the second door link 129, so that the first portion 1293 may be greater than a second portion 1294 including the second end 1292, and the second portion 1294 may have a length to avoid the interference with the body housing 111. When the door 120 is open, the body housing 111 may be located between the first portion 1293 and the second portion 1294 of the second door link 129, like the door 120*b* on the left side in FIG. 8.

The second door link 129 is not directly connected to the motor 122, but guides the door panel 121 to open in the determined trajectory without shaking. The first door link 128 is located only at the upper or lower side of the door panel 121 because of the arrangement of the motor 122, but the second door link 129 may be coupled to both the upper and lower sides of the door panel 121 (see FIG. 5).

That is, the second door link 129 may be located at the vertical center of the storage 115 in addition to the upper and lower sides thereof. Referring to FIG. 6, a pair of second door links 129 located at the vertical center of the storage 115 may be arranged in the vertical direction, and one may be connected to the upper door 120*a* and 120*b* and the other may be connected to the lower door 120*c* and 120*d*.

Referring to FIG. 6, the second door links 129 may be located at both sides of the middle shelf 132, and the middle shelf 132 may include grooves at left and right sides thereof to provide space for the second door link 129 to pivot.

Figure 12:
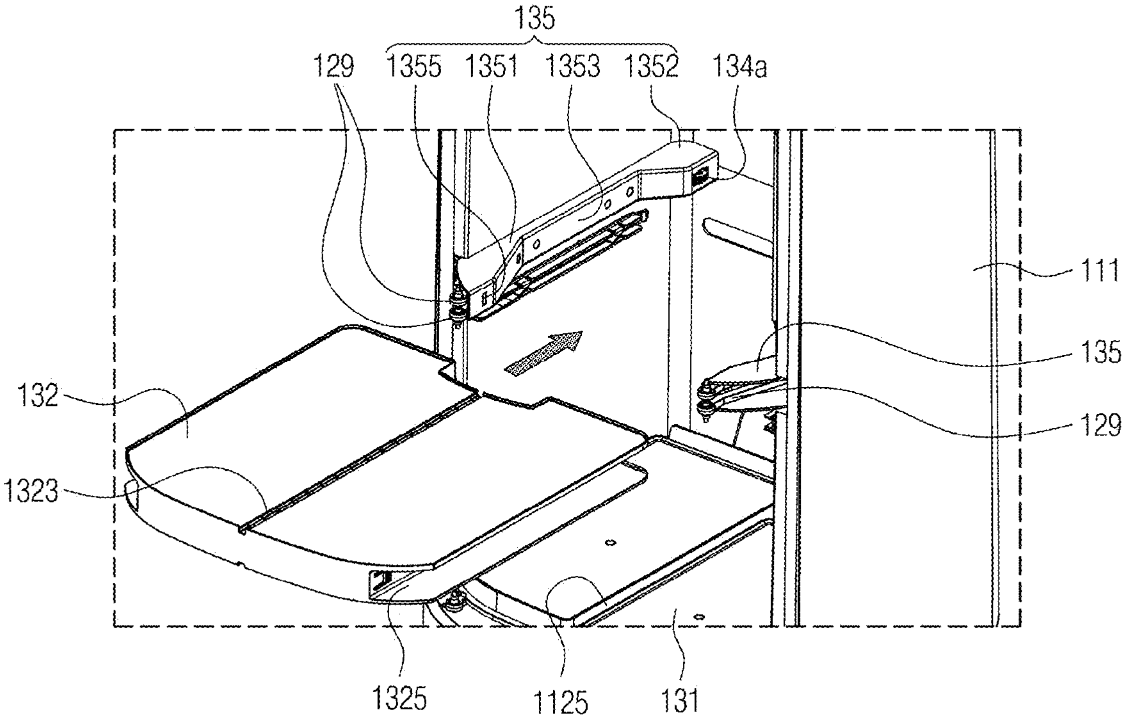
FIG. 12 is a diagram showing a method for coupling a middle shelf of a delivery robot according to an embodiment of the present disclosure.

When the middle shelf 132 is separated, a link cover 1351 to cover the second door link 129 may be further included such that the second door link 129 is not exposed, and the link cover 1351 may serve as the shelf support 135 that supports the middle shelf 132 (see FIG. 12).

Because the door driver uses the flat belt 124, the slip may occur between the second pulley 1232 and the flat belt 124 and the door panel 121 may be opened. Additionally, a third party other than an item recipient may forcibly open the door 120 and take the item.

Therefore, a locking device to lock the door 120 is needed. As shown in FIG. 11, a locking lever 127 that limits the pivoting of the first door link 128 may be disposed. The locking lever 127 may be selectively introduced and withdrawn along the trajectory of the first door link 128. To prevent the first door link 128 pivoting from the locked state to the open state, the locking lever 127 may be located in the first pivot direction for switching the locked state to the open state.

The locking motor 122 that controls the locking lever 127 to be selectively located in the first pivot direction of the first door link 128 may operate to protrude the locking lever 127 when the closing detection sensor 1641 is turned on, and may introduce the locking lever 127 such that the first door link 128 may pivot in the first pivot direction when a command to open the door 120 is input (see the right door 120*b* in FIG. 11).

When the door 120 is not able to operate because of an operation error of the delivery robot 100, the lock lever 127 may be manually introduced to release the locking in an emergency situation in which the door 120 must be opened manually. When a thin, long member like a ruler is inserted into the upper end or the lower end of the door panel 121 and pushes the lock lever 127, the lock lever 127 may be introduced without interference with the first door link 128 and the door panel 121 may be opened manually.

As seen in FIGS. 6 and 7, the middle shelf 132 that partitions the storage 115 of the present disclosure in the vertical direction and the partition 133 that partitions the storage 115 in the left and right direction may be included, and the middle shelf 132 and the partition 133 may be optionally coupled to the body housing 111. Hereinafter, a method for coupling the middle shelf 132 and the partition 133 to each other will be described in detail.

FIG. 12 is a diagram showing a method for coupling the middle shelf 132 of the delivery robot 100 according to an embodiment of the present disclosure. As shown in FIG. 12, the middle shelf 132 may be inserted and coupled from the front using a slide scheme.

The shelf supports 135 that support the middle shelf 132 may be disposed at both sides of the storage 115. The middle shelf 132 may be concavely recessed at left and right sides thereof to include shelf rails 1325, and the middle shelf 132 may be inserted with the shelf supports 135 located on the shelf rails 1325. The shelf rail 1325 may be recessed with a depth corresponding to a protruding height of the shelf support 135.

As described above, the second door links 129 may be located not only at top and bottom of the storage 115, but also at the vertical center of the storage 115, and may be disposed at the left and right sides of the middle shelf 132.

The shelf support 135 may include the link cover 1351 that covers the second door link 129 to prevent interference with the second door link 129 when the middle shelf 132 is fastened to the storage 115. The link cover 1351 may protect the second door link 129 from being damaged, and when the middle shelf 132 is removed from the storage 115 as shown in FIG. 12, the link cover 1351 may minimize exposure of the second door link 129 to the outside. The link cover 1351 may be disposed in the front adjacent to the body opening of the shelf support 135.

The link cover 1351 may protrude corresponding to a motion range of the second door link 129. The shelf rail 1325 of the middle shelf 132 must be able to pass through an entire sections of the link cover 1351, so that the shelf rail 1325 may have a depth corresponding to a protruding height of the link cover 1351.

The shelf support 135 may be equipped with an elastic sensor 134 to detect whether the middle shelf 132 is mounted. When the middle shelf 132 is inserted, the elastic sensor 134 may be pressed and detect that the middle shelf 132 has been coupled to the shelf support 135.

Figure 13:
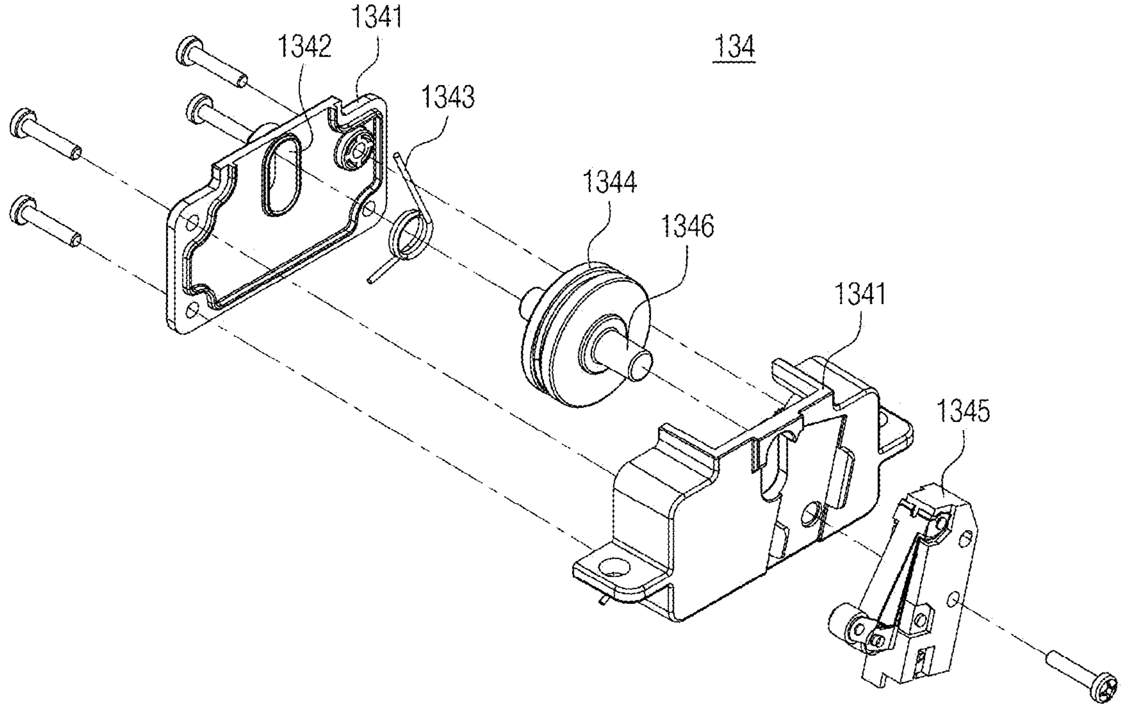
FIG. 13 is an exploded view of an elastic sensor of a delivery robot according to an embodiment of the present disclosure.

The elastic sensor 134 may also be used to detect whether the partition 133, which will be described later, has been mounted. To distinguish between the two elastic sensors, the elastic sensor that detects the mounting of the middle shelf 132 is referred to as a first elastic sensor 134*a* and the elastic sensor of the partition 133 is referred to as a second elastic sensor 134*b*. The first elastic sensor 134*a* and the second elastic sensor 134*b* may have the same configuration as shown in FIG. 13, with only a difference in arrangement locations.

The first elastic sensor 134*a* may be located inside the shelf support 135 so as to recognize full insertion of the middle shelf 132. The first elastic sensor 134*a* may be located inside the shelf support 135, but only an elastic latch 1344 may protrude from the shelf support 135. Hereinafter, an inner portion (a rear portion) of the shelf support 135 where the first elastic sensor 134*a* is located is referred to as a sensor cover 1352.

The sensor cover 1352 generates a signal by being in contact with an inner surface of the shelf rail 1325 of the middle shelf 132. The shelf rail 1325 is recessed with the depth corresponding to the protruding height of the link cover 1351 located at a front end of the shelf support 135, so that the sensor cover 1352 may also protrude to have the same height as the link cover 1351.

A portion 1353 located between the sensor cover 1352 and the link cover 1351 of the shelf support 135 may have the same height as the sensor cover 1352 and the link cover 1351, but to maximally use the space of the storage 115 when removing the middle shelf 132 as shown in FIG. 5, the portion 1353 located between the sensor cover 1352 and the link cover 1351 may have a concavely recessed shape.

Figure 14:
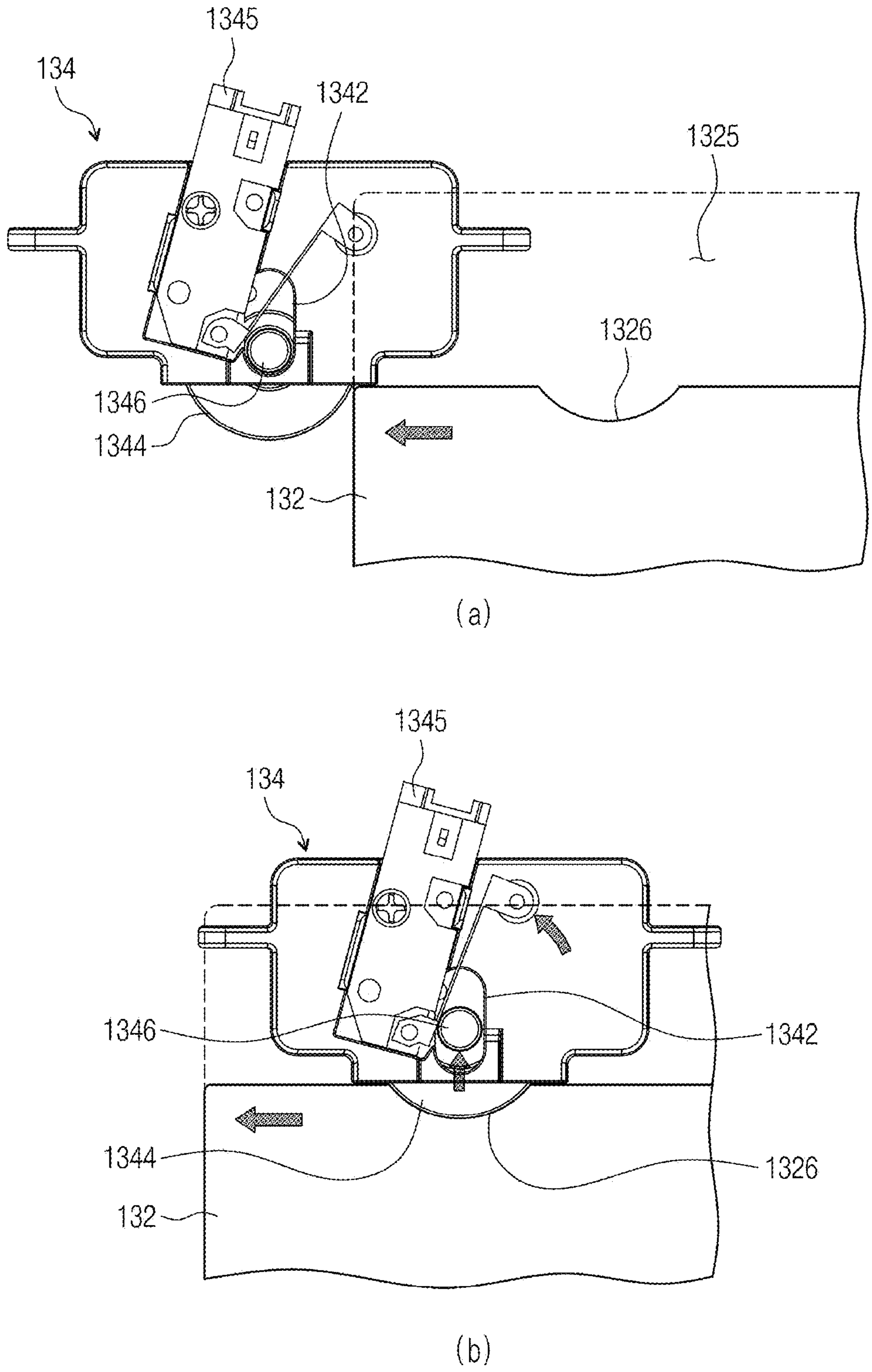
FIG. 14 shows an operation of a first elastic sensor of a delivery robot according to an embodiment of the present disclosure.

FIG. 13 is an exploded view of the elastic sensor 134 of the delivery robot 100 according to an embodiment of the present disclosure, and FIG. 14 shows an operation of the first elastic sensor 134*a* of the delivery robot 100 according to an embodiment of the present disclosure.

Referring to FIG. 13, the elastic sensor 134 may include a sensor housing 1341, the elastic latch 1344, a torsion spring 1343, and a switch 1345. The elastic latch 1344 is a plate-shaped member including a curved surface, and only a portion thereof exposed to the outside of the sensor housing 1341 needs to include the curved surface, but in the embodiment, the elastic latch 1344 is formed in a circular shape.

When the elastic latch 1344 does not have the curved surface, an end of the middle shelf 132 is not able to be caught and inserted. Therefore, as shown in (a) in FIG. 14, when the middle shelf 132 is inserted in a sliding manner and comes into contact with the curved surface of the elastic latch 1344, a force is switched in a direction of retracting the elastic latch 1344, so that the elastic latch 1344 may be retracted into the sensor housing 1341.

A guide protrusion 1346 inserted into a guide slot 1342 defined in the sensor housing 1341 is included. As the guide protrusion 1346 moves along the guide slot 1342, a degree of exposure of the elastic latch 1344 from the sensor housing 1341 may vary.

The torsion spring 1343 presses the elastic latch 1344 in an outward direction of the sensor housing 1341, so that the guide protrusion 1346 is positioned at one end (a lower side in the drawing) of the guide slot 1342 as shown in (a) in FIG. 14. As shown in (b) in FIG. 14, when an external force is applied and the elastic latch 1344 is pressurized, the torsion spring 1343 is deformed and the elastic latch 1344 is retracted into the sensor housing 1341.

The elastic latch 1344 may include the switch 1345 that is pressed by the guide protrusion 1346 inserted into the guide slot 1342 to generate the signal. As shown in (b) in FIG. 14, when the elastic latch 1344 is pressed, the guide protrusion 1346 may move along an extension direction of the guide slot 1342 and then press the switch 1345.

Because the switch 1345 is turned on when the end of the middle shelf 132 is touched, a first locking groove 1326 may be disposed adjacent to a rear end of the middle shelf 132.

The first locking groove 1326 defined in the middle shelf 132 corresponding to a shape of a protruding surface of the elastic latch 1344 may be included. As shown in (b) in FIG. 14, when the first locking groove 1326 reaches the location of the elastic latch 1344, the torsion spring 1343 presses the elastic latch 1344, causing the elastic latch 1344 to protrude and to be inserted into the first locking groove 1326.

The elastic latch 1344 protrudes to the maximum when the middle shelf 132 is not in contact therewith, and is retracted when the end of the middle shelf 132 comes into contact therewith. The elastic latch 1344 may be maintained in a maximally pressurized state in contact with the shelf rail 1325 of the middle shelf 132 until reaching the first locking groove 1326, and may protrude by a depth of the first locking groove 1326 when reaching the first locking groove 1326.

When the middle shelf 132 is pulled forward with a force with a magnitude equal to or greater than a predetermined magnitude, the elastic latch 1344 may be pressed and separated from the first locking groove 1326. When the middle shelf 132 needs to be removed from the storage 115 to construct the large-sized storage 115, the middle shelf 132 may be pulled out from the storage 115 manually.

Figure 15:
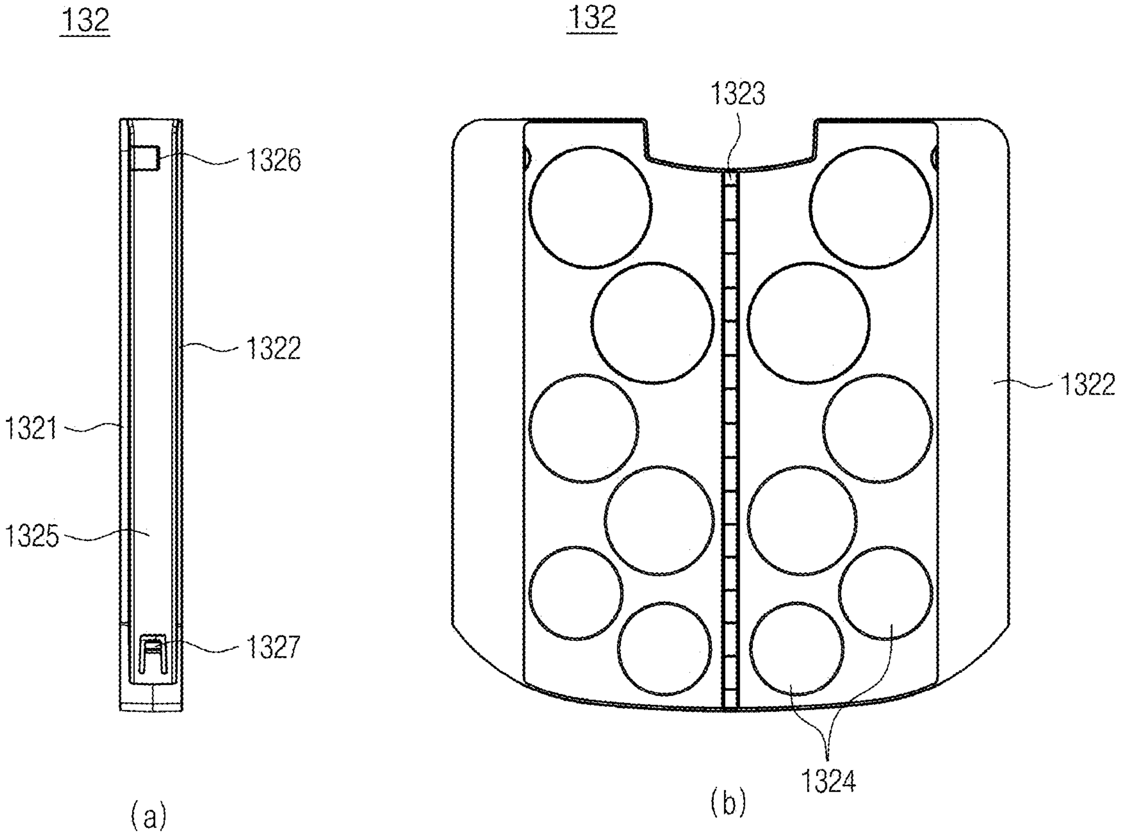
FIG. 15 shows a side view and a bottom view of a middle shelf of a delivery robot according to an embodiment of the present disclosure.

FIG. 15 shows a side view and a bottom view of the middle shelf 132 of the delivery robot 100 according to an embodiment of the present disclosure. (a) in FIG. 15 is the side view, an upper side is a rear side, a lower side is a front side, and the inner surface of the shelf rail 1325 is shown. As described above, the first locking groove 1326 into which the elastic latch 1344 is inserted may be disposed at the rear side of the shelf rail 1325.

The first elastic sensor 134*a* may detect whether the middle shelf 132 is inserted, and at the same time, prevent the middle shelf 132 from moving in the front and rear direction. However, because the middle shelf 132 is a shelf on which item is mounted, a shelf hook 1327 may be further included at the front side of the shelf rail 1325 for more stable fixation. Corresponding to the shelf hook 1327, the shelf support 135 may also include a fixing hook 1355, as shown in FIG. 12. The fixing hook 1355 may be formed on the link cover 1351 to be in contact with the inner surface of the shelf rail 1325.

One surface 1321 of the middle shelf 132 of the present disclosure may have a flat surface as shown in FIG. 12, but the other surface 1322 may include a cup holder 1324 as shown in (b) in FIG. 15. A cup has a great height compared to a bottom area and thus has a risk of flipping when the delivery robot 100 moves, so that the cup holder 1324 may be equipped in the middle shelf 132 itself to prevent the cup from flipping.

A portion of the cup holder 1324 may be retracted in a circular shape in a direction toward the one surface 1321 in the other surface of the middle shelf 132, and the cup holders 1324 of various sizes may be arranged. As shown in (b) in FIG. 15, left and right portions of the shelf rail 1325 are inserted, so that the cup holder 1324 is not able to be formed in the left and right portions of the shelf rail 1325.

Figure 16:
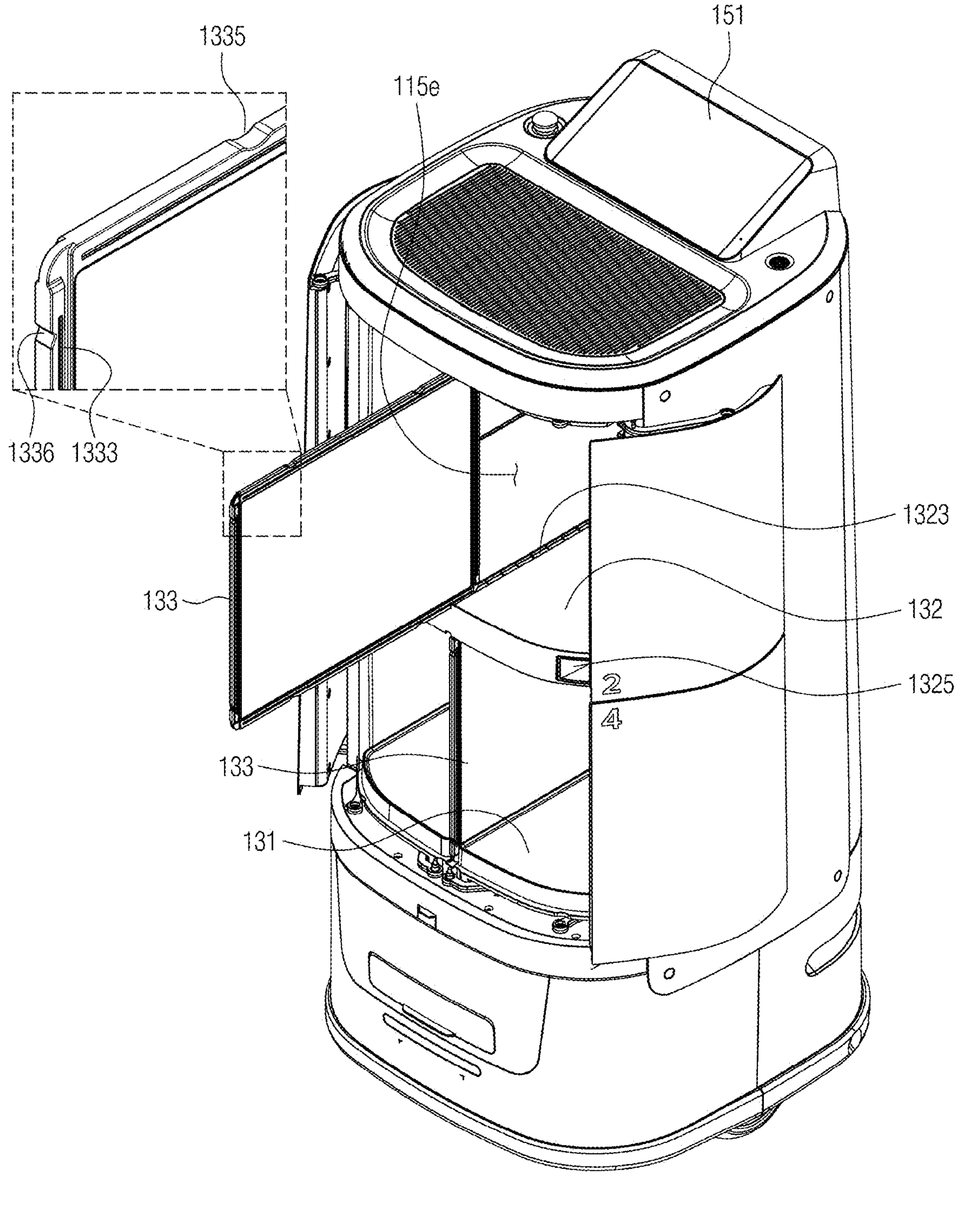
FIG. 16 is a diagram showing a method for inserting a partition into a storage of a delivery robot according to an embodiment of the present disclosure.
Figure 17:
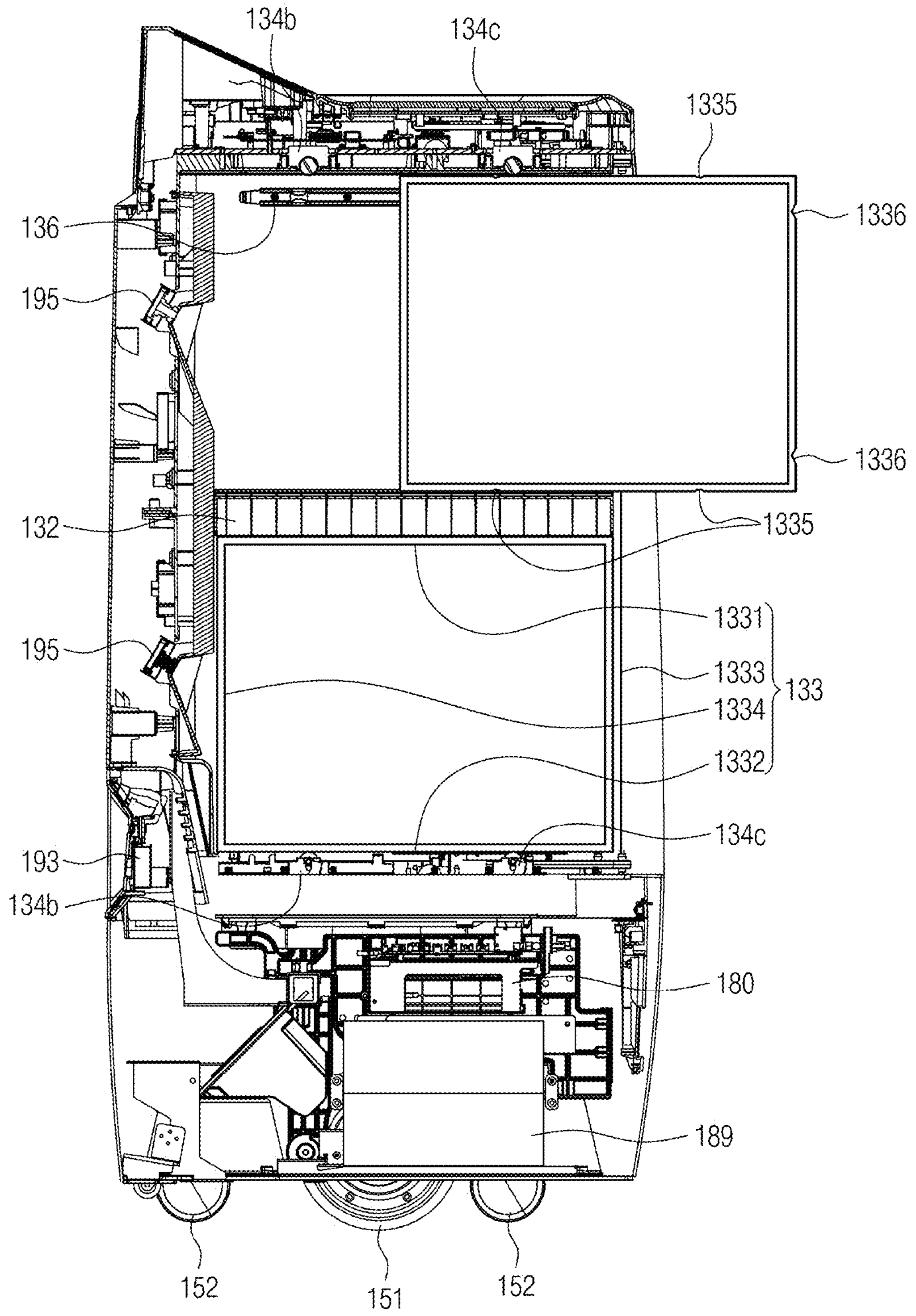
FIG. 17 is a cross-sectional view showing the inside of a storage of a delivery robot according to an embodiment of the present disclosure.

FIG. 16 is a diagram showing a method for inserting the partition 133 into the storage of the delivery robot 100 according to an embodiment of the present disclosure, and FIG. 17 is a cross-sectional view showing the inside of the storage of the delivery robot 100 according to an embodiment of the present disclosure.

By inserting the middle shelf 132, the storage may be partitioned into the upper storage section 115*e* and the lower storage section 115*f*. The storage 115 may be additionally partitioned in the left and right direction by inserting the partition 133 in the middle of the upper storage section 115*e* or the lower storage section 115*f*. A small item may be delivered to various shipping destinations when partitioning the storage 115.

The partition 133 may have a rectangular shape, and all four sides may have the same length, but in the present embodiment, a length in a first direction and a length in a second direction may be different from each other. In FIG. 17, sides arranged in the vertical direction are referred to as a first side 1331 and a second side 1332, and sides arranged in the front and rear direction are referred to as a third side 1333 and a fourth side 1334. A length of the first side 1331 and the second side 1332 may be greater than a length of the third side 1333 and the fourth side 1334.

The length of the third side 1333 and the fourth side 1334 may correspond to a vertical length of the upper storage section 115*e* or the lower storage section 115*f*, and the length of the first side 1331 and the second side 1332 may correspond to a length of the storage 115 in the front and rear direction.

The partition 133 may be inserted along a partition groove 1323 defined at the center of the middle shelf 132, and the partition grooves 1323 may be defined in both the one surface and the other surface of the middle shelf 132. Additionally, partition grooves 1125 into which the partitions 133 are inserted may be defined also in a ceiling 1122 and the base 1123 of the storage 115. To distinguish the partition groove 1323 of the middle shelf 132 from the partition groove 1323 of the storage 115, the partition groove 1323 of the middle shelf 132 will be referred to as a first partition groove 1323 and the partition groove 1323 of the storage 115 will be referred to as a second partition groove 1125.

The first side 1331 and the second side 1332 of the partition 133 may move in the sliding manner into the storage 115 along the partition groove 1323, and may include the second elastic sensor 134*b* to detect whether the partition 133 has been mounted.

The second elastic sensor 134*b* may use the same member as the first elastic sensor 134*a* of the middle shelf 132 described above. That is, the second elastic sensor 134*b* may also include the sensor housing 1341, the elastic latch 1344, the torsion spring, the guide slot 1342, and the switch 1345 shown in FIG. 13.

When the elastic latch 1344 of the second elastic sensor 134*b* is inserted into a second locking groove 1335 defined in the partition 133, the controller 180 may detect the mounting of the partition 133. Additionally, the second elastic sensor 134*b* and the second locking groove 1335 may fix the partition 133 so as not to be extended in a reverse direction along the partition groove 1323.

When the second elastic sensor 134*b* is disposed in the first partition groove 1323 located in the middle shelf 132, it is difficult to achieve signal connection, so that the second elastic sensor 134*b* may be formed in the second partition groove 1125 located in the body housing 111, as shown in FIG. 17. That is, the second elastic sensors 134*b* may be located at the top and the bottom of the storage 115.

When fixing the partition 133 with one second elastic sensor 134*b* and one second locking groove 1335, a fixing force may be weak, so that a pair of second elastic sensors 134*b* and 134*c* may be arranged in the front and rear direction and a pair of second locking grooves 1335 may also be defined in each of the first side 1331 and the second side 1332 as shown in FIG. 17.

Locations of the second locking grooves 1335 defined in one partition 133 are symmetrical, so that the second elastic sensors 134*b* and 134*c* may be fastened into the second locking grooves 1335 regardless of a direction in which the partition 133 is inserted.

Even only one second elastic sensor 134*b*, which detects whether the partition 133 has been mounted, is sufficient to detect the mounting. Therefore, only the second elastic sensor 134*b* located at an inner side of the storage 115 may have the switch 1345, and the second elastic sensor 134*c* located at an outer side of the storage 115 may omit the switch 1345 and include only the sensor housing 1341, the elastic latch 1344, and the torsion spring 1343.

The second elastic sensors 134*b* and 134*c* and the second locking grooves 1335 may restrict the movement of the partition 133 in the front and rear direction, and as described above, when the force with the magnitude equal to or greater than the predetermined magnitude is applied, the elastic latch 1344 may be pressed to extend the partition 133 from the partition groove 1323.

The partition groove 1323 may support a movement in the left and right direction of the partition 133, the partition grooves 1323 located at the top and the bottom of the partition 133 may fix a vertical location of the partition 133, and the partition 133 may be stably fixed to the storage 115.

Figure 18:
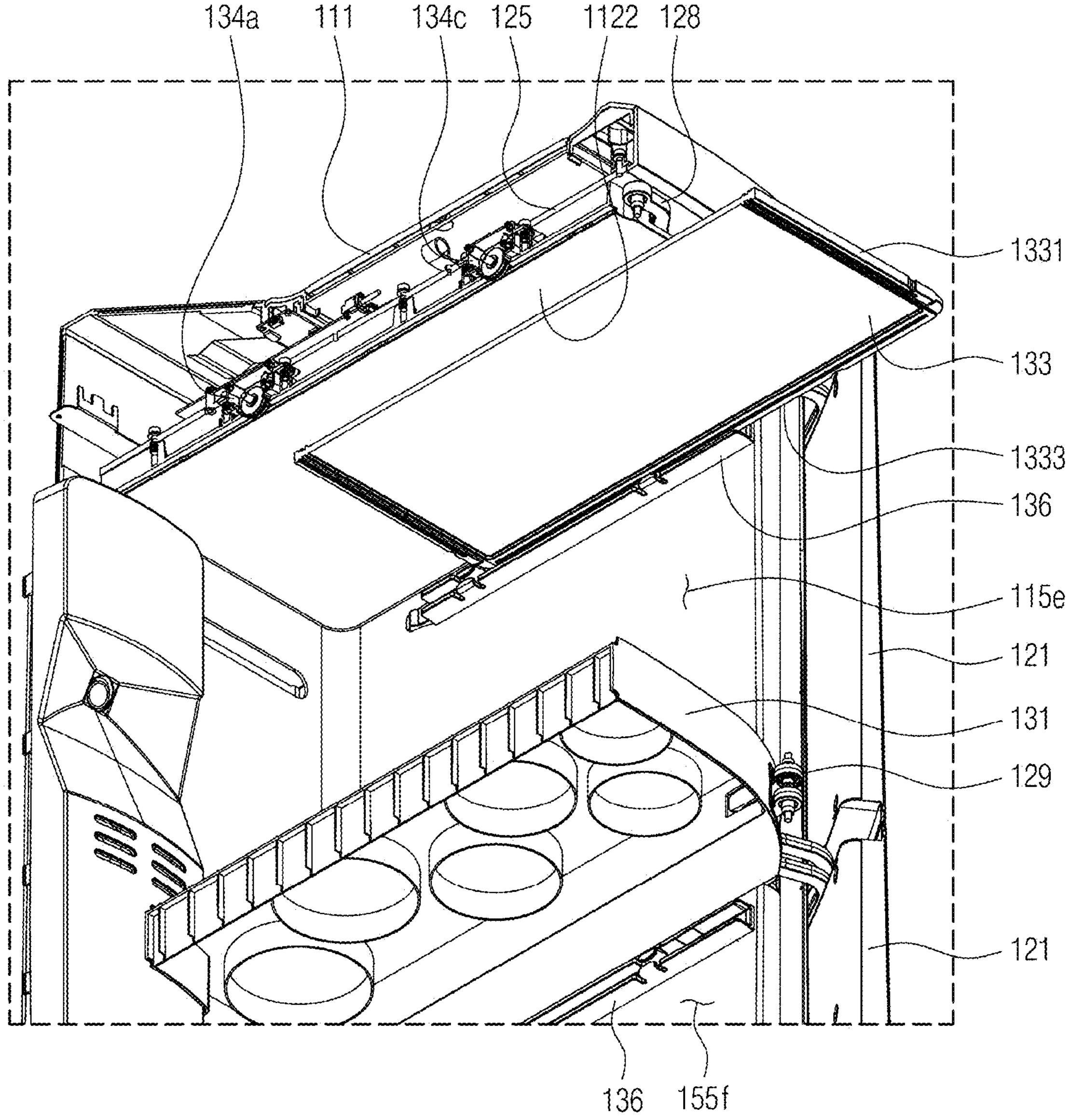
FIG. 18 is a diagram showing a method for storing a partition of a delivery robot according to an embodiment of the present disclosure.

FIG. 18 is a diagram showing a method for storing the partition 133 of the delivery robot 100 according to an embodiment of the present disclosure. When the partition 133 extended from the storage 115 is stored in a separate place, there is a risk of loss and there is an inconvenience of having to find the partition 133 when necessary.

Accordingly, in the present disclosure, a storage rail 136 may be included as means for storing the removed partition 133. As shown in FIG. 18, the storage rail 136 may be located at upper sides of the upper storage section 115*e* and the lower storage section 115*f*. After removing the partition 133 of the upper storage section 115*e*, the partition 133 may be stored on the storage rail 136 located at the upper side of the upper storage section 115*e*.

The length of the first side 1331 of the partition 133 may correspond to a length in the front and rear direction of the storage 115, and the length of the third side 1333 may correspond to a vertical length (a height) of the upper storage section 115*e* or the lower storage section 115*f*. When a horizontal length (a width) of the storage 115 corresponds to one of the length of the first side 1331 and the length of the third side 1333, the partition 133 may be inserted into the storage rails 136 located at both sides in the horizontal direction of the storage 115.

In the present embodiment, the width of the storage 115 may correspond to the length of the first side 1331, and the third side 1333 and the fourth side 1334 of the partition 133 can be inserted into the storage rail 136. The third side 1333 and the fourth side 1334 may include a structure to be stably fixed to the storage rail 136.

Figure 19:
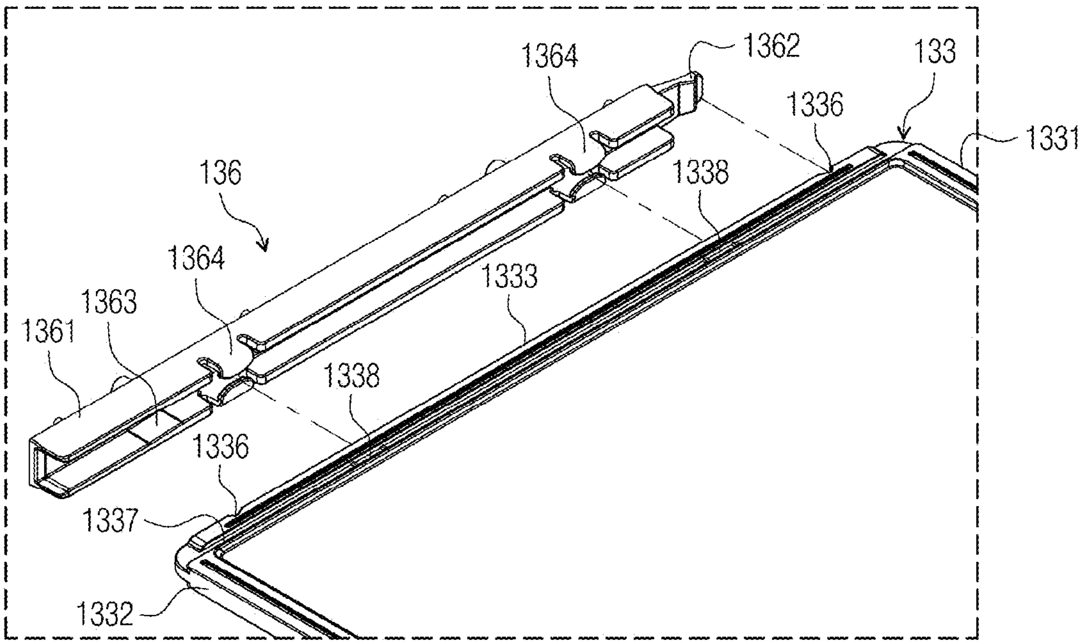
FIGS. 19 and 20 are diagrams showing a storage rail and a partition of a delivery robot according to an embodiment of the present disclosure.
Figure 20:
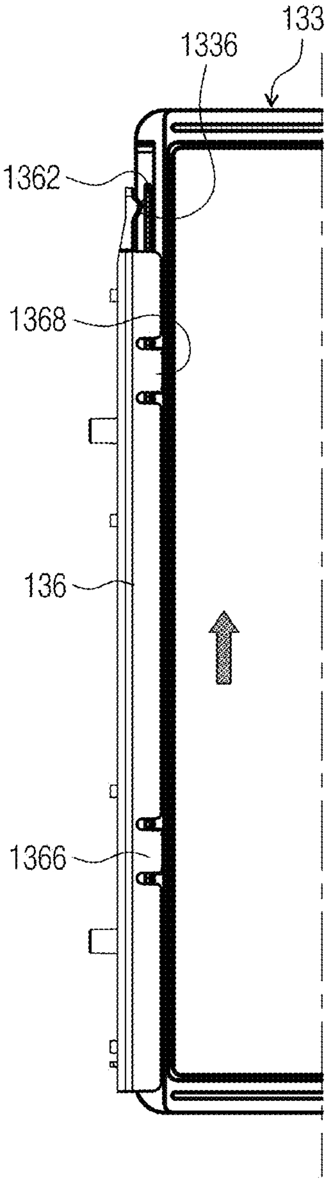

FIGS. 19 and 20 are diagrams showing the storage rail 136 and the partition 133 of the delivery robot 100 according to an embodiment of the present disclosure. FIG. 19 is a diagram showing a location where the partition 133 and the storage rail 136 are fastened with each other in a horizontal direction, and FIG. 20 shows a state in which the third side of the partition 133 is inserted into the storage rail 136.

Because the third side 1333 and the fourth side 1334 of the partition 133 have the same shape, a description will be made based on the third side 1333. The third side 1333 of the partition 133 is a structure to be fastened to the storage rail 136 and includes a hook groove 1336, a groove 1337, and a clip groove 1338.

The storage rail 136 may include a concave rail groove 1361 into which the third side 1333 of the partition 133 is inserted, and the partition 133 inserted into the rail groove 1361 may be supported at upper and lower portions. An entrance (a left side in the drawing) located at a front side of the storage rail 136 may be wide to facilitate the insertion of the partition 133, and may include an inclined portion 1363 that becomes narrower rearwards.

For the slide movement of the partition 133, a height of the narrowed rear end of the rail groove 1361 is greater than a thickness of partition 133, and a structure to fix the partition 133 when the partition 133 is fully inserted into the shelf rail 1325. The storage rail 136 may include a vertical clip 1364 protruding in a direction of the partition 133. When the vertical clip 1364 is inserted into the clip groove 1338 defined in the third side 1333 of the partition 133, the partition 133 may be fixed.

To have a passage through which the vertical clip 1364 passes when the partition 133 slides, the groove 1337 defined parallel to the third side 1333 at a location where the clip groove 1338 is defined may be included. As shown in FIG. 19, the vertical clip 1364 may be located at both upper and lower sides of the partition 133 and may fix the vertical location of the partition 133 inserted into the storage rail 136. A pair of clip grooves 1338 and a pair of vertical clips 1364 may be disposed symmetrically at both sides of the third side 1333 such that the partition 133 is fastened regardless of an insertion direction.

The storage rail 136 may include a storage hook 1362 located at a rear end. The storage hook 1362 may be inserted into the hook groove 1336 defined in the storage rail 136. When the storage hook 1362 is inserted into the hook groove 1336, while fixing a horizontal movement of the partition 133, the partition 133 may be prevented from being extended forwards. The storage hook 1362 is located only at the rear end of the storage rail 136, but the hook grooves 1336 may be implemented symmetrically in the third side 1333 so as not to limit the insertion direction of the partition 133.

When the partition 133 is not stably fixed to the storage rail 136, noise may occur while the delivery robot 100 is traveling, so that the partition 133 may be fixed to the storage rail 136 without shaking as the vertical clip 1364 and storage hook 1362 with elasticity are respectively inserted into the clip groove 1338 and the hook groove 1336 as shown in FIG. 20.

Figure 21:
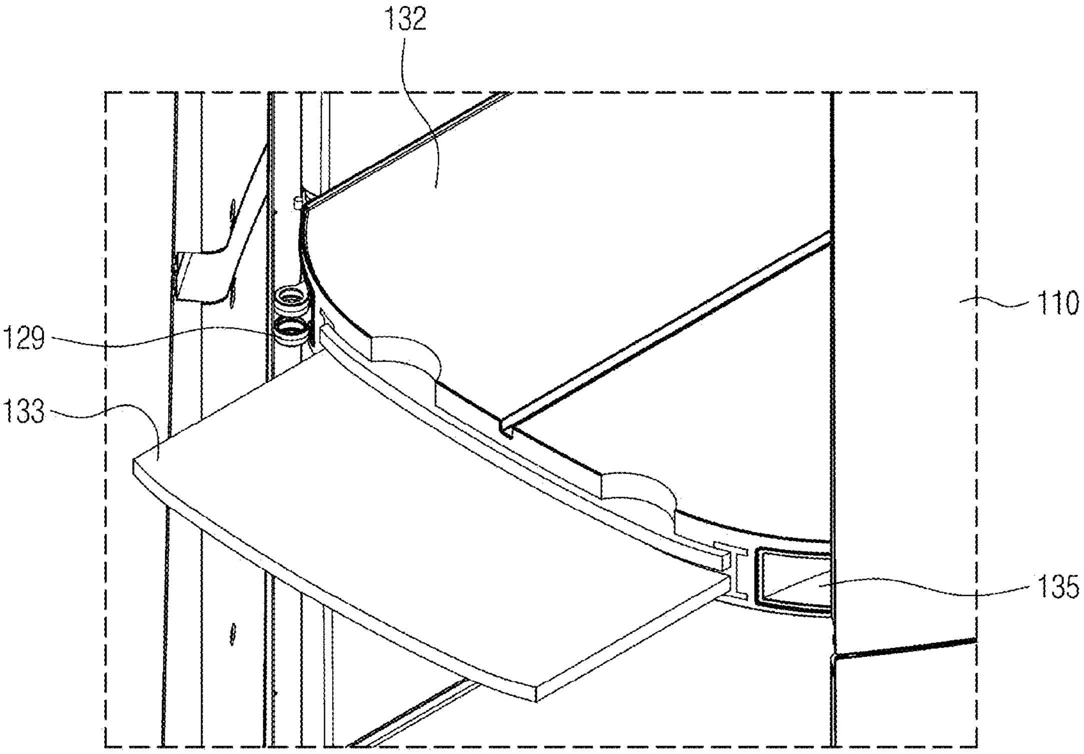
FIG. 21 is a diagram showing another embodiment of a method for storing a partition of a delivery robot according to an embodiment of the present disclosure.

FIG. 21 is a diagram showing another embodiment of a method for storing the partition 133 of the delivery robot 100 according to an embodiment of the present disclosure. The partition 133 of the present embodiment may be stored inside the middle shelf 132. The storage rail 136 may be located inside the middle shelf 132 and the partition 133 may be stored inside the middle shelf 132.

However, because the shelf rails 1325 are located at the left and right sides of the middle shelf 132, the first side 1331 and the second side 1332 of the partition 133 must be coupled with the storage rail 136. The clip groove 1338 and the hook groove 1336 that are respectively coupled to the vertical clip 1364 and the storage hook 1362 of the storage rail 136 may be defined in the first side 1331 and the second side 1332.

Because the present embodiment utilizes a space in a thickness direction of the middle shelf 132, the cup holder 1324 defined in the other surface of the middle shelf 132 in (b) in FIG. 15 may be omitted.

Figure 22:
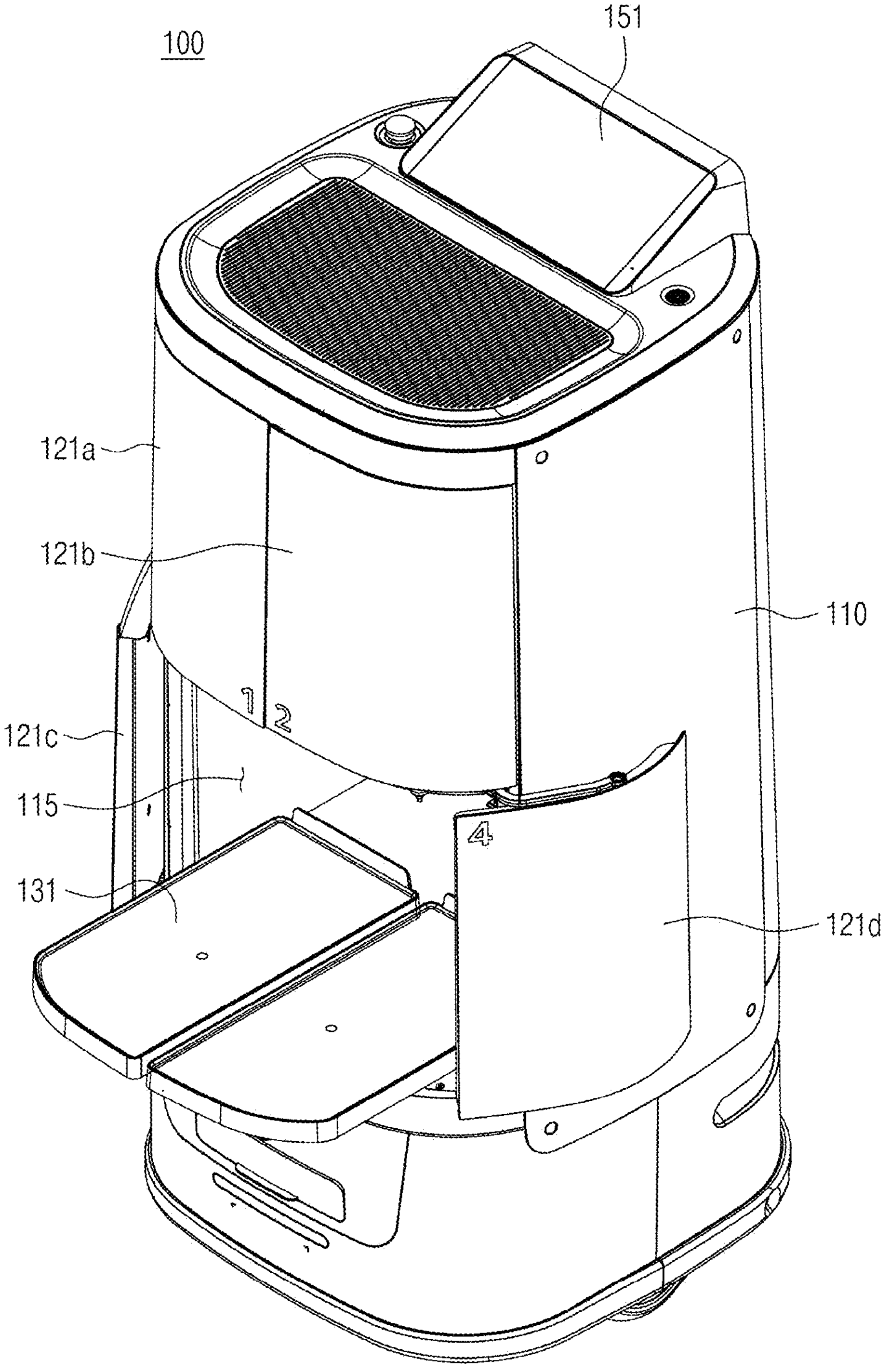
FIG. 22 is a perspective view showing a state in which a sliding shelf of a delivery robot is extended according to an embodiment of the present disclosure.

FIG. 22 is a perspective view showing a state in which the sliding shelf 131 of the delivery robot 100 is extended according to an embodiment of the present disclosure. When the middle shelf 132 is inserted into the delivery robot 100, an item located in the lower storage section 115*f* may not be clearly visible when the user is standing. Additionally, there is a difficulty in that the user has to bend over to take the item out to receive the item located in the lower storage section 115*f*.

Accordingly, the delivery robot 100 of the present disclosure may be equipped with the sliding shelf 131 that is extended in the sliding manner as shown in FIG. 22 such that the item in the lower storage section 115*f* may be easily seen and easily received.

The sliding shelf 131 may automatically protrude forwards when the door 120 is opened. A pair of sliding shelves 131 may be disposed to partition the lower storage section 115*f* in the left and right direction with the partition 133.

The pair of sliding shelves 131 may operate independently when the partition 133 is inserted into the lower storage section 115*f*. When the partition 133 is removed from the lower storage section 115*f*, one item may be disposed on the pair of sliding shelves 131, so that the pair of sliding shelves 131 may operate simultaneously.

Alternatively, as shown in FIG. 5, when the middle shelf 132 is removed and the storage is used as a single storage space, the four doors 120 may be opened simultaneously and the recipient may easily check the item on the sliding shelf 131. In this case, the sliding shelf 131 may not be extended.

In other words, the sliding shelf 131 may be controlled to operate only when the middle shelf 132 is inserted. When the first elastic sensor 134*a* detects whether the middle shelf 132 has been mounted, the controller 180 may extend the sliding shelf 131 when the door 120 is opened.

Figure 23:
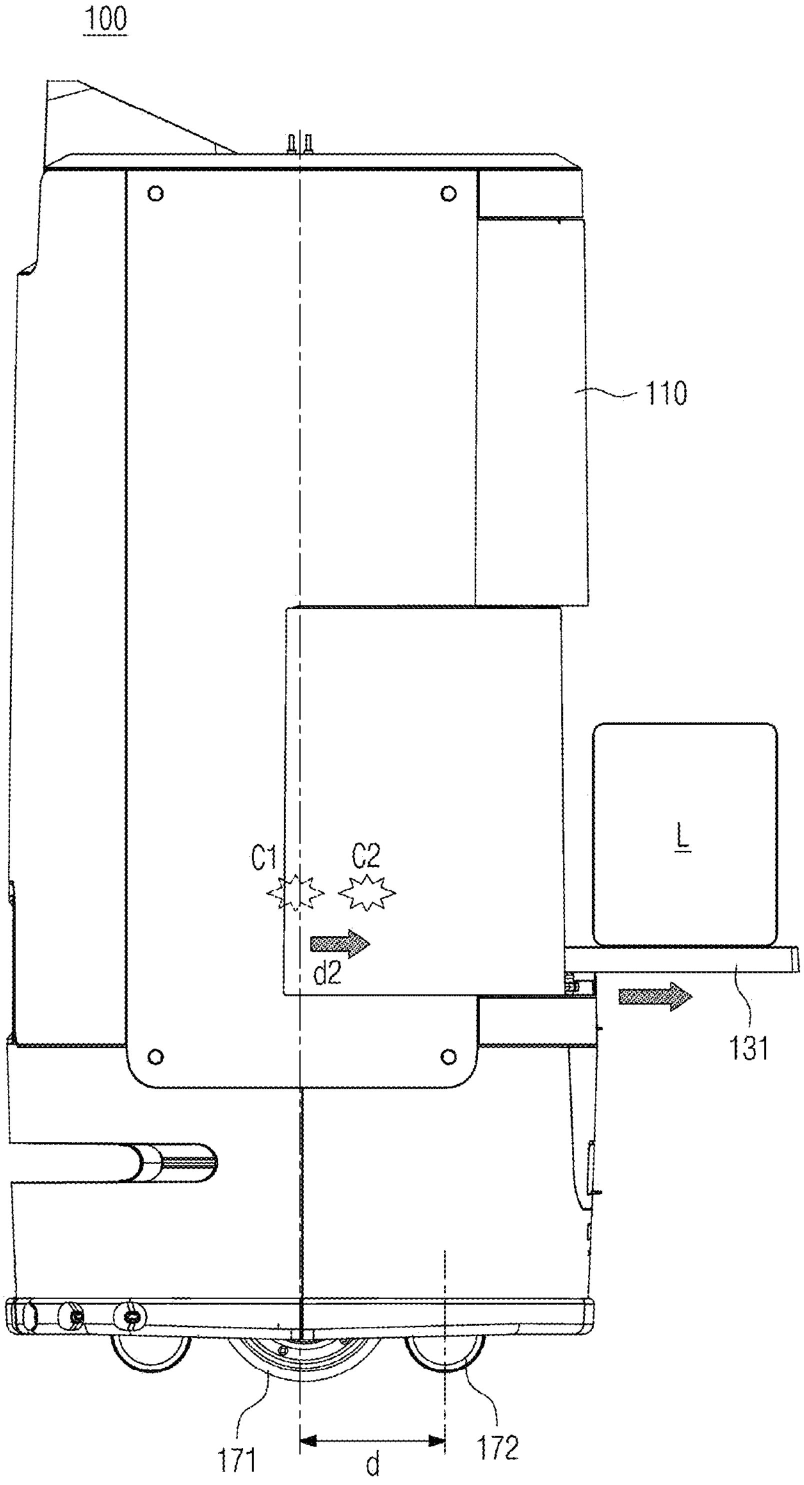
FIG. 23 is a side view showing a state in FIG. 22.

FIG. 23 is a side view showing a state in FIG. 22. When the sliding shelf 131 is extended forwards, a center of gravity may move (C1→C2) because of a weight of the item stored on the sliding shelf 131. It is desirable to design the change in the center of gravity to be smaller than a distance d between the driving wheel 171 and a caster 172.

For example, when the distance between the driving wheel 171 and the caster 172 is 150 mm and a weight of the item L stored on the sliding shelf 131 is 15 kg, the change in the center of gravity when extending the sliding shelf 131 forwards may be expected to be about 50 mm.

The controller 180 may control an operating range of the sliding shelf 131 differently depending on the weight of the stored item. Alternatively, when the internal camera 195 recognizes the item stored inside and it is determined that the item is disposed on an innermost side of the sliding shelf 131, the controller 180 may control an extension amount of the sliding shelf 131 to be greater.

Figure 24:
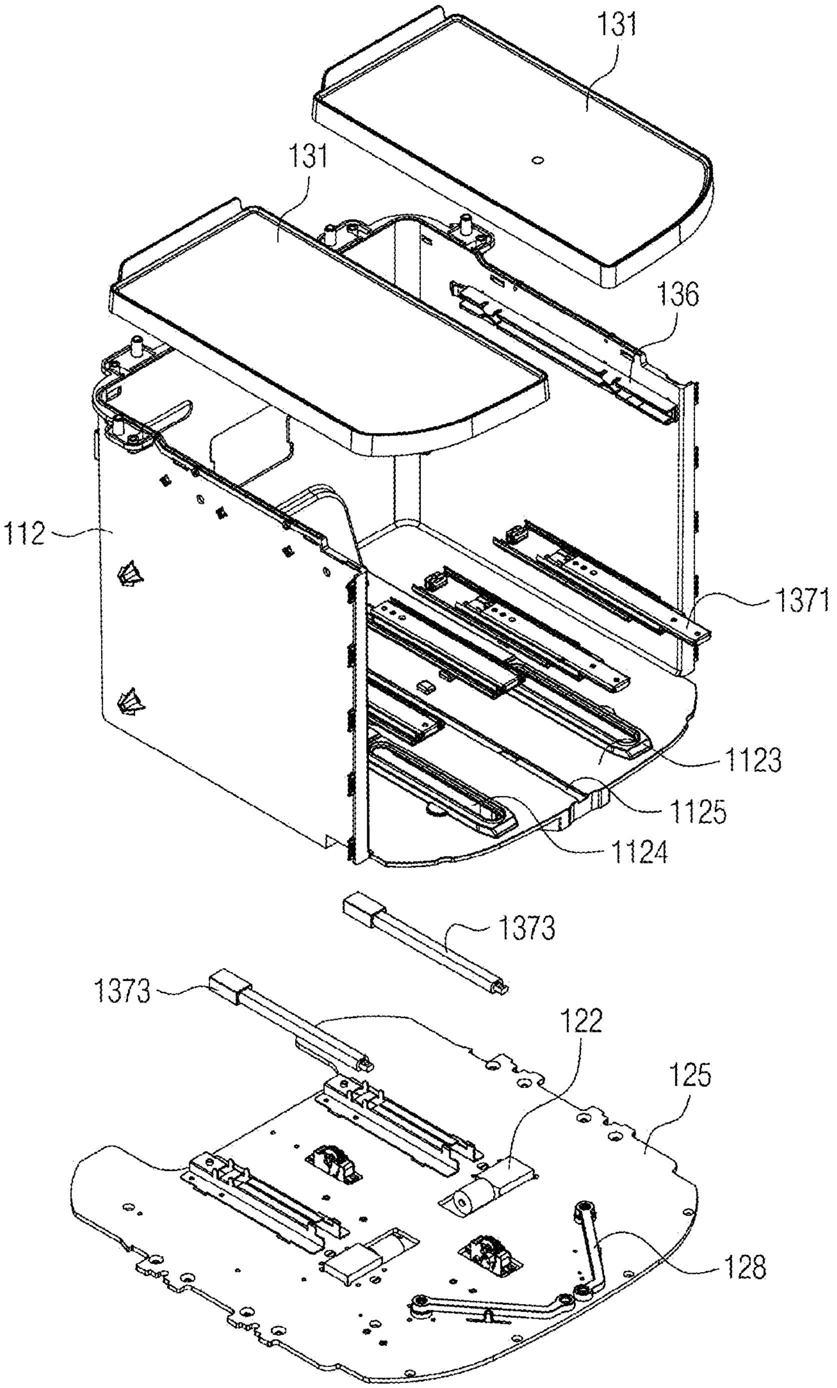
FIG. 24 is an exploded perspective view showing a sliding shelf and a shelf driver of a delivery robot according to an embodiment of the present disclosure.

FIG. 24 is an exploded perspective view showing the sliding shelf 131 and a shelf driver 137 of the delivery robot 100 according to an embodiment of the present disclosure. The sliding shelf 131 of the present disclosure may be located at the bottom of the lower storage section **115*f*. The sliding shelf 131 may slide in the front and rear direction on the storage base 1123 that constitutes a lower end of the storage 115. A space of the lower storage section 115*f* may become smaller than that of the upper storage section 115*e* corresponding to a vertical level of the sliding shelf 131**.

The present embodiment may include a linear actuator 1373 as the shelf driver 137 for driving the sliding shelf 131 in the front and rear direction. The linear actuator 1373 transmits a force to drive the sliding shelf 131 in the front and rear direction.

The linear actuator 1373 is able to support a weight in the driving direction, but is vulnerable to a force applied perpendicular to the driving direction. That is, when the item stored on the sliding shelf 131 is heavy, a load may be applied to the shelf driver 137, which may cause damage to the linear actuator 1373.

A sliding rail 1371 may be included to guide the driving of the sliding shelf 131 while supporting weights of the sliding shelf 131 and the item stored on the sliding shelf 131. The sliding rail 1371 may be coupled to a bottom surface of the sliding shelf 131 and may be located between the sliding shelf and the base 1123. The sliding rail 1371 may be constructed in multiple steps using a plurality of beams having a C-shaped cross-section. The sliding rail 1371 may include a bearing ball located between the beams, and the bearing ball may assist in smooth sliding movement between the beams.

As shown in FIG. 24, the linear actuator 1373 may be located lower than the storage base 1123. Because the sliding rail 1371 does not need to be connected to the controller 180, the sliding rail 1371 may be located on a top surface of the storage base 1123 and directly support the sliding shelf 131.

The sliding rail 1371 may support the sliding shelf 131 above the linear actuator 1373 of the sliding shelf 131 and may directly support the weights of the sliding shelf 131 and the item. A force may be prevented from being applied in the vertical direction to the linear actuator 1373 via the sliding rail 1371.

Figure 25:
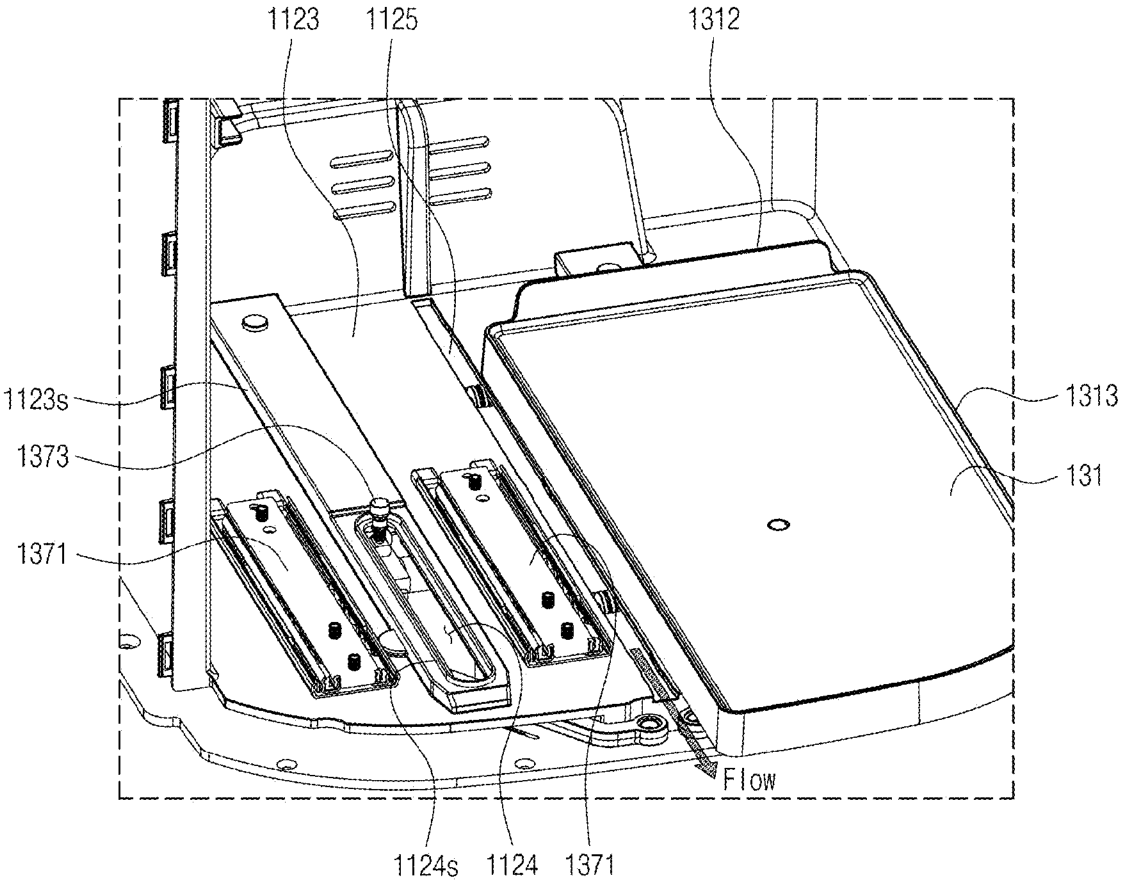
FIG. 25 is a view showing a sliding rail and a sliding shelf coupled to a storage base of a delivery robot according to an embodiment of the present disclosure.

FIG. 25 is a view showing the sliding rail 1371 and the sliding shelf 131 coupled to the storage base 1123 of the delivery robot 100 according to an embodiment of the present disclosure. The linear actuator 1373 may be connected to the sliding shelf 131 via a driving hole 1124 defined in the storage base 1123 to provide a driving force to the sliding shelf 131.

When the items stored in the storage 115 include a liquid item, liquid may spill into the storage 115 while the delivery robot 100 is traveling or the sliding shelf 131 is being driven.

When the liquid flows into the linear actuator 1373 located under the storage base 1123 or an electronic component such as the motor 122 and the controller 180 of the door via the driving hole 1124 defined in the storage base 1123, there is a risk of failure. Therefore, a structure to prevent the inflow of water via the driving hole 1124 is needed.

A spill preventing protrusion 1313 may be formed around the sliding shelf 131 to prevent the liquid spilled on the sliding shelf 131 from flowing down to the storage base 1123. When a small amount of liquid flows, the spill preventing protrusion 1313 prevents the liquid from flowing to the storage base 1123. In the present embodiment, the spill preventing protrusion 1313 is designed to have a height of about 3.5 mm, so that 250 ml of liquid does not overflow.

Even when the liquid flows to the storage base 1123, the partition groove 1323 into which the partition 133 is inserted is recessed downwardly of the storage base 1123, the liquid may be guided to flow forwards along the partition groove 1323, thereby being prevented from flowing downwardly of the storage base 1123 via the driving hole 1124.

As shown in FIG. 25, the driving hole 1124 may form a step **1123*s* to be located higher than other portions of the storage base 1123. Additionally, a bump 1124*s* that prevents the inflow of the liquid may be formed around the driving hole 1124**.

A fall preventing wall 1312 may be included at a rear portion of the sliding shelf 131 to prevent the item located on the sliding shelf 131 from falling rearwards and moving to the storage base 1123 when the sliding shelf 131 is driven forwards. The fall preventing wall 1312 may be designed to have a height equal to or greater than 20 mm.

Figure 26:
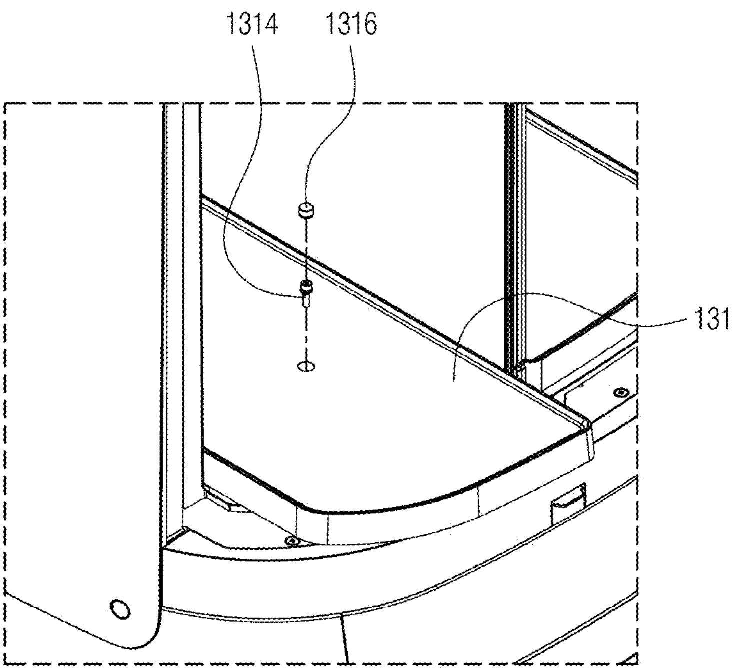
FIG. 26 is a diagram showing a method for separating a sliding shelf of a delivery robot according to an embodiment of the present disclosure.
Figure 26:
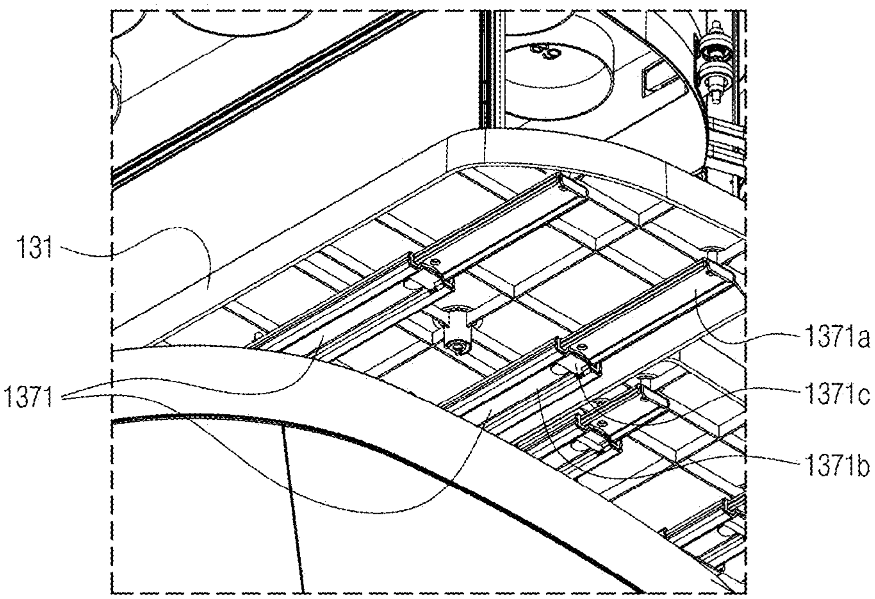

FIG. 26 is a diagram showing a method for separating the sliding shelf 131 of the delivery robot 100 according to an embodiment of the present disclosure. It is necessary to separate the sliding shelf 131 from the body 110 to clean or maintain the storage base 1123.

As shown in (a) in FIG. 26, when removing a screw 1314 that fastens the linear actuator 1373 with the sliding shelf 131, the sliding shelf 131 may be extended forwards beyond a driving range of the linear actuator 1373. A cap 1316 covering a top surface of the screw 1314 may be further included to prevent the screw 1314 from being exposed to the outside.

As shown in (b) in FIG. 26, the sliding rail 1371 is disassembled from the bottom surface of the sliding shelf 131 extended forwards. A hook **1371*c* that fastens a beam 1371*a* attached to the sliding shelf 131 with a beam 1371*b* attached to the storage base 1123 in the multi-step sliding rail 1371 may be pressed to disassemble the sliding rail 1371 and separate the sliding shelf 131 from the body 110**.

Figure 27:
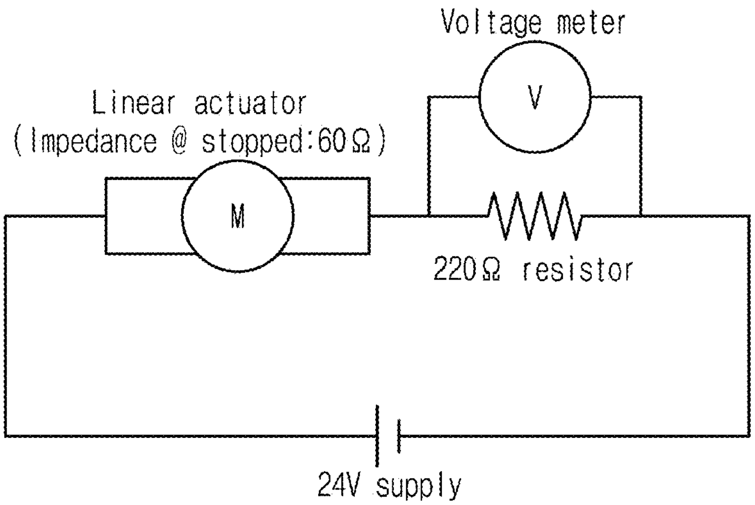
FIG. 27 relates to a safety control method of a sliding shelf 131 of a delivery robot according to an embodiment of the present disclosure.

FIG. 27 relates to a safety control method of the sliding shelf 131 of the delivery robot 100 according to an embodiment of the present disclosure. As described above, when the weight of the item stored on the sliding shelf 131 exceeds an allowable value, the shelf driver 137 may break down because of overload.

As shown in (a) in FIG. 27, the linear actuator 1373 may have a circuit configuration that automatically short-circuits when the smallest and greatest lengths are reached for driving safety. Therefore, when an end point is reached, the linear actuator 1373 is short-circuited, so that a voltage measured at the linear actuator 1373 becomes 0.

In one example, when there is no item on the sliding shelf 131, a voltage equal to or lower than 5V may be measured, but when the weight of the item exceeds a maximum weight, the voltage equal to or higher than 18V may be measured. In this case, the controller 180 may forcibly stop the linear actuator 1373 to prevent the overload. The above value may vary depending on a type or a design of the linear actuator 1373, but whether the linear actuator 1373 is overloaded may be detected while monitoring the voltage of the linear actuator 1373.

Figure 28:
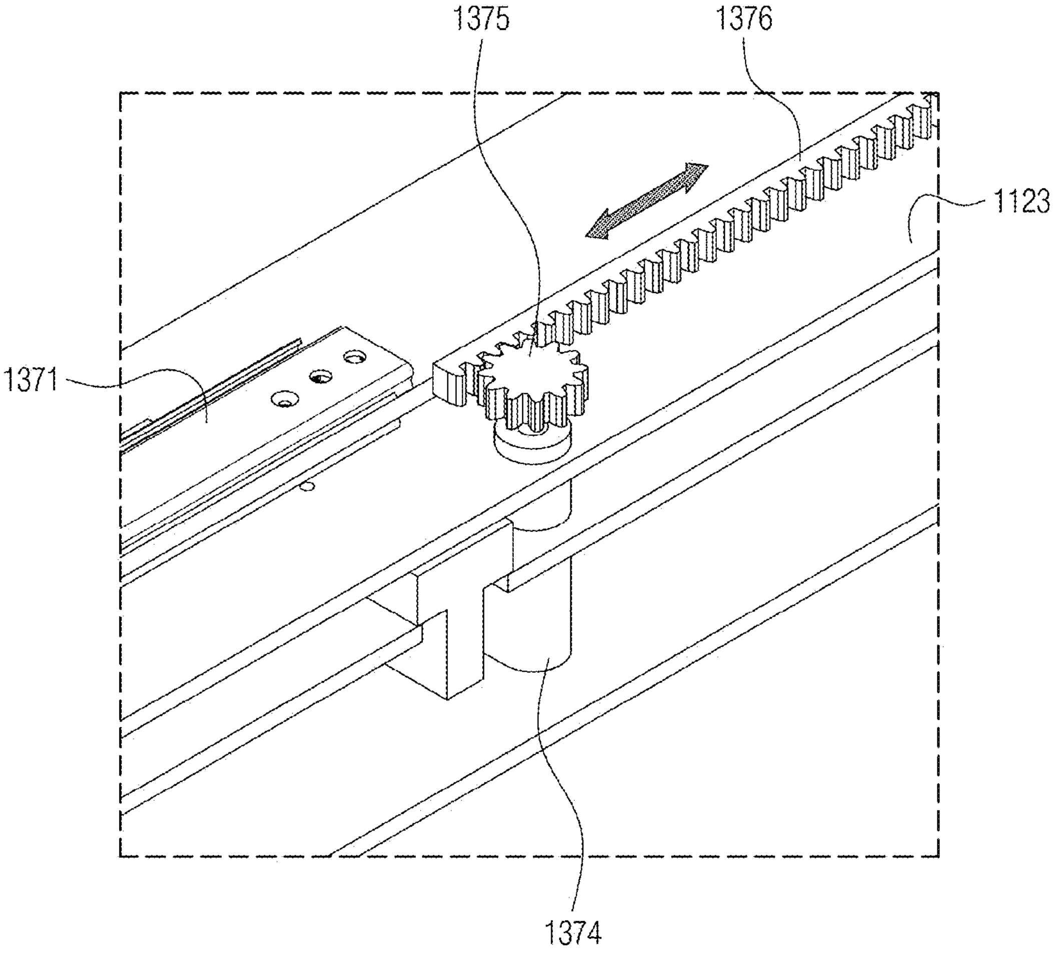
FIGS. 28 and 29 are diagrams illustrating a driver of a sliding shelf of a delivery robot according to another embodiment of the present disclosure.
Figure 29:
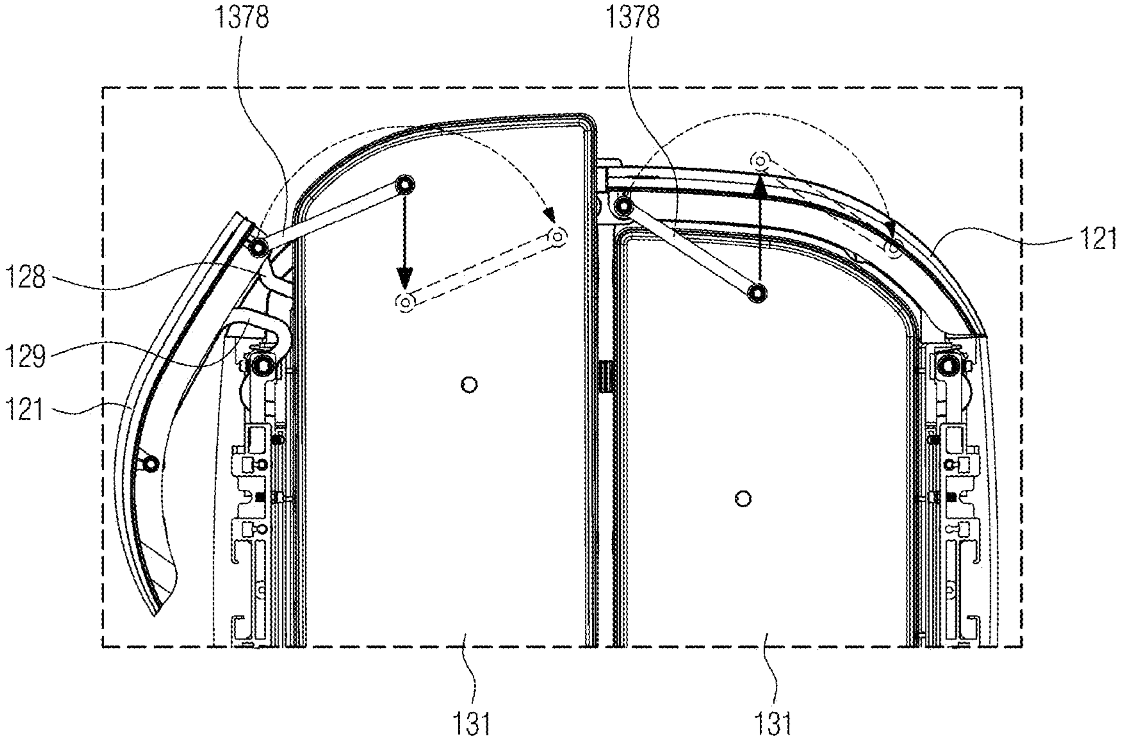

In addition to the linear actuator 1373, the shelf driver 137 using another scheme may be used. FIGS. 28 and 29 are diagrams illustrating the driver of the sliding shelf 131 of the delivery robot 100 according to another embodiment of the present disclosure.

FIG. 28 implements the shelf driver 137 using a rack and pinion gear. A sliding motor 1374 located under the storage base 1123 may rotate a pinion gear 1375 located on the storage base 1123 and may linearly drive a rack gear 1376 coupled to the bottom surface of the sliding shelf 131 in the front and rear direction. The shelf driver 137 in the present embodiment is stronger against the load than the linear actuator 1373 described above, and the driving hole 1124 is able to be defined smaller or sealed, which has an advantage in terms of waterproofing.

According to the embodiment shown in FIG. 29, the sliding shelf 131 may be extended via a shelf link 1378 connected to the door 120. One end of the shelf link 1378 may be coupled to the door 120 and the other end thereof may be coupled to the sliding shelf 131. When the door 120 is opened, the door links 128 and 129 may pivot to pull the sliding shelf 131 forwards.

The structure of the sliding shelf 131 using the shelf link 1378 has an advantage of being driven together with the door 120 without the linear actuator 1373 or the sliding motor 1374 for driving the shelf. However, there is a risk of overloading the motor 122 that drives the door 120, and the sliding shelf 131 may be extended when the lower door 120 is opened regardless of whether the middle shelf 132 has been mounted.

Figure 30:
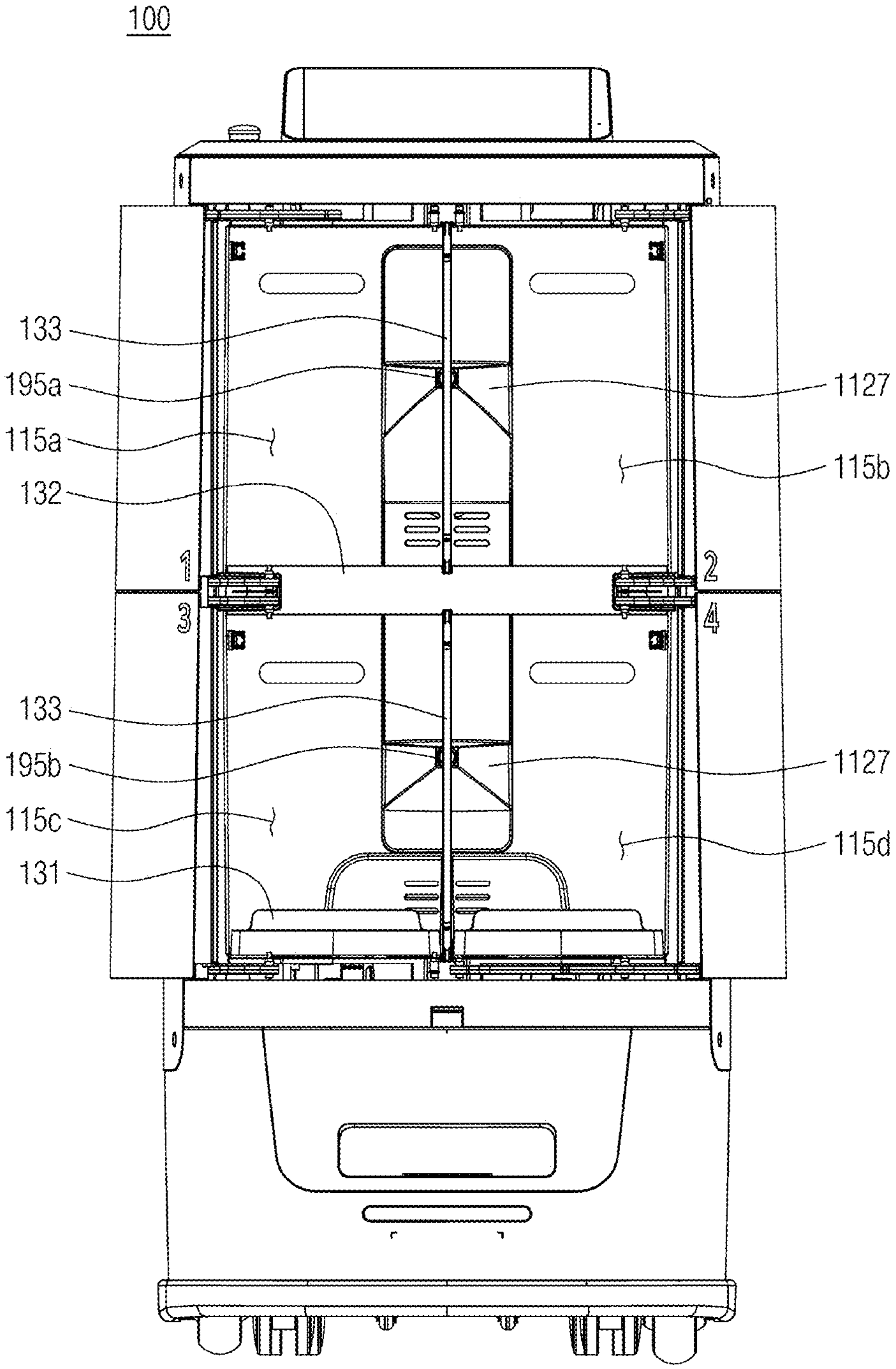
FIG. 30 is a front view showing a storage of a delivery robot according to an embodiment of the present disclosure.

FIG. 30 is a front view showing the storage 115 of the delivery robot 100 according to an embodiment of the present disclosure. To detect whether there is the item in the storage 115, the delivery robot 100 may further be equipped with the internal camera 195 inside the storage 115.

As seen in FIG. 7, the storage 115 of the present disclosure may be used by being partitioned into the plurality of sections depending on a situation, so that the internal camera 195 that may observe the inside of all of the plurality of partitioned storage sections 115*a*, 115*b*, 115*c*, and 115*d* is needed.

The delivery robot 100 of the present disclosure is partitioned into up to four storage sections 115. When each internal camera 195 is disposed in each of the four storage sections 115, a cost may increase excessively. Accordingly, the delivery robot 100 of the present disclosure uses two internal cameras 195*a* and 195*b* disposed at centers of the upper storage section 115*e* and the lower storage section 115*f*, respectively.

In the state in which the middle shelf 132 has been inserted, the first internal camera 195*a* of the upper storage section 115*e* and the second internal camera 195*b* of the lower storage section 115*f* observe the upper storage section 115*e* and the lower storage section 115*f*, respectively. In the state in which the middle shelf 132 has not been inserted, the inside of the storage 115 may be observed using only the lower internal camera 195*b*, thereby reducing power consumption.

As shown in FIG. 30, the internal camera 195 is located at the center in the horizontal direction of the storage 115, so that the location of the internal camera 195 may overlap the location where the partition 133 is inserted. When there is no partition 133 in the storage 115, there is no difficulty in identifying whether there is the item by observing the upper storage section 115*e* and the lower storage section 115*f* with one internal camera 195*a* or 195*b*, but when the partition 133 is inserted, both left and right sides must be observed simultaneously.

Figure 31:
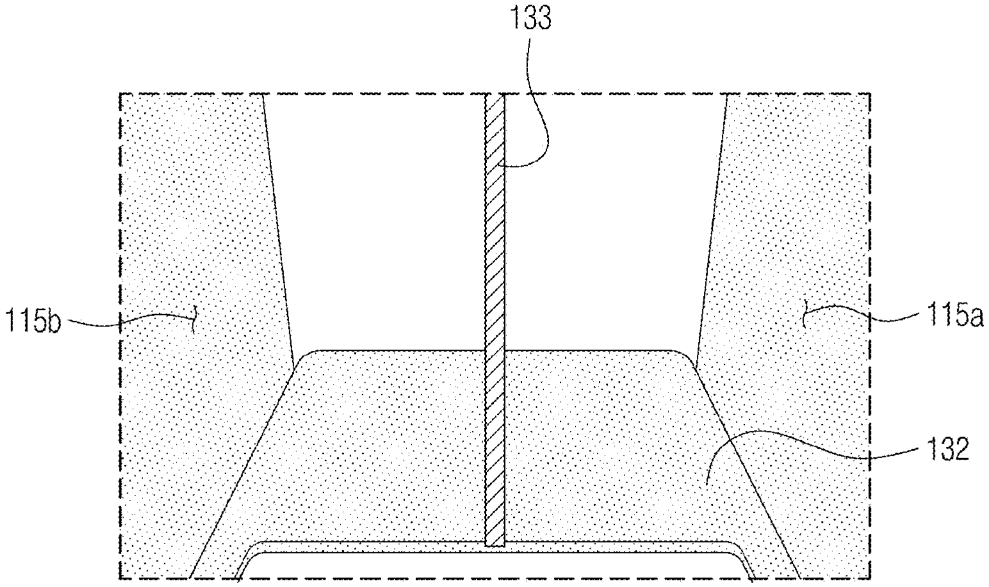
FIG. 31 is a diagram showing an image captured by an internal camera located in an upper storage section depending on whether there is a partition of a delivery robot according to an embodiment of the present disclosure.
Figure 31:
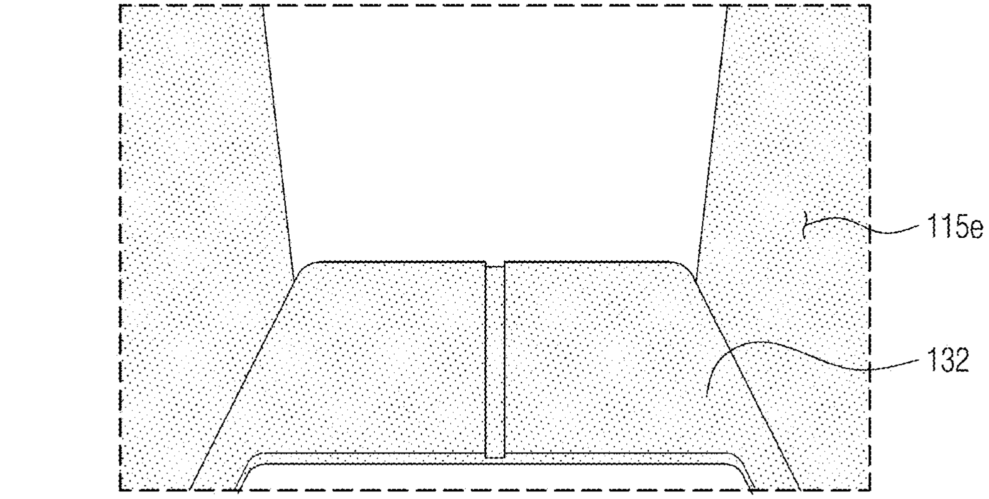

FIG. 31 is a diagram showing an image captured by the internal camera 195*a* located in the upper storage section 115*e* depending on whether there is the partition 133 of the delivery robot 100 according to an embodiment of the present disclosure.

When the partition 133 is inserted as in (a), the second elastic sensor 134*b* may detect the presence of the partition 133, and the controller 180 may distinguish left and right images captured by the internal camera 195 from each other to determine whether there is the item for each of the storage sections 115*a* and 115*b*.

When the second elastic sensor 134*b* detects that the partition 133 has been removed, as in (b), the controller 180 may determine the image captured by the internal camera 195*a* as an image for one storage section 115*e* and determine whether there is the item.

Figure 32:
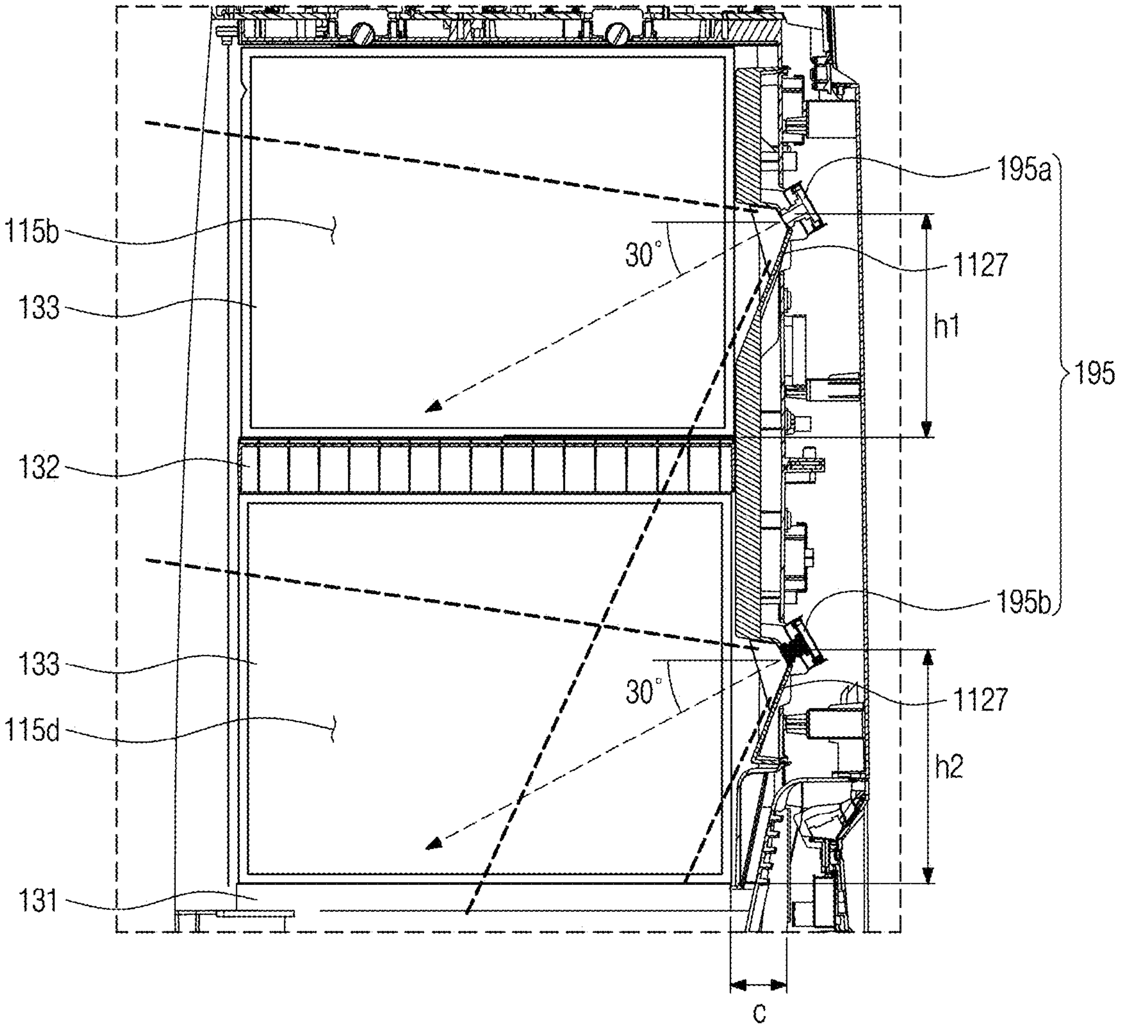
FIG. 32 is a conceptual diagram showing an angle of view of an internal camera of a delivery robot according to an embodiment of the present disclosure.

FIG. 32 is a conceptual diagram showing an angle of view of the internal camera 195 of the delivery robot 100 according to an embodiment of the present disclosure. The partition 133 of the delivery robot 100 is thinner than the middle shelf 132 and thus does not obscure the view much, but as a distance thereof from the internal camera 195 gets smaller, the view of the internal camera 195 may be obscured.

When the partition 133 is disposed adjacent to the internal camera 195 and obscures most of the view of the internal camera 195, the internal camera 195 is not able to observe the storage 115. Therefore, as shown in FIG. 32, when the partition 133 is inserted into the storage 115, an inner end of the partition 133 may be disposed to be spaced apart from the internal camera 195 by a predetermined distance C.

To place the internal camera 195 at the location spaced apart from the inner end of the partition 133 while the partition 133 of the delivery robot 100 is inserted into the storage 115, a camera mounting portion 1127 that is defined as a rear surface of the storage 115 is concavely recessed may be included.

The separation distance between the internal camera 195 and the end of the partition 133 may vary depending on the angle of view of the internal camera 195 and the thickness of the partition 133, but an angle of view of a 35 mm-70 mm standard camera is in a range from 34° to 63° in the horizontal direction.

For convenience of calculation, when the angle of view is 60°, a captured range based on the distance and the angle of view is 1:1. In other words, a distance c equal to or greater than the thickness of partition 133 must be secured to secure the field of view of the internal camera 195. The internal camera 195 of the delivery robot 100 may be disposed to be spaced apart from the partition 133 by a distance equal to or greater than 3 times the thickness of the partition 133. In the present embodiment, when installing the partition 133 with the thickness of 10 mm, the internal camera 195 may be disposed to be spaced apart from the partition 133 by a distance of 40 mm.

In particular, the internal camera 195 in the present disclosure is tilted downward as shown in FIG. 31, so that an actual distance from the partition 133 along a center line of the angle of view may be greater than 40 mm.

Because the purpose of the internal camera 195 is to determine whether there is the item located on the shelf, the internal camera 195 may be tilted downwards so as to observe an entirety of the shelf up to a rear end of the shelf (a right side in the drawing).

An inclination of the first internal camera 195*a* may vary because the view of the internal camera 195*a* varies depending on a vertical level of the first internal camera 195*a* from the middle shelf 132, but an experiment was conducted based on a case in which the internal camera 195 is disposed at a vertical level of about 180 mm from the middle shelf 132. In the present experiment, a length of the middle shelf 132 in the front and rear direction is about 450 mm.

Because of a vertical level of the sliding shelf 131, a height h2 of the second internal camera 195*b* from the sliding shelf 131 may be smaller than a height h1 of the first internal camera 195*a* from the middle shelf 132 (h1>h2).

The second internal camera 195*b* must be able to detect the item dropped on the storage base 1123 when the sliding shelf 131 is extended. Therefore, the second internal camera 195*b* may have a height of h1 from the storage base 1123 so as to detect the storage base 1123 up to a rear end thereof, and the height h2 from the storage base 1123 may be smaller than h1.

Figure 33:
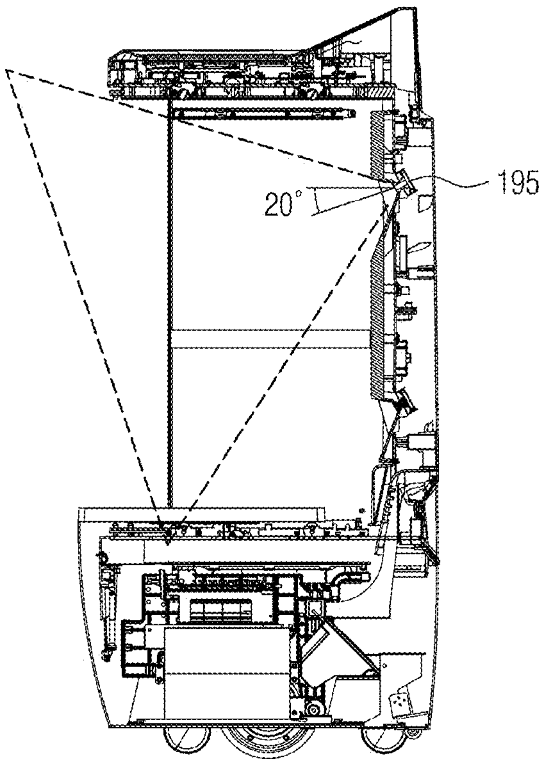
FIG. 33 is a diagram showing a case of capturing an image in a state in which an internal camera 195 of a delivery robot is tilted 20° downwards according to an embodiment of the present disclosure.
Figure 33:
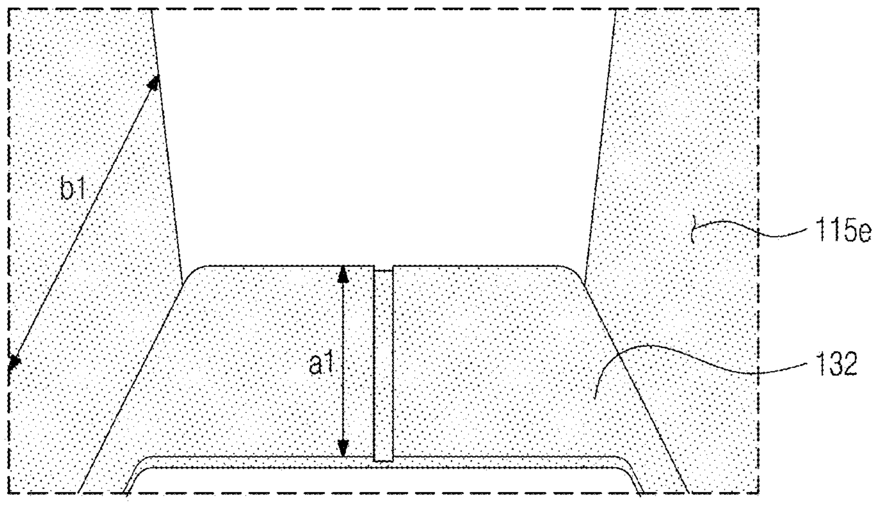
Figure 34:
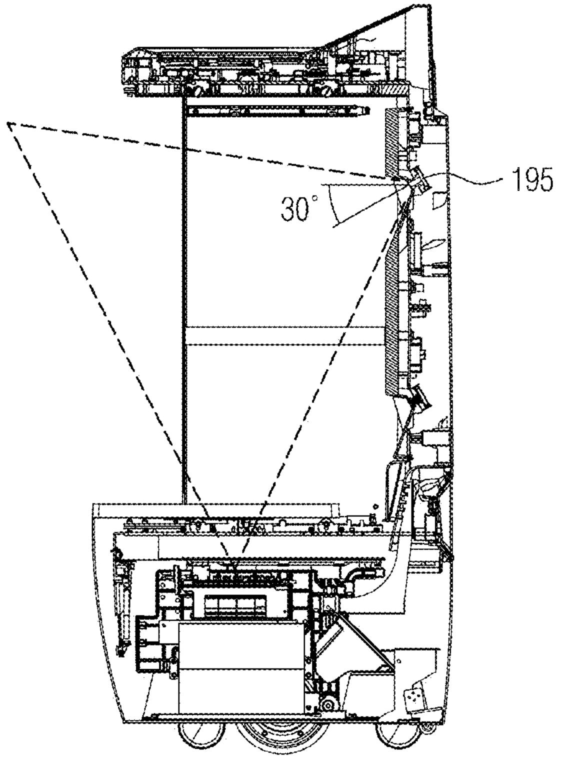
FIG. 34 is a diagram showing a case of capturing an image in a state in which an internal camera of a delivery robot is tilted 30° downwards according to an embodiment of the present disclosure.
Figure 34:
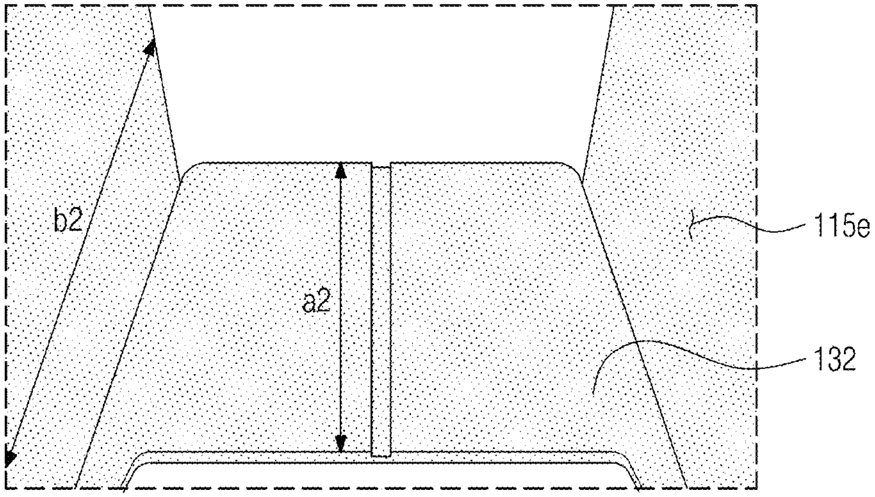

FIG. 33 is a diagram showing a case of capturing an image in a state in which the internal camera 195 of the delivery robot 100 is tilted 20° downwards according to an embodiment of the present disclosure, and FIG. 34 is a diagram showing a case of capturing an image in a state in which the internal camera 195 of the delivery robot 100 is tilted 30° downwards according to an embodiment of the present disclosure.

When the image is captured with the internal camera 195 tilted 20° downwards as shown in (a) in FIG. 33, the upper storage section 115*e* is captured as shown in (b). When the image is captured with the internal camera 195 tilted 30° downwards as shown in (a) in FIG. 34, the upper storage section 115*e* is captured as shown in (b).

The greater the angle of downward tilting, the greater the portion of the middle shelf 132 observed up to the rear end (a1<a2). Further, a captured range b of a side portion of the storage 115 may also become greater at 30° than at 20° (b1<b2).

When the internal camera 195 is tilted by 20° as shown in FIG. 33, the captured range a1 is smaller than the length of the middle shelf 132 and the rear end of the middle shelf 132 is not within the angle of view, so that the observation is difficult. Because the captured range a2 of the middle shelf 132 is expanded when the internal camera 195 is tilted by 30° as shown in FIG. 34, an optimal angle of view of the internal camera 195 is set to 300 in the present embodiment. The angle of view of the internal camera 195 may vary depending on a size of the storage, and may be set to be in a range between 25° and 35°.

The camera mounting portion 1127 in which the internal camera 195 is mounted may be recessed from a rear inner surface of the storage 115 while forming an inclined surface 1127. In this regard, the inclined surface 1127 may have an inclination equal to or greater than the angle of view of the camera so as not to obscure the view of the internal camera 195, and the inclined surface 1127 may be formed such that a lower side is steeper than an upper side because the internal camera 195 in the present disclosure is inclined downward.

As shown in FIG. 34, the internal camera 195 may observe the outside of the door 120 when the door 120 is open. The camera 193 located on the outer side of the delivery robot 100 is located only on a side opposite to the door 120, which is in the travel direction, and thus is not able to determine whether a person or an obstacle is located in the direction of the door 120.

The internal camera 195 may detect whether the person or the obstacle is located outside the door 120 when the sliding shelf 131 must be extended while the door 120 is open. The controller may extend the sliding shelf 131 after confirming that there is no obstacle outside the door 120 based on the image of the internal camera 195.

Hereinafter, a scenario of delivering the item by controlling the delivery robot 100 in the present disclosure will be described with reference to FIGS. 35 to 37.

Figure 35:
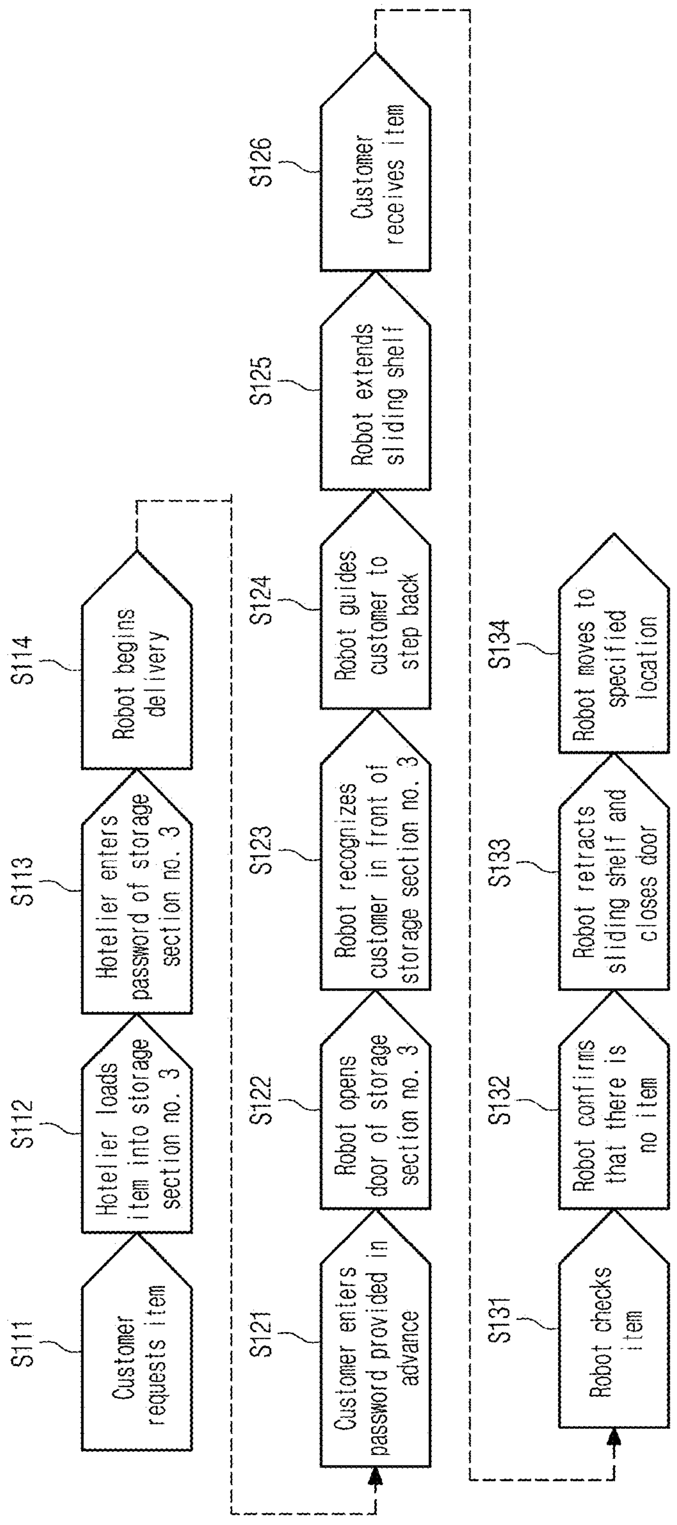
FIG. 35 shows a process of delivering an item to a customer using a delivery robot when a customer makes a request for the item to a hotelier in a hotel.

FIG. 35 shows a process of delivering an item to a customer using the delivery robot 100 when the customer makes a request for the item to a hotelier in a hotel. First, when the customer requests an additional supply such as a towel (S111), the hotelier loads the additional supply into the storage 115 of the delivery robot 100.

The hotelier, a manager, may open all the four doors 120 to view the entire storage 115, and may insert the middle shelf 132 and the partition 133 into the storage 115 corresponding to the required number of storage sections 115.

When the first elastic sensor 134*a* and the second elastic sensor 134*b* detect the partitioning of the storage 115 and the hotelier loads the item into one of the partitioned storage sections 115, the internal camera 195 may detect the loading of the item and match the storage 115 where the item is stored with the request of the customer.

In the present embodiment, the hotelier may load the item into a storage section No. 3 115 (S112) and enter a password of the storage section No. 3 115 (S113). The delivery robot 100 closes the door 120 and begins delivery to a specified location, a room of the customer (S114).

The hotelier informs the customer of the set password, and the customer enters the password provided in advance when the robot arrives (S121). When the password matches, the delivery robot 100 opens the door 120 of the storage section No. 3 115 (S122). The internal camera 195 of the delivery robot 100 may determine whether the customer is located in front of the storage section No. 3 115 and guide the customer to step back when the customer is located adjacent to the storage section No. 3 115 (S124).

The delivery robot 100 may extend the sliding shelf 131 such that the customer may easily receive the item from the storage No. 115 located at the bottom (S125). When the customer receives the item (S126), the internal camera 195 confirms the receipt of the item (S131). When confirming that there is no item on the sliding shelf 131 (S132), the controller 180 retracts the sliding shelf 131 and closes the door 120 (S133). The robot may move to the specified location again (S134).

Figure 36:
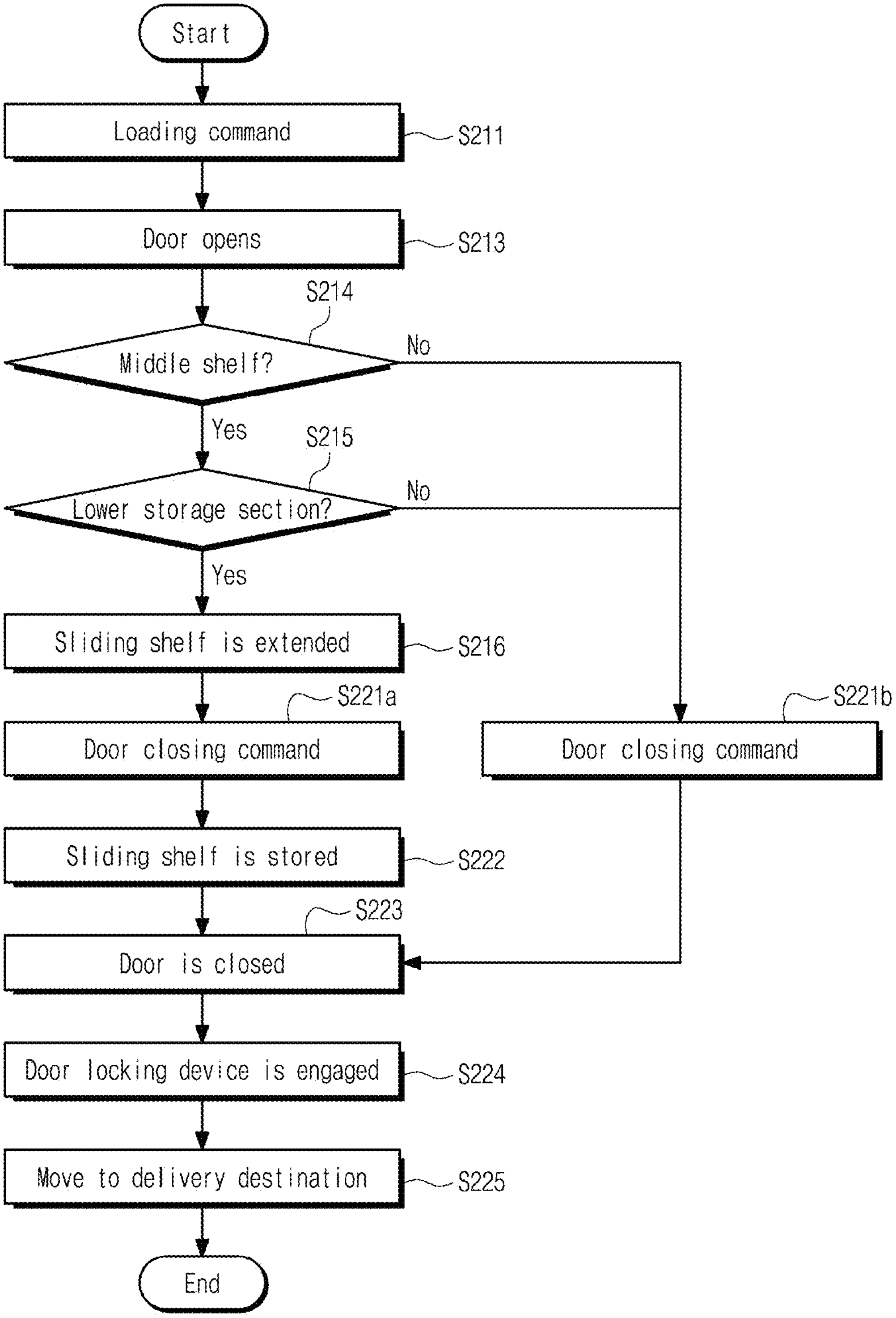
FIGS. 36 and 37 are flowcharts showing a control logic of a controller of a delivery robot for a scenario in FIG. 35.
Figure 37:
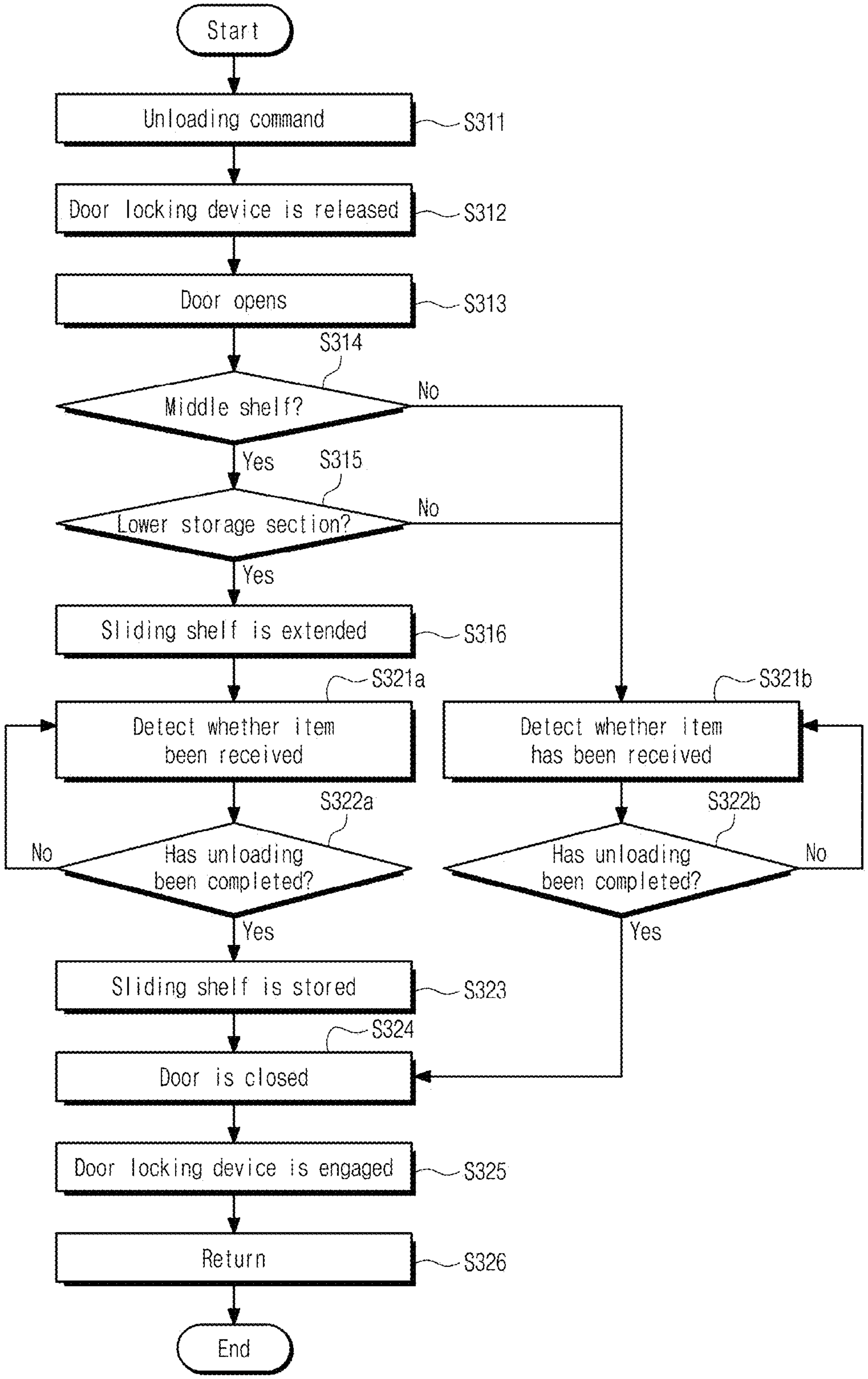

FIGS. 36 and 37 are flowcharts showing a control logic of the controller 180 of the delivery robot 100 for the scenario in FIG. 35. FIG. 36 shows a control method when loading the item, and FIG. 37 shows a control method when unloading the item.

In FIG. 36, a loading command (S211) may be input to load the item into the delivery robot 100. When the hotelier presses a button for opening the door 120 while the item is not loaded, it may be recognized as the loading command.

The delivery robot 100 may open the door 120 in response to the loading command (S213), and may determine whether the middle shelf 132 or the partition 133 has been inserted based on the signals detected by the first elastic sensor 134*a* and the second elastic sensor 134*b*. When the middle shelf 132 is inserted and the specified storage section 115 is the lower storage section 115*f* (S214 and S215), the sliding shelf 131 is extended (S216). When the hotelier places the item on the sliding shelf 131 and enters a command for closing the door 120 (S221*a*), the sliding shelf 131 is stored and the door 120 is closed (S222 and S223).

When the central shelf is not inserted and only one storage section 115 is included or in case of the upper storage section 115*e*, the extension of the sliding shelf 131 is unnecessary, so that when the hotelier places the item on the sliding shelf 131 and enters the command for closing the door 120 (S221*b*), the door 120 is closed (S223).

When the door 120 is closed, the door locking device may be engaged to lock the door to prevent the door 120 from being opened (S224), and then the delivery robot 100 may move to a delivery destination (S225).

FIG. 37 is a flowchart showing a control method of the delivery robot 100 after arriving at the delivery location. The customer who is the item recipient enters an unloading command (S311). The unloading command may be the preset password or a customer order number. When the unloading command is entered, the door locking device may be released and the door 120 may be opened (S312 and S313).

When the middle shelf 132 has been inserted and the specified storage section 115 is the lower storage section 115*f* (S314 and S315), the sliding shelf 131 is extended (S316). The internal camera 195 may detect whether the item has been received (S321*a*), when the customer has received the item and thus there is no item on the sliding shelf 131, may determine that the unloading has been completed (S322*a*), and may store the sliding shelf 131 and close the door 120 (S323 and S324).

When the middle shelf has not been inserted and only one storage section 115 is included or in case of the upper storage section 115*e*, the extension of the sliding shelf 131 is unnecessary, so that the internal camera 195 may detect whether the item has been received (S321*b*), when the customer has received the item and thus there is no item on the sliding shelf 131, may determine that the unloading has been completed (S322*b*), and may close the door 120 (S324).

The delivery robot 100 may engage the door locking device and return to the pre-specified location (S325 and S326).

As described above, the delivery robot 100 in the present disclosure may have the door 120 that may open and close the storage, and may prevent the door 120 from opening via the locking device 127 when moving, thereby safely delivering the item.

In addition, the delivery robot 100 in the present disclosure may safely open and close the door 120 in the limited space by moving the pivoting range thereof along the outer surface of the body 110 when the door 120 is opened.

In addition, the link that operates the door 120 of the delivery robot 100 in the present disclosure has the excellent aesthetic appearance by minimizing the exposure to the outside and does not interfere with other members.

In addition, the injury does not occur even when the hand gets caught in the door 120 of the delivery robot 100 in the present disclosure, and the overvoltage of the motor 122 caused by the counter electromotive force does not occur, so that the safety is secured.

In addition, the delivery robot 100 in the present disclosure may partition the inside of the storage 115 as needed and increase the utilization of the internal space via the plurality of doors 120 that may be opened and closed selectively.

In addition, the delivery robot 100 in the present disclosure may detect whether the shelf and the partition 133 have been attached or detached to selectively operate the plurality of doors 120 depending on the storage partitioning state of the doors 120.

In addition, the delivery robot 100 in the present disclosure may store the partition 133 inside the storage of the delivery robot 100 when not using the partition 133.

In addition, the delivery robot 100 in the present disclosure may be equipped with the sliding shelf 131 to improve the convenience in putting in and taking out the item.

In addition, the delivery robot 100 in the present disclosure may reduce the failure rate of the delivery robot 100 by preventing the liquid from flowing into the electronic component located under the sliding shelf 131.

In addition, the sliding shelf 131 of the delivery robot 100 in the present disclosure may be easily removable and thus may be easily maintained.

In addition, the delivery robot 100 in the present disclosure may be equipped with the internal camera 195 and thus determine whether the item is stored inside to open and close the door 120.

In addition, the delivery robot 100 in the present disclosure may detect whether there is the person outside the delivery robot 100, thereby checking whether it is safe in advance when extending the sliding shelf 131.

The above detailed description should not be construed as restrictive in any respect and should be considered illustrative. The scope of the present disclosure must be determined by reasonable interpretation of the attached claims, and all changes within the equivalent scope of the present disclosure are included in the scope of the present disclosure.

What is claimed is:

1. A delivery robot comprising:

a body housing including a storage defined therein and a body opening defined in a front surface thereof;

a door configured to operate either in a closed state to cover the body opening or an open state to open the body opening;

a sliding shelf located at a bottom of the storage, the sliding shelf being slidable in a front and rear direction of the delivery robot;

a middle shelf partitioning the storage into an upper storage section and a lower storage section, the middle shelf being detachable to the body housing;

a sensor configured to detect mounting of the middle shelf; and a controller configured to:

operate the door to move between the closed state and the open state; and operate the sliding shelf to move in the front and rear direction, and wherein the controller is configured to operate the sliding shelf when the sensor detects that the middle shelf is mounted to the body housing, and the door is opened and to disable operation of the sliding shelf when the middle shelf is not mounted to the body housing.

2. The delivery robot of claim 1, further comprising shelf rails located at a left side and a right side of the middle shelf, respectively, wherein the sensor includes a first elastic sensor protruding from a side surface of the storage, the first elastic sensor being configured to detect the mounting of the middle shelf by being retracted when the middle shelf is mounted in the shelf rails.

3. The delivery robot of claim 2, wherein the door includes:

an upper door configured to open and close the upper storage section; and a lower door configured to open and close the lower storage section, and wherein the controller is further configured to:

operate the upper door and the lower door individually when the first elastic sensor detects the middle shelf; and extend the sliding shelf when only the lower door is opened.

4. The delivery robot of claim 1, further comprising:

a shelf driver located under the sliding shelf, the shelf driver configured to move the sliding shelf in the front and rear direction; and a sliding rail located under the sliding shelf, the sliding rail being configured to guide the sliding shelf, the sliding rail being located between the shelf driver and the sliding shelf.

5. The delivery robot of claim 4, wherein the shelf driver is a linear actuator.

6. The delivery robot of claim 4, wherein the shelf driver is a rack and pinion gear.

7. The delivery robot of claim 4, wherein the storage includes a storage base located under the sliding shelf, and wherein the shelf driver is fastened to the sliding shelf via a driving hole in the storage base.

8. The delivery robot of claim 7, wherein the sliding rail is located on the storage base.

9. The delivery robot of claim 7, further comprising a waterproofing wall protruding around the driving hole of the storage base.

10. The delivery robot of claim 1, wherein the sliding shelf includes a spill preventing protrusion protruding upward at a perimeter of the sliding shelf.

11. The delivery robot of claim 10, wherein the sliding shelf includes a fall preventing wall protruding upward from a rear surface of the sliding shelf.

12. The delivery robot of claim 1, wherein the sliding shelf includes a fall preventing wall protruding upward from a rear surface of the sliding shelf.

13. The delivery robot of claim 1, further comprising a shelf link having a first end connected to the door and a second end connected to the sliding shelf, wherein the shelf link is configured to:

pull the sliding shelf to extend the sliding shelf from the storage when the door is opened; and push the sliding shelf to retract the sliding shelf into the storage when the door is closed.

14. The delivery robot of claim 1, further comprising an internal camera located inside the storage to capture an image outside the door when the door is opened, wherein the controller is further configured to:

determine whether there is an obstacle within an extension range of the sliding shelf based on the captured image; and extend the sliding shelf when there is no obstacle within the extension range of the sliding shelf.

15. A delivery robot comprising:

a body housing including a storage defined therein and a body opening defined in a front surface thereof;

a door configured to operate either in a closed state to cover the body opening or an open state to open the body opening;

a middle shelf partitioning the storage into an upper storage section and a lower storage section, the middle shelf being mountable to the body housing;

a sliding shelf located at a bottom of the lower storage section, the sliding shelf being slidable in a front and rear direction of the delivery robot;

a shelf driver located under the sliding shelf, the shelf driver configured to move the sliding shelf in the front and rear direction;

a sliding rail located under the sliding shelf, the sliding rail being configured to guide the sliding shelf, the sliding rail being located between the shelf driver and the sliding shelf;

a waterproofing wall; and a controller configured to:

operate the door to move between the closed state and the open state; and operate the sliding shelf to move in the front and rear direction, wherein the storage includes:

a storage base located under the sliding shelf; and a driving hole extending in the front and rear direction, wherein the waterproofing wall protrudes around the driving hole of the storage base, and wherein the shelf driver is located under the storage base and is fastened to the sliding shelf via the driving hole.

16. The delivery robot of claim 15, further comprising an internal camera located inside the storage to capture an image outside the door when the door is opened, wherein the controller is further configured to:

determine whether there is an obstacle within an extension range of the sliding shelf based on the captured image; and extend the sliding shelf when there is no obstacle within the extension range of the sliding shelf.

17. The delivery robot of claim 15, wherein the sliding rail is located on the storage base.

18. A delivery robot comprising:

a body housing including a storage defined therein and a body opening defined in a front surface thereof;

a door configured to operate either in a closed state to cover the body opening or an open state to open the body opening;

a sliding shelf located at a bottom of the storage, the sliding shelf being slidable in a front and rear direction of the delivery robot; and a shelf link interlocking the door and the sliding shelf and having a first end connected to the door and a second end connected to the sliding shelf, wherein the shelf link is configured to:

pull out the sliding shelf to slide out from the storage in response to the door opening; and push the sliding shelf to slide back into the storage in response to the door closing.

* * * * *